US012786699B2

(12) United States Patent
Zhang et al.

(10) Patent No.: US 12,786,699 B2
(45) Date of Patent: Nov. 3, 2026

(54) CONNECTING TO A WLAN USING AN AUTHORIZATION CODE AND A KEY

(71) Applicant: HUAWEI TECHNOLOGIES CO., LTD., Shenzhen (CN)

(72) Inventors: Jin Zhang, Xi'an (CN); Shaobo Hui, Xi'an (CN); Kang An, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 286 days.

(21) Appl. No.: 18/577,933

(22) PCT Filed: Jul. 15, 2022

(86) PCT No.: PCT/CN2022/106098
§ 371 (c)(1),
(2) Date: Jan. 9, 2024

(87) PCT Pub. No.: WO2023/001082
PCT Pub. Date: Jan. 26, 2023

(65) Prior Publication Data

US 2024/0323675 A1 Sep. 26, 2024

(30) Foreign Application Priority Data

Jul. 19, 2021 (CN) ......................... 202110814541.8

(51) Int. Cl.
*H04W 12/03* (2021.01)
*H04W 12/08* (2021.01)
*H04W 48/16* (2009.01)

(52) U.S. Cl.
CPC ........... *H04W 12/03* (2021.01); *H04W 12/08* (2013.01); *H04W 48/16* (2013.01)

(58) Field of Classification Search
CPC ...... H04W 12/03; H04W 12/08; H04W 48/16
(Continued)

(56) References Cited

U.S. PATENT DOCUMENTS

2012/0110324 A1* 5/2012 Geng ................ H04W 12/0433 713/155
2018/0041507 A1* 2/2018 Sivarajan ................ G06F 21/44
2021/0399943 A1* 12/2021 Luo ..................... H04L 12/2807

FOREIGN PATENT DOCUMENTS

CN 107426722 A 12/2017
CN 109688118 A * 4/2019 ......... H04L 63/0876
(Continued)

OTHER PUBLICATIONS

Lin, Lin, Translated, CN-110475270-A, Nov. 19, 2019, all pages (Year: 2019).*
(Continued)

*Primary Examiner* — Haresh N Patel
(74) *Attorney, Agent, or Firm* — Fish & Richardson P.C.

(57) ABSTRACT

In an example implementation, a first electronic device connects to a non-authentication network of a wireless access device; a server randomly generates an authorization code, and the first electronic device and the wireless access device obtains the authorization code; and the wireless access device sends, to the first electronic device, network configuration information encrypted by using an authorization code-based key. The first electronic device receives and decrypts the network configuration information encrypted by using the authorization code-based key, to obtain network configuration information, and the first electronic device accesses the wireless access device based on the network configuration information.

20 Claims, 25 Drawing Sheets

(58) Field of Classification Search
USPC .............................................................. 380/27
See application file for complete search history.

(56) References Cited

FOREIGN PATENT DOCUMENTS

| | | | | | |
|---|---|---|---|---|---|
| CN | 110336720 | A | | 10/2019 | |
| CN | 110475270 | A | * | 11/2019 | ........ H04W 52/0209 |
| CN | 110891299 | A | | 3/2020 | |
| CN | 111865790 | A | * | 10/2020 | ........... H04L 69/162 |
| CN | 112565213 | A | * | 3/2021 | ........... H04L 9/3268 |
| WO | WO-2021104448 | A1 | * | 6/2021 | ........ H04W 12/0433 |

OTHER PUBLICATIONS

Huang, Shaolin, Translated, WO-2021104448-A1, Jun. 3, 2021, all pages (Year: 2021).*
Yang, Xi-ying, Translated, CN-112565213-A, Mar. 26, 2021, all pages (Year: 2021).*
Wang, Xing-jun, Translated, CN-109688118-A, Apr. 26, 2019, all pages (Year: 2019).*
Cui, Wei, Translated, CN-111865790-A, Oct. 20, 2020, all pages (Year: 2020).*
International Search Report and Written Opinion in International Appln. No. PCT/CN2022/106098, mailed on Oct. 9, 2022, 15 pages (with English translation).
IEEE Std 802.11™-2016 (Revision of IEEE Std 802.11-2012), “IEEE Standard for Information technology—Telecommunications and information exchange between systems Local and metropolitan area networks—Specific requirements; Part 11: Wireless LAN Medium Access Control (MAC) and Physical Layer (PHY) Specifications,” Dec. 7, 2016, 3534 pages.
Firewall.cx [online], “Multicast—Understand How IP Multicast Works,” retrieved on Mar. 2025, retrieved from URL<http://www.firewall.cx/networking-topics/general-networking/107-network-multicast.html>, 8 pages.
[No Author Listed] [online], “Summary of IoT device network distribution methods,” Feb. 24, 2018, retrieved from <URL: https://www.jianshu.com/p/f42c8c55fb13,>, 4 pages (with English translation).

* cited by examiner

User interface 10

User interface 20

User interface 910

CONNECTING TO A WLAN USING AN AUTHORIZATION CODE AND A KEY

This application is a National Stage of International Application No. PCT/CN2022/106098, filed on Jul. 15, 2022, which claims priority to Chinese Patent Application No. 202110814541.8, filed on Jul. 19, 2021. Both of the aforementioned applications are hereby incorporated by reference in their entireties.

TECHNICAL FIELD

This application relates to the field of communication technologies, and in particular, to a network configuration method and an apparatus.

BACKGROUND

With the development and popularization of the internet of things and smart home, vendors have launched various smart home devices. The smart home device may be, for example, a smart camera, a smart sound box, or a smart plug. Generally, these devices need to connect to a Wi-Fi network at home to work normally.

It is inconvenient for a user to directly enter network configuration information (such as a name and a password of a router) into the foregoing listed smart home devices. To resolve this problem, the user may perform, by using an electronic device like a mobile phone or a tablet computer, network configuration for the electronic devices that are inconvenient for the user to directly enter network configuration information. Currently, the vendors have implemented various simple network configuration modes, which have security vulnerabilities and pose great challenges to user information security. Therefore, how to implement secure and convenient network configuration is an urgent problem to be resolved.

SUMMARY

Embodiments of this application provide a network configuration method and an apparatus, to improve security when a wireless access device performs network configuration for an electronic device, reduce manual intervention in a network configuration process (for example, a user does not need to manually enter a name and a password of a wireless local area network in which the wireless access device is located), and improve user experience.

According to a first aspect, an embodiment of this application provides a network configuration method. The method may be applied to a network configuration system that includes a first electronic device, a wireless access device, and a server. The method includes: The first electronic device accesses a non-authentication network of the wireless access device; the wireless access device sends a first request message to the server; the server generates a first authorization code after receiving the first request message, where the first authorization code is different from an authorization code generated after the server receives a request message that is of another electronic device and that is sent by the wireless access device; the wireless access device and the first electronic device obtain the first authorization code, and perform negotiation based on the first authorization code to obtain a first key; the wireless access device encrypts, based on the first key, network configuration information of a wireless local area network in which the wireless access device is located, to obtain encrypted network configuration information, and sends the encrypted network configuration information to the first electronic device; and the first electronic device receives the encrypted network configuration information, decrypts the encrypted network configuration information based on the first key to obtain the network configuration information, and connects, based on the network configuration information, to the wireless local area network in which the wireless access device is located.

In some implementations, the first authorization code is randomly generated by the server in response to a request message of a different electronic device, where an authorization code may be randomly generated by the server according to a preset random number generation algorithm. In some implementations, the server may also generate a same authorization code for different electronic devices.

In some other implementations, the server may also generate the first authorization code and a second authorization code, the server sends the first authorization code and the second authorization code to the wireless access device, the wireless access device locally stores the first authorization code, and the wireless access device sends the second authorization code to the first electronic device. Subsequently, the wireless access device negotiates with the first electronic device based on the first authorization code and the second authorization code to obtain the first key. When the first authorization code is the same as the second authorization code, the wireless access device and the first electronic device perform negotiation based on the same authorization code to obtain the first key. When the first authorization code is different from the second authorization code, the wireless access device and the first electronic device perform negotiation based on the different authorization codes to obtain the first key.

The first electronic device may be any one of the following: a smart light, a smart oven, a smart fan, a smart air conditioner, a smart television, a smart large screen, a smart band, a smartwatch, a smart sound box, a smart refrigerator, a smart door and window, a smart automobile, a smart monitor, a smart robot, a smart camera, or the like.

According to the method in the first aspect, first, manual intervention in a network configuration process can be reduced. Specifically, in the network configuration method, a user does not need to enter a name and a password of the wireless local area network in which the wireless access device is located, and operations are simple. Second, the wireless access device is always in an AP mode in the network configuration process. In this way, an ongoing service of another device connected to the wireless access device is not affected. Third, the server generates different authorization codes for different electronic devices. This ensures that each electronic device uses a different high-security channel. This solution improves transmission security of sensitive information (for example, the name and the password of the wireless local area network in which the wireless access device is located), and ensures security of the network configuration process.

With reference to the first aspect, in a possible implementation, before that the wireless access device and the first electronic device obtain the first authorization code, the method further includes: The first electronic device sends, to the server via the wireless access device, first authentication information locally stored by the first electronic device; and the server receives the first authentication information, and determines, based on the first authentication information, that the first electronic device is a valid device.

When determining that the first authentication information meets a first condition, the server determines that the first electronic device is the valid device.

In some implementations, the first authentication information includes first registration information.

After the server receives the first request information and before the server receives the first authentication information sent by the wireless access device, the server generates the first registration information (for example, a registration code), and locally stores the first registration information, to obtain second registration information. The server sends the first registration information to the first electronic device via the wireless access device. After receiving the first registration information, the first electronic device locally stores the first registration information.

The first condition includes: The first registration information in the first authentication information is the same as the second registration information that is of the first electronic device and that is locally stored by the server. To be specific, when the server determines that the first registration information sent by the first electronic device via the wireless access device is registration information that is of the first electronic device and that is sent by the server via the wireless access device before, the server may preliminarily determine that the electronic device is the valid device.

In some other implementations, the first authentication information includes first registration information and first verification information. The first verification information may be any one of a digital certificate or a KPI certificate.

The first condition includes: The first registration information in the first authentication information is the same as second registration information that is of the first electronic device and that is locally stored by the server. In addition, the first verification information is valid verification information.

Specifically, before the server determines that the first verification information is the valid verification information, the server generates a first random number and sends the first random number to the first electronic device via the wireless access device. After receiving the first random number, the first electronic device encrypts the first random number based on a first private key, to obtain an encrypted first random number. The first electronic device sends the encrypted first random number to the server via the wireless access device. After receiving the encrypted first random number, the server decrypts the encrypted first random number based on a first public key preset in the first verification information, to obtain the first random number, and then the server determines that the first verification information is the valid verification information.

After the server determines, by using the first registration information, that the first electronic device is the valid device, the server further verifies validity of the first electronic device based on the verification information. This can improve security of subsequent transmission of the network configuration information.

In this way, only after the server determines, by using the first authentication information, that the first electronic device is a valid device, the server generates the first authorization code for the first electronic device and the wireless access device to perform negotiation to obtain the first key to transmit the network configuration information. When the server determines, by using the first authentication information, that the first electronic device is not a valid device, the server does not generate the first authorization code, the first electronic device cannot obtain the network configuration information, and the first electronic device cannot access the wireless local area network in which the wireless access device is located, thereby ensuring security in the network configuration process.

With reference to the first aspect, in a possible implementation, before that the first electronic device sends, to the server via the wireless access device, first authentication information locally stored by the first electronic device, the method further includes: The first electronic device based on a locally stored preset parameter and the wireless access device based on a locally stored preset parameter performs negotiation to obtain a second key; and that the first electronic device sends, to the server via the wireless access device, first authentication information locally stored by the first electronic device specifically includes: The first electronic device encrypts the first authentication information based on the second key, to obtain encrypted first authentication information; the first electronic device sends the encrypted first authentication information to the wireless access device; after receiving the encrypted first authentication information, the wireless access device decrypts the encrypted first authentication information based on the second key, to obtain the first authentication information; and the wireless access device sends the first authentication information to the server.

In some implementations, before the wireless access device sends the first registration information to the first electronic device, the wireless access device encrypts the first registration information by using the second key, to obtain the encrypted first registration information. The wireless access device sends the encrypted first registration information to the first electronic device. This can ensure security of transmitting information between the first electronic device and the wireless access device.

In this way, before the first electronic device initiates a registration request to the server (in other words, before the first electronic device sends the first authentication information to the server via the wireless access device), if the first electronic device and the wireless access device may obtain the second key through negotiation by using the locally stored preset parameters, it may be considered that the first electronic device is a preliminarily valid device, and the first electronic device may initiate the registration request to the server via the wireless access device. This can ensure that the first electronic device that initiates the registration request to the server is a preliminarily valid electronic device, that is, the first electronic device stores the preset parameter. In addition, information transmitted between the first electronic device and the wireless access device is encrypted by using the second key and then transmitted, which can ensure security of transmitting information between the first electronic device and the wireless access device.

With reference to the first aspect, in a possible implementation, the first authorization code includes m authorization codes, and m is a positive integer greater than or equal to 1; and that the wireless access device and the first electronic device perform negotiation based on the first authorization code to obtain a first key specifically includes the following step.

The wireless access device based on x authorization codes in the first authorization code and the first electronic device based on y authorization codes in the first authorization code perform negotiation to obtain the first key, where x is greater than or equal to 1 and less than or equal to m, and y is greater than or equal to 1 and less than or equal to m.

That is, the server sends the first authorization code to the wireless access device, the wireless access device locally stores the first authorization code, and the wireless access device further needs to send the first authorization code to the first electronic device. The wireless access device and the first electronic device may select a part or all of the authorization codes from the first authorization code to perform negotiation to obtain the first key.

In some implementations, if the x authorization codes in the first authorization code are the same as the y authorization codes in the first authorization code, the wireless access device and the first electronic device perform negotiation based on the same authorization code to obtain the first key.

In some other implementations, if the x authorization codes in the first authorization code are different from the y authorization codes in the first authorization code, the wireless access device and the first electronic device perform negotiation based on the different authorization codes to obtain the first key.

With reference to the first aspect, in a possible implementation, before that the first electronic device accesses a non-authentication network of the wireless access device, the method further includes: The wireless access device sends access information of the non-authentication network in response to a first user operation; and that the first electronic device accesses a non-authentication network of the wireless access device specifically includes: The first electronic device receives the access information, and accesses the non-authentication network of the wireless access device based on the access information. The first user operation may be a pressing operation performed on a network configuration button of the wireless access device, and the access information of the non-authentication network may include an identifier of the non-authentication network, a physical address of the wireless access device, and the like. The wireless access device sends the access information of the non-authentication network of the wireless access device only after the wireless access device receives the first user operation (that is, obtains authorization from the user).

In some implementations, the wireless access device continuously sends the access information of the non-authentication network in response to the first user operation.

After the first electronic device accesses the wireless local area network in which the wireless access device is located, a third electronic device accesses the non-authentication network of the wireless access device. The wireless access device sends a second request message to the server. After receiving the second request message, the server generates the second authorization code. The second authorization code is different from the authorization code generated after the server receives the request message that is of the another electronic device and that is sent by the wireless access device. The wireless access device and the third electronic device obtain the second authorization code, and perform negotiation based on the second authorization code to obtain the second key. The wireless access device encrypts, based on the second key, the network configuration information of the wireless local area network in which the wireless access device is located, to obtain encrypted network configuration information, and sends the encrypted network configuration information to the third electronic device. The third electronic device receives the encrypted network configuration information, decrypts, based on the second key, the encrypted network configuration information to obtain the network configuration information, and connects, based on the network configuration information, to the wireless local area network in which the wireless access device is located. In this way, the wireless access device needs to receive only one user operation, and continuously sends the access information of the non-authentication network. Before the wireless access device stops sending the access information of the non-authentication network, one or more electronic devices may connect to the non-authentication network of the wireless access device. In this case, the wireless access device may complete a network configuration procedure with one or more other electronic devices (for example, the third electronic device) like a network configuration procedure with the first electronic device. In other words, the wireless access device needs to receive only one user operation, and can complete a network configuration procedure with a plurality of electronic devices. Compared with the fact that a current wireless access device receives one user operation and can complete a network configuration procedure with only one electronic device, this improves network configuration efficiency of the electronic device.

In some implementations, after the wireless access device completes a network configuration procedure with the third electronic device, and the wireless access device determines that a quantity of electronic devices that connect to the non-authentication network of the wireless access device is 0, the wireless access device stops sending the access information of the non-authentication network.

In some implementations, after the wireless access device completes a network configuration procedure with the third electronic device, a period of time pasts after the wireless access device determines that a quantity of electronic devices that connect to the non-authentication network of the wireless access device is 0. In this period of time, the wireless access device still continuously sends the access information of the non-authentication network. If no other electronic device connects to the non-authentication network of the wireless access device, the wireless access device stops sending the access information of the non-authentication network.

With reference to the first aspect, in a possible implementation, the network configuration system further includes a second electronic device, and before the server generates the first authorization code, the method further includes: The second electronic device receives a second user operation, where the second user operation indicates the wireless access device to send the access information of the non-authentication network.

In some implementations, the second user operation is used to control the wireless access device to send the access information of the non-authentication network. Specifically, after the wireless access device discovers an electronic device that is in a to-be-network-configured state, the wireless access device displays, by using the server, prompt information on an application on a mobile phone of the second electronic device that is connected to a network, so that the user can see the prompt information. The prompt information prompts the user to enter the second user operation on a network configuration interface of the application, so that the wireless access device sends the access information of the non-authentication network. In other words, the user may not press the network configuration button (that is, perform the first user operation) on the wireless access device, but the wireless access device can still send the access information of the non-authentication network. It can be ensured that, when it is inconvenient for the user to press the network configuration button of the wireless access device, the user can control, on the application, the wireless access device to send the access information of the non-authentication network.

In addition, this solution can also be used in a “remote network distribution” application scenario. To be specific, a user operating the first electronic device is not familiar with a procedure of connecting the first electronic device to the wireless access device, and even if a user operating the second electronic device is not near the user of the first electronic device, the user operating the second electronic device may remotely control, by using a second operation performed on the second electronic device, the first electronic device to connect to the wireless access device.

In some other implementations, the second user operation may also be controlling the server to send the first authorization code to the wireless access device and the first electronic device. Specifically, before the server sends the first authorization code to the wireless access device and the first electronic device, the server displays prompt information on an application on a mobile phone of the second electronic device, so that the user can see the prompt information. The prompt information prompts the user to enter the second user operation on a network configuration interface of the application, so that the server sends the first authorization code to the wireless access device and the first electronic device.

With reference to the first aspect, in a possible implementation, there are one or more first electronic devices, and before that the second electronic device receives a second user operation of a user, the method further includes: The second electronic device displays a first user interface, where the first user interface includes one or more device identifiers corresponding to the one or more first electronic devices. After that the second electronic device receives a second user operation of a user, the method further includes: The second electronic device displays a second user interface, where the second user interface includes one or more state identifiers corresponding to the one or more first electronic devices, and the one or more state identifiers indicate that the one or more first electronic devices have completed network configuration, or the one or more first electronic devices have connected to a network.

The second user interface may further include information such as the one or more device identifiers corresponding to the one or more first electronic devices.

In this way, after the server verifies that the first electronic device is the valid device, the server associates the first electronic device and the wireless access device with a same account. Therefore, the user may view a network connection status of the second electronic device on an application of the second electronic device. The network connection status includes but is not limited to online, offline, network configuration, network configuration failure, and the like.

With reference to the first aspect, in a possible implementation, before that the first electronic device accesses a non-authentication network of the wireless access device, the method further includes: The first electronic device broadcasts a network configuration information element of the first electronic device, where the network configuration information element is used to enable another electronic device to discover the first electronic device that is in a to-be-network-configured state. The network configuration information element of the first electronic device includes one or more of the following: an identifier of the first electronic device, a capability indicating whether the first electronic device supports interconnection, a physical address of the first electronic device, and the like.

With reference to the first aspect, in a possible implementation, the network configuration information includes a name and a password of the wireless local area network in which the wireless access device is located.

According to a second aspect, an embodiment of this application provides a network configuration method, applied to a first electronic device. The method includes: accessing a non-authentication network of a wireless access device; obtaining a first authorization code, where the first authorization code is generated by a server, and the first authorization code is different from an authorization code received by another electronic device that accesses the non-authentication network of the wireless access device; negotiating with the wireless access device based on the first authorization code to determine a first key; receiving encrypted network configuration information sent by the wireless access device, and decrypting the encrypted network configuration information based on the first key to obtain network configuration information; and connecting, based on the network configuration information, to a wireless local area network in which the wireless access device is located.

In some implementations, the first authorization code is randomly generated by the server in response to a request message of a different electronic device, where an authorization code may be randomly generated by the server according to a preset random number generation algorithm. In some implementations, the server may also generate a same authorization code for different electronic devices.

In some other implementations, the server may also generate the first authorization code and a second authorization code, the server sends the first authorization code and the second authorization code to the wireless access device, the wireless access device locally stores the first authorization code, and the wireless access device sends the second authorization code to the first electronic device. Subsequently, the wireless access device negotiates with the first electronic device based on the first authorization code and the second authorization code to obtain the first key. When the first authorization code is the same as the second authorization code, the wireless access device and the first electronic device perform negotiation based on the same authorization code to obtain the first key. When the first authorization code is different from the second authorization code, the wireless access device and the first electronic device perform negotiation based on the different authorization codes to obtain the first key.

The first electronic device may be any one of the following: a smart light, a smart oven, a smart fan, a smart air conditioner, a smart television, a smart large screen, a smart band, a smartwatch, a smart sound box, a smart refrigerator, a smart door and window, a smart automobile, a smart monitor, a smart robot, a smart camera, or the like.

According to the method in the second aspect, first, manual intervention in a network configuration process can be reduced. Specifically, in the network configuration method, a user does not need to enter a name and a password of the wireless local area network in which the wireless access device is located, and operations are simple. Second, the wireless access device is always in an AP mode in the network configuration process. In this way, an ongoing service of another device connected to the wireless access device is not affected. Third, the server generates different authorization codes for different electronic devices. This ensures that each electronic device uses a different high-security channel. This solution improves transmission security of sensitive information (for example, the name and the password of the wireless local area network in which the wireless access device is located), and ensures security of the network configuration process.

With reference to the second aspect, in a possible implementation, before the obtaining a first authorization code, the method further includes: sending, to the server via the wireless access device, first authentication information locally stored by the first electronic device, where the first authentication information is to be used by the server to determine that the first electronic device is a valid device.

When determining that the first authentication information meets a first condition, the server determines that the first electronic device is the valid device.

In some implementations, the first authentication information includes first registration information.

After the server receives the first request information and before the server receives the first authentication information sent by the wireless access device, the server generates the first registration information (for example, a registration code), and locally stores the first registration information, to obtain second registration information. The server sends the first registration information to the first electronic device via the wireless access device. After receiving the first registration information, the first electronic device locally stores the first registration information.

The first condition includes: The first registration information in the first authentication information is the same as the second registration information that is of the first electronic device and that is locally stored by the server. To be specific, when the server determines that the first registration information sent by the first electronic device via the wireless access device is registration information that is of the first electronic device and that is sent by the server via the wireless access device before, the server may preliminarily determine that the electronic device is the valid device.

In some other implementations, the first authentication information includes first registration information and first verification information. The first verification information may be any one of a digital certificate or a KPI certificate.

The first condition includes: The first registration information in the first authentication information is the same as second registration information that is of the first electronic device and that is locally stored by the server. In addition, the first verification information is valid verification information.

Specifically, before the server determines that the first verification information is the valid verification information, the server generates a first random number and sends the first random number to the first electronic device via the wireless access device. After receiving the first random number, the first electronic device encrypts the first random number based on a first private key, to obtain an encrypted first random number. The first electronic device sends the encrypted first random number to the server via the wireless access device. After receiving the encrypted first random number, the server decrypts the encrypted first random number based on a first public key preset in the first verification information, to obtain the first random number, and then the server determines that the first verification information is the valid verification information.

After the server determines, by using the first registration information, that the first electronic device is the valid device, the server further verifies validity of the first electronic device based on the verification information. This can improve security of subsequent transmission of the network configuration information.

In this way, only after the server determines, by using the first authentication information, that the first electronic device is a valid device, the server generates the first authorization code for the first electronic device and the wireless access device to perform negotiation to obtain the first key to transmit the network configuration information. When the server determines, by using the first authentication information, that the first electronic device is not a valid device, the server does not generate the first authorization code, the first electronic device cannot obtain the network configuration information, and the first electronic device cannot access the wireless local area network in which the wireless access device is located, thereby ensuring security in the network configuration process.

With reference to the second aspect, in a possible implementation, before the sending, to the server via the wireless access device, first authentication information locally stored by the first electronic device, the method further includes: negotiating, based on a locally stored preset parameter, with the wireless access device based on a locally stored preset parameter to obtain a second key; and the sending, to the server via the wireless access device, first authentication information locally stored by the first electronic device specifically includes: encrypting, based on the second key, the first authentication information that is locally stored, to obtain encrypted first authentication information; and sending the encrypted first authentication information to the wireless access device, where the encrypted first authentication information is decrypted by the wireless access device based on the second key, to obtain the first authentication information, and send the first authentication information to the server.

In some implementations, before the wireless access device sends the first registration information to the first electronic device, the wireless access device encrypts the first registration information by using the second key, to obtain the encrypted first registration information. The wireless access device sends the encrypted first registration information to the first electronic device. This can ensure security of transmitting information between the first electronic device and the wireless access device.

In this way, before the first electronic device initiates a registration request to the server (in other words, before the first electronic device sends the first authentication information to the server via the wireless access device), if the first electronic device and the wireless access device may obtain the second key through negotiation by using the locally stored preset parameters, it may be considered that the first electronic device is a preliminarily valid device, and the first electronic device may initiate the registration request to the server via the wireless access device. This can ensure that the first electronic device that initiates the registration request to the server is a preliminarily valid electronic device, that is, the first electronic device stores the preset parameter. In addition, information transmitted between the first electronic device and the wireless access device is encrypted by using the second key and then transmitted, which can ensure security of transmitting information between the first electronic device and the wireless access device.

With reference to the second aspect, in a possible implementation, the first authorization code includes m authorization codes, and m is a positive integer greater than or equal to 1; and the negotiating with the wireless access device based on the first authorization code to determine a first key specifically includes: negotiating, based on x authorization codes in the first authorization code, with the wireless access device based on y authorization codes in the first authorization code to obtain the first key, where x is greater than or equal to 1 and less than or equal to m, and y is greater than or equal to 1 and less than or equal to m.

That is, the server sends the first authorization code to the wireless access device, the wireless access device locally stores the first authorization code, and the wireless access device further needs to send the first authorization code to the first electronic device. The wireless access device and the first electronic device may select a part or all of the authorization codes from the first authorization code to perform negotiation to obtain the first key.

In some implementations, if the x authorization codes in the first authorization code are the same as the y authorization codes in the first authorization code, the wireless access device and the first electronic device perform negotiation based on the same authorization code to obtain the first key.

In some other implementations, if the x authorization codes in the first authorization code are different from the y authorization codes in the first authorization code, the wireless access device and the first electronic device perform negotiation based on the different authorization codes to obtain the first key.

With reference to the second aspect, in a possible implementation, before the accessing a non-authentication network of a wireless access device, the method further includes: receiving access information sent by the wireless access device; and the accessing a non-authentication network of a wireless access device specifically includes: accessing the non-authentication network of the wireless access device based on the access information. The access information of the non-authentication network may include an identifier of the non-authentication network, a physical address of the wireless access device, and the like.

With reference to the second aspect, in a possible implementation, before the accessing a non-authentication network of a wireless access device, the method further includes: broadcasting a network configuration information element of the first electronic device, where the network configuration information element is used to enable another electronic device to discover the first electronic device that is in a to-be-network-configured state.

With reference to the second aspect, in a possible implementation, the network configuration information includes a name and a password of the wireless local area network in which the wireless access device is located.

According to a third aspect, an embodiment of this application provides a network configuration method, applied to a wireless access device. The method includes: sending a first request message to a server after a first electronic device accesses a non-authentication network of the wireless access device, where the first request message is to be used by the server to generate a first authorization code, and the first authorization code is different from an authorization code sent by the wireless access device to another electronic device that accesses the non-authentication network of the wireless access device; obtaining the first authorization code, and negotiating with the first electronic device based on the first authorization code to determine a first key; and encrypting, based on the first key, network configuration information of a wireless local area network in which the wireless access device is located, to obtain encrypted network configuration information, and sending the encrypted network configuration information to the first electronic device, where the encrypted network configuration information is decrypted by the first electronic device based on the first key, to obtain the network configuration information, and connect, based on the network configuration information, to the wireless local area network in which the wireless access device is located.

In some implementations, the first authorization code is randomly generated by the server in response to a request message of a different electronic device, where an authorization code may be randomly generated by the server according to a preset random number generation algorithm. In some implementations, the server may also generate a same authorization code for different electronic devices.

In some other implementations, the server may also generate the first authorization code and a second authorization code, the server sends the first authorization code and the second authorization code to the wireless access device, the wireless access device locally stores the first authorization code, and the wireless access device sends the second authorization code to the first electronic device. Subsequently, the wireless access device negotiates with the first electronic device based on the first authorization code and the second authorization code to obtain the first key. When the first authorization code is the same as the second authorization code, the wireless access device and the first electronic device perform negotiation based on the same authorization code to obtain the first key. When the first authorization code is different from the second authorization code, the wireless access device and the first electronic device perform negotiation based on the different authorization codes to obtain the first key.

According to the method in the third aspect, first, manual intervention in a network configuration process can be reduced. Specifically, in the network configuration method, a user does not need to enter a name and a password of the wireless local area network in which the wireless access device is located, and operations are simple. Second, the wireless access device is always in an AP mode in the network configuration process. In this way, an ongoing service of another device connected to the wireless access device is not affected. Third, the server generates different authorization codes for different electronic devices. This ensures that each electronic device uses a different high-security channel. This solution improves transmission security of sensitive information (for example, the name and the password of the wireless local area network in which the wireless access device is located), and ensures security of the network configuration process.

With reference to the third aspect, in a possible implementation, before the obtaining the first authorization code, the method further includes: receiving first authentication information that is locally stored by the first electronic device and that is sent by the first electronic device; and sending the first authentication information to the server, where the first authentication information is to be used by the server to determine that the first electronic device is a valid device.

When determining that the first authentication information meets a first condition, the server determines that the first electronic device is the valid device.

In some implementations, the first authentication information includes first registration information.

After the server receives the first request information and before the server receives the first authentication information sent by the wireless access device, the server generates the first registration information (for example, a registration code), and locally stores the first registration information, to obtain second registration information. The server sends the first registration information to the first electronic device via the wireless access device. After receiving the first registration information, the first electronic device locally stores the first registration information.

The first condition includes: The first registration information in the first authentication information is the same as the second registration information that is of the first electronic device and that is locally stored by the server. To be specific, when the server determines that the first registration information sent by the first electronic device via the wireless access device is registration information that is of the first electronic device and that is sent by the server via the wireless access device before, the server may preliminarily determine that the electronic device is the valid device.

In some other implementations, the first authentication information includes first registration information and first verification information. The first verification information may be any one of a digital certificate or a KPI certificate.

The first condition includes: The first registration information in the first authentication information is the same as second registration information that is of the first electronic device and that is locally stored by the server. In addition, the first verification information is valid verification information.

Specifically, before the server determines that the first verification information is the valid verification information, the server generates a first random number and sends the first random number to the first electronic device via the wireless access device. After receiving the first random number, the first electronic device encrypts the first random number based on a first private key, to obtain an encrypted first random number. The first electronic device sends the encrypted first random number to the server via the wireless access device. After receiving the encrypted first random number, the server decrypts the encrypted first random number based on a first public key preset in the first verification information, to obtain the first random number, and then the server determines that the first verification information is the valid verification information.

After the server determines, by using the first registration information, that the first electronic device is the valid device, the server further verifies validity of the first electronic device based on the verification information. This can improve security of subsequent transmission of the network configuration information.

In this way, only after the server determines, by using the first authentication information, that the first electronic device is a valid device, the server generates the first authorization code for the first electronic device and the wireless access device to perform negotiation to obtain the first key to transmit the network configuration information. When the server determines, by using the first authentication information, that the first electronic device is not a valid device, the server does not generate the first authorization code, the first electronic device cannot obtain the network configuration information, and the first electronic device cannot access the wireless local area network in which the wireless access device is located, thereby ensuring security in the network configuration process.

With reference to the third aspect, in a possible implementation, before the receiving first authentication information that is locally stored by the first electronic device and that is sent by the first electronic device, the method further includes: negotiating, based on a locally stored preset parameter, with the first electronic device based on a locally stored preset parameter to obtain a second key; the receiving first authentication information that is locally stored by the first electronic device and that is sent by the first electronic device specifically includes: receiving first authentication information that is encrypted based on the second key and that is sent by the first electronic device; and before the sending the first authentication information to the server, the method specifically includes: decrypting, based on the second key, the encrypted first authentication information, to obtain the first authentication information.

In some implementations, before the wireless access device sends the first registration information to the first electronic device, the wireless access device encrypts the first registration information by using the second key, to obtain the encrypted first registration information. The wireless access device sends the encrypted first registration information to the first electronic device. This can ensure security of transmitting information between the first electronic device and the wireless access device.

In this way, before the first electronic device initiates a registration request to the server (in other words, before the first electronic device sends the first authentication information to the server via the wireless access device), if the first electronic device and the wireless access device may obtain the second key through negotiation by using the locally stored preset parameters, it may be considered that the first electronic device is a preliminarily valid device, and the first electronic device may initiate the registration request to the server via the wireless access device. This can ensure that the first electronic device that initiates the registration request to the server is a preliminarily valid electronic device, that is, the first electronic device stores the preset parameter. In addition, information transmitted between the first electronic device and the wireless access device is encrypted by using the second key and then transmitted, which can ensure security of transmitting information between the first electronic device and the wireless access device.

With reference to the third aspect, in a possible implementation, the first authorization code includes m authorization codes, and m is a positive integer greater than or equal to 1; and the negotiating with the first electronic device to determine a first key specifically includes: negotiating, based on x authorization codes in the first authorization code, with the first electronic device based on y authorization codes in the first authorization code to obtain the first key, where x is greater than or equal to 1 and less than or equal to m, and y is greater than or equal to 1 and less than or equal to m.

That is, the server sends the first authorization code to the wireless access device, the wireless access device locally stores the first authorization code, and the wireless access device further needs to send the first authorization code to the first electronic device. The wireless access device and the first electronic device may select a part or all of the authorization codes from the first authorization code to perform negotiation to obtain the first key.

In some implementations, if the x authorization codes in the first authorization code are the same as the y authorization codes in the first authorization code, the wireless access device and the first electronic device perform negotiation based on the same authorization code to obtain the first key.

In some other implementations, if the x authorization codes in the first authorization code are different from the y authorization codes in the first authorization code, the wireless access device and the first electronic device perform negotiation based on the different authorization codes to obtain the first key.

With reference to the third aspect, in a possible implementation, before that a first electronic device accesses a non-authentication network of the wireless access device, the method further includes: sending access information of the non-authentication network in response to a first user operation, where the access information is to be used by the first electronic device to access the non-authentication network of the wireless access device. The first user operation may be a pressing operation performed on a network configuration button of the wireless access device, and the access information of the non-authentication network may include an identifier of the non-authentication network, a physical address of the wireless access device, and the like. The wireless access device sends the access information of the non-authentication network of the wireless access device only after the wireless access device receives the first user operation (that is, obtains authorization from the user).

In some implementations, the wireless access device continuously sends the access information of the non-authentication network in response to the first user operation.

After the first electronic device accesses the wireless local area network in which the wireless access device is located, the third electronic device accesses a non-authentication network of the wireless access device. The wireless access device sends a second request message to the server. After receiving the second request message, the server generates the second authorization code. The second authorization code is different from the authorization code generated after the server receives the request message that is of the another electronic device and that is sent by the wireless access device. The wireless access device and the third electronic device obtain the second authorization code, and perform negotiation based on the second authorization code to obtain the second key. The wireless access device encrypts, based on the second key, the network configuration information of the wireless local area network in which the wireless access device is located, to obtain encrypted network configuration information, and sends the encrypted network configuration information to the third electronic device. The third electronic device receives the encrypted network configuration information, decrypts, based on the second key, the encrypted network configuration information to obtain the network configuration information, and connects, based on the network configuration information, to the wireless local area network in which the wireless access device is located. In this way, the wireless access device needs to receive only one user operation, and continuously sends the access information of the non-authentication network. Before the wireless access device stops sending the access information of the non-authentication network, one or more electronic devices may connect to the non-authentication network of the wireless access device. In this case, the wireless access device may complete a network configuration procedure with one or more other electronic devices (for example, the third electronic device) like a network configuration procedure with the first electronic device. In other words, the wireless access device needs to receive only one user operation, and can complete a network configuration procedure with a plurality of electronic devices. Compared with the fact that a current wireless access device receives one user operation and can complete a network configuration procedure with only one electronic device, this improves network configuration efficiency of the electronic device.

In some implementations, after the wireless access device completes a network configuration procedure with the third electronic device, and the wireless access device determines that a quantity of electronic devices that connect to the non-authentication network of the wireless access device is 0, the wireless access device stops sending the access information of the non-authentication network.

In some implementations, after the wireless access device completes a network configuration procedure with the third electronic device, a period of time pasts after the wireless access device determines that a quantity of electronic devices that connect to the non-authentication network of the wireless access device is 0. In this period of time, the wireless access device still continuously sends the access information of the non-authentication network. If no other electronic device connects to the non-authentication network of the wireless access device, the wireless access device stops sending the access information of the non-authentication network.

With reference to the third aspect, in a possible implementation, before that a first electronic device accesses a non-authentication network of the wireless access device, the method further includes: receiving a network configuration information element that is of the first electronic device and that is broadcast by the first electronic device, where the network configuration information element is used to enable another electronic device to discover the first electronic device that is in a to-be-network-configured state.

With reference to the third aspect, in a possible implementation, the network configuration information includes a name and a password of the wireless local area network in which the wireless access device is located.

According to a fourth aspect, an embodiment of this application provides a network configuration method, applied to a server. The method includes: receiving a first request message, and generating a first authorization code, where the first authorization code is different from an authorization code generated after the server receives a request message that is of another electronic device and that is sent by a wireless access device; and sending the first authorization code to the wireless access device and a first electronic device, where the first authorization code is to be used by the wireless access device and the first electronic device to perform negotiation to obtain a first key. The first key is to be used by the wireless access device to encrypt, based on the first key, network configuration information of a wireless local area network in which the wireless access device is located, to obtain encrypted network configuration information, and send the encrypted network configuration information to the first electronic device; and the encrypted network configuration information is decrypted by the first electronic device based on the first key, to obtain the network configuration information, and connect, based on the network configuration information, to the wireless local area network in which the wireless access device is located.

In some implementations, the first authorization code is randomly generated by the server in response to a request message of a different electronic device, where an authorization code may be randomly generated by the server according to a preset random number generation algorithm. In some implementations, the server may also generate a same authorization code for different electronic devices.

In some other implementations, the server may also generate the first authorization code and a second authorization code, the server sends the first authorization code and the second authorization code to the wireless access device, the wireless access device locally stores the first authorization code, and the wireless access device sends the second authorization code to the first electronic device. Subsequently, the wireless access device negotiates with the first electronic device based on the first authorization code and the second authorization code to obtain the first key. When the first authorization code is the same as the second authorization code, the wireless access device and the first electronic device perform negotiation based on the same authorization code to obtain the first key. When the first authorization code is different from the second authorization code, the wireless access device and the first electronic device perform negotiation based on the different authorization codes to obtain the first key.

The first electronic device may be any one of the following: a smart light, a smart oven, a smart fan, a smart air conditioner, a smart television, a smart large screen, a smart band, a smartwatch, a smart sound box, a smart refrigerator, a smart door and window, a smart automobile, a smart monitor, a smart robot, a smart camera, or the like.

According to the method in the fourth aspect, first, manual intervention in a network configuration process can be reduced. Specifically, in the network configuration method, a user does not need to enter a name and a password of the wireless local area network in which the wireless access device is located, and operations are simple. Second, the wireless access device is always in an AP mode in the network configuration process. In this way, an ongoing service of another device connected to the wireless access device is not affected. Third, the server generates different authorization codes for different electronic devices. This ensures that each electronic device uses a different high-security channel. This solution improves transmission security of sensitive information (for example, the name and the password of the wireless local area network in which the wireless access device is located), and ensures security of the network configuration process.

With reference to the fourth aspect, in a possible implementation, before the first authorization code is generated, the method further includes: receiving first authentication information that is locally stored by the first electronic device and that is sent by the wireless access device, and determining, based on the first authentication information, that the first electronic device is a valid device.

When determining that the first authentication information meets a first condition, the server determines that the first electronic device is the valid device.

In some implementations, the first authentication information includes first registration information.

After the server receives the first request information and before the server receives the first authentication information sent by the wireless access device, the server generates the first registration information (for example, a registration code), and locally stores the first registration information, to obtain second registration information. The server sends the first registration information to the first electronic device via the wireless access device. After receiving the first registration information, the first electronic device locally stores the first registration information.

The first condition includes: The first registration information in the first authentication information is the same as the second registration information that is of the first electronic device and that is locally stored by the server. To be specific, when the server determines that the first registration information sent by the first electronic device via the wireless access device is registration information that is of the first electronic device and that is sent by the server via the wireless access device before, the server may preliminarily determine that the electronic device is the valid device.

In some other implementations, the first authentication information includes first registration information and first verification information. The first verification information may be any one of a digital certificate or a KPI certificate.

The first condition includes: The first registration information in the first authentication information is the same as second registration information that is of the first electronic device and that is locally stored by the server. In addition, the first verification information is valid verification information.

Specifically, before the server determines that the first verification information is the valid verification information, the server generates a first random number and sends the first random number to the first electronic device via the wireless access device. After receiving the first random number, the first electronic device encrypts the first random number based on a first private key, to obtain an encrypted first random number. The first electronic device sends the encrypted first random number to the server via the wireless access device. After receiving the encrypted first random number, the server decrypts the encrypted first random number based on a first public key preset in the first verification information, to obtain the first random number, and then the server determines that the first verification information is the valid verification information.

After the server determines, by using the first registration information, that the first electronic device is the valid device, the server further verifies validity of the first electronic device based on the verification information. This can improve security of subsequent transmission of the network configuration information.

In this way, only after the server determines, by using the first authentication information, that the first electronic device is a valid device, the server generates the first authorization code for the first electronic device and the wireless access device to perform negotiation to obtain the first key to transmit the network configuration information. When the server determines, by using the first authentication information, that the first electronic device is not a valid device, the server does not generate the first authorization code, the first electronic device cannot obtain the network configuration information, and the first electronic device cannot access the wireless local area network in which the wireless access device is located, thereby ensuring security in the network configuration process.

With reference to the fourth aspect, in a possible implementation, the network configuration information includes a name and a password of the wireless local area network in which the wireless access device is located.

According to a fifth aspect, an embodiment of this application provides an electronic device, where the electronic device is a first electronic device, and the first electronic device includes one or more processors and one or more memories. The one or more memories are coupled to the one or more processors, the one or more memories are configured to store computer program code, and the computer program code includes computer instructions. The one or more processors invoke the computer instructions, so that the first electronic device performs the method steps performed by the first electronic device in any one of the possible implementations of the foregoing aspects.

According to a sixth aspect, an embodiment of this application provides a wireless access device, where the wireless access device includes one or more processors and one or more memories. The one or more memories are coupled to the one or more processors, the one or more memories are configured to store computer program code, and the computer program code includes computer instructions. The one or more processors invoke the computer instructions, so that the wireless access device performs the method steps performed by the wireless access device in any one of the possible implementations of the foregoing aspects.

According to a seventh aspect, an embodiment of this application provides a chip apparatus, where the chip apparatus includes at least one processor and a memory. The memory is configured to store computer program code, and the computer program code includes computer instructions. The at least one processor invokes the computer instructions, so that a first electronic device on which the chip apparatus is installed performs the method steps performed by the first electronic device in any one of the possible implementations of the foregoing aspects.

According to an eighth aspect, an embodiment of this application provides a chip apparatus, where the chip apparatus includes at least one processor and a memory. The memory is configured to store computer program code, and the computer program code includes computer instructions. The at least one processor invokes the computer instructions, so that a wireless access device on which the chip apparatus is installed performs the method steps performed by the wireless access device in any one of the possible implementations of the foregoing aspects.

According to a ninth aspect, an embodiment of this application provides a readable storage medium, configured to store computer instructions. When the computer instructions are run on a first electronic device, the first electronic device is enabled to perform the method steps performed by the first electronic device in any one of the possible implementations of the foregoing aspects.

According to a tenth aspect, an embodiment of this application provides a readable storage medium, configured to store computer instructions. When the computer instructions are run on a wireless access device, the wireless access device is enabled to perform the method steps performed by the wireless access device in any one of the possible implementations of the foregoing aspects.

According to an eleventh aspect, an embodiment of this application provides a computer program product. When the computer program product runs on a first electronic device, the first electronic device is enabled to perform the method steps performed by the first electronic device in any one of the possible implementations of the foregoing aspects.

According to a twelfth aspect, an embodiment of this application provides a computer program product. When the computer program product runs on a wireless access device, the wireless access device is enabled to perform the method steps performed by the wireless access device in any one of the possible implementations of the foregoing aspects.

DESCRIPTION OF EMBODIMENTS

Figure 1:
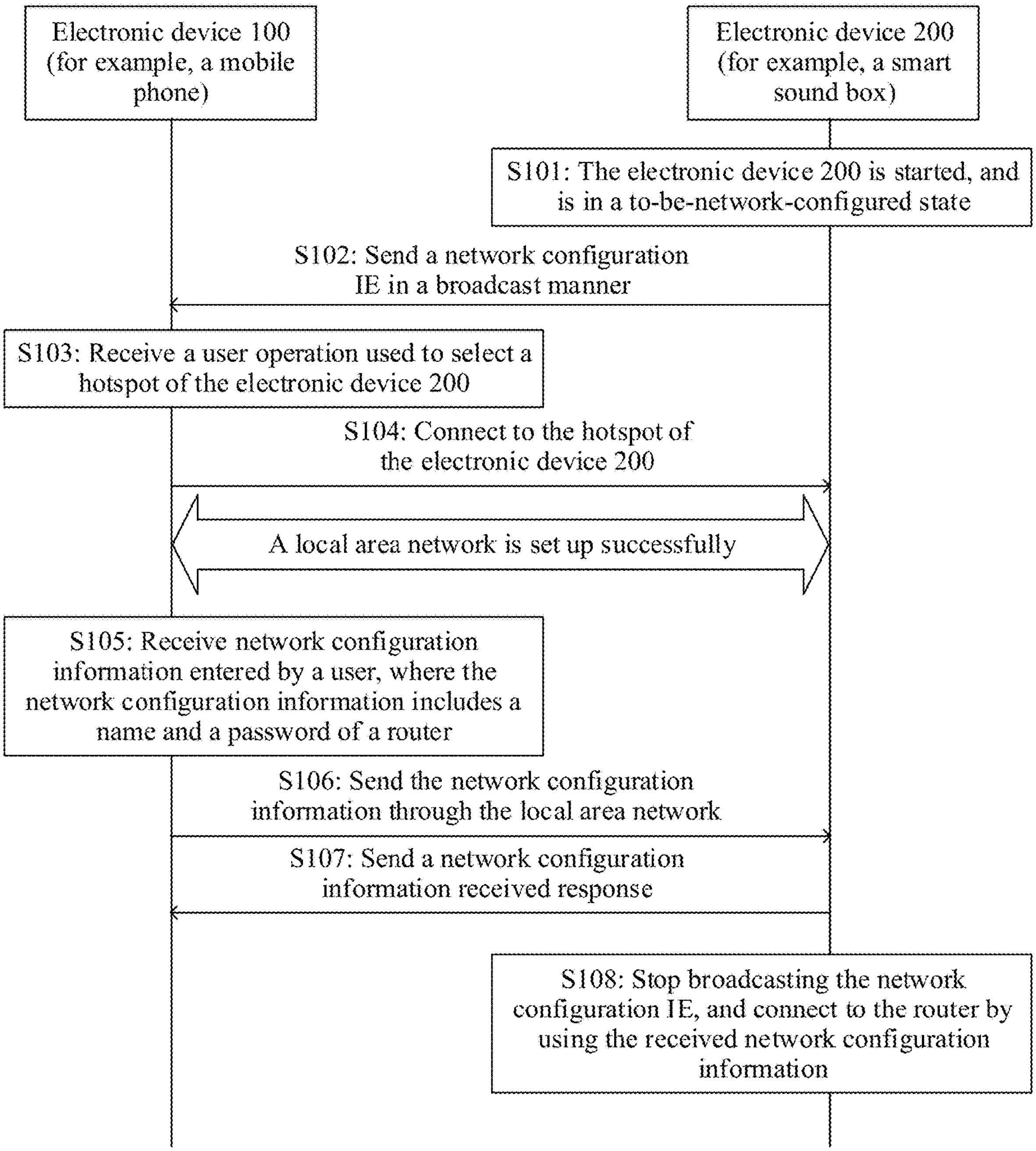
FIG. 1 is a flowchart of a method of a soft access point network configuration mode according to an embodiment of this application.

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (user interface, UI)" in the specification, claims, and accompanying drawings of this application is a medium interface for interaction and information exchange between a user and an application or an operating system, and implements conversion between an internal form of information and a form acceptable to the user. A user interface of an application is source code written in a specific computer language such as Java or an extensible markup language (extensible markup language, XML). Interface source code is parsed and rendered on a terminal device, and finally is presented as user-recognizable content, for example, a control such as an image, a text, or a button. The control (control), also referred to as a widget (widget), is a basic element on the user interface. Typical controls include a toolbar (toolbar), a menu bar (menu bar), an input box, a button (button), a scrollbar (scrollbar), an image, and a text. An attribute and content of a control on an interface are defined by using a tag or a node. For example, the control included in the interface is defined in the XML by using a node, for example, <Textview>, <ImgView>, or <Video View>. One node corresponds to one control or one attribute on the interface. After being parsed and rendered, the node is presented as user-visible content. In addition, interfaces of many applications such as a hybrid application (hybrid application) usually further include a web page. The web page, also referred to as a page, may be understood as a special control embedded in an application interface. The web page is source code written in a specific computer language, for example, hypertext markup language (hypertext markup language, HTML), cascading style sheets (cascading style sheets, CSS), or a Java script (JavaScript, JS). A browser or a web page display component whose function is similar to that of a browser may load and display the web page source code as content that can be identified by the user. Specific content included in the web page is also defined by using a tag or a node in the web page source code. For example, an element and an attribute of the web page are defined in the HTML by using <p>, <img>, <video>, or <canvas>.

The user interface is usually represented in a form of a graphical user interface (graphical user interface, GUI), and is a user interface that is related to a computer operation and that is displayed in a graphic manner. The graphical user interface may be an interface element such as a window or a control displayed on a display of an electronic device.

First, several commonly used network configuration methods are introduced.

Mode 1: Soft Access Point (Soft Access Point, softAP) Network Configuration Mode FIG. 1 is a flowchart of an example of a method for configuring a network for an electronic device 200 by an electronic device 100 in a softAP network configuration mode.

As shown in FIG. 1, a softAP network configuration method may include step S101 to step S108.

S101: The electronic device 200 is started, and is in a to-be-network-configured state.

That the electronic device 200 is in a to-be-network-configured state may also be referred to as that the electronic device 200 is in an AP mode.

When a user operation used to trigger the electronic device 200 (for example, a smart sound box) to enter a to-be-network-configured state is received, the electronic device 100 may start a hotspot. The user operation used to trigger the electronic device 200 to be started and enter the to-be-network-configured state may be a touch and hold operation (for example, touch and hold for 3 seconds) performed on a related button (for example, a network configuration button) on the electronic device 200.

Optionally, the network configuration button may be a "Hi button", a "WPS button", or the like. A name of the network configuration button is not limited in this application.

A type of the network configuration button is a pressing type, or may be a rotating type, or may be a flipping type. The type of the network configuration button is not limited in this application.

In some embodiments, the user operation used to trigger the electronic device 200 to be started and enter the to-be-network-configured state may be an operation of powering on the electronic device 200 that has not been connected to a wireless network in which another device is located, or may be an operation of powering on the electronic device 200 that has been connected to a wireless network in which another device is located and that is restored to factory settings.

The user operation used to trigger the electronic device 200 to be started and enter the to-be-network-configured state is not limited in this embodiment of this application. During actual application, the electronic device 200 may enter the to-be-network-configured state in a plurality of manners, for example, by using a smart remote control or a mobile phone application APP.

S102: The electronic device 200 may send a network configuration information element (information element, IE) in a broadcast manner.

In response to the fact that the electronic device 200 is in the to-be-network-configured state, the electronic device 200 sends the network configuration IE of the electronic device 200 in a broadcast manner.

The network configuration IE of the electronic device 200 may include but is not limited to: an identifier of the electronic device 200, a capability indicating whether the electronic device 200 supports interconnection, a physical address of the electronic device 200, and the like. The network configuration IE of the electronic device 200 may further include more other information, for example, a vendor of the electronic device 200. The network configuration IE of the electronic device 200 is not limited in this application.

It should be noted that, before the electronic device 200 receives network configuration information, the electronic device 200 may continuously broadcast the network configuration IE of the electronic device 200.

S103: The electronic device 100 may receive the network configuration IE of the electronic device 200, and receive a user operation used to select to connect to a hotspot of the electronic device 200.

S104: The electronic device 100 may connect to the hotspot of the electronic device 200.

In some embodiments, the electronic device 100 may receive a network configuration IE of at least one electronic device. The at least one electronic device includes the electronic device 200. The electronic device 100 may display a name of a hotspot of the at least one electronic device. In response to the user operation used to select the hotspot of the electronic device 200, the electronic device 100 may connect to the hotspot of the electronic device 200 based on the physical address of the electronic device 200 in the network configuration IE.

When the hotspot of the electronic device 200 is connected, the electronic device 100 and the electronic device 200 may establish a local area network between the devices. The local area network may be used to transmit data between the electronic device 100 and the electronic device 200.

S105: The electronic device 100 may receive network configuration information entered by a user, where the network configuration information may include a name and a password of a router.

Figure 1A:
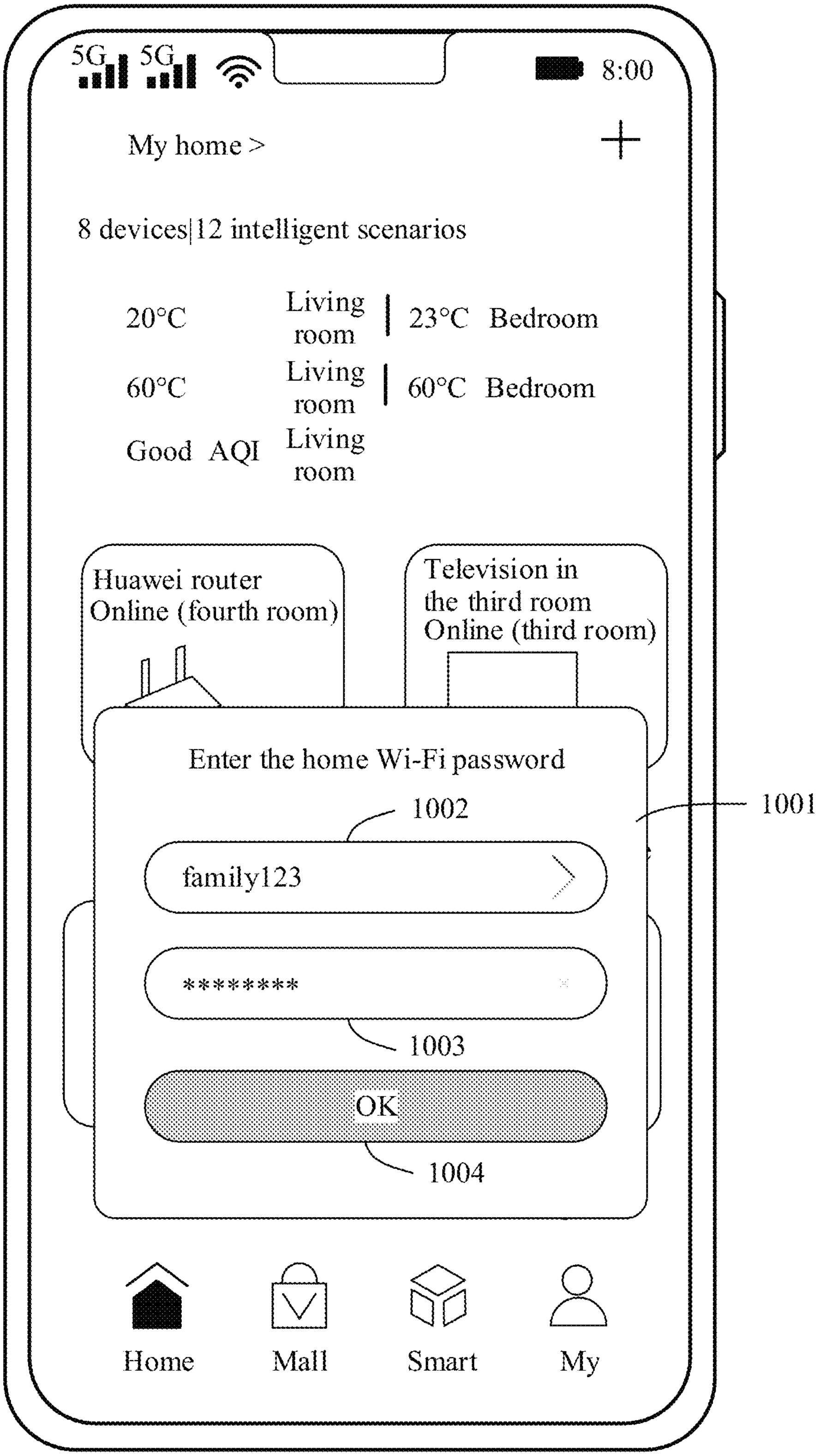
FIG. 1A is a diagram of a network configuration interface according to an embodiment of this application.

For example, the electronic device 100 may display a user interface 10 shown in FIG. 1A. The user interface 10 may include a network configuration information input box 1001 that is displayed on a home screen of an AI life application in a floating manner. The network configuration information input box 1001 may alternatively be displayed on another user interface (for example, a home screen of the electronic device 100) in a floating manner. This is not limited in this application. The network configuration information input box 1001 may include a name input box 1002, a password input box 1003, and a confirmation control 1004. The name input box 1002 may be configured to enter the name of the router (namely, a name of to-be-connected Wi-Fi) or select the name of the router from a list. The password input box 1003 may be configured to enter the password of the router (namely, a password of to-be-connected Wi-Fi). The confirmation control 1004 may be configured to trigger the electronic device 100 to send the received name and password of the router to the electronic device 200.

FIG. 1A provides merely an example description of a user interface on which the electronic device 100 receives the network configuration information entered by the user in this application, but does not constitute a limitation on this application.

In some embodiments, the electronic device 100 stores the foregoing network configuration information. The electronic device 100 may not require the user to enter the network configuration information. To be specific, in the network configuration information input box 1001 shown in FIG. 1A, the name of the router in the name input box 1002 and the password of the router in the password input box 1003 are automatically filled in corresponding positions, and the user does not need to enter the name of the router and the password of the router again. The user only needs to tap the confirmation control 1004, and the electronic device 100 may send the name and the password of the router to the electronic device 200.

S106: The electronic device 100 may send the network configuration information to the electronic device 200 through the local area network.

The electronic device 100 may send the network configuration information to the electronic device 200 through the local area network between the electronic device 100 and the electronic device 200.

S107: The electronic device 200 may send a network configuration information received response to the electronic device 100. This step is optional.

When receiving the network configuration information, the electronic device 200 may send the network configuration information received response to the electronic device 100, to indicate the electronic device 100 that the electronic device 200 receives the network configuration information.

It should be noted that, when sending the network configuration information, the electronic device 100 may encrypt the network configuration information. When receiving encrypted network configuration information, the electronic device 200 may perform decryption to obtain the network configuration information. The foregoing encryption and decryption methods are not limited in embodiments of this application.

S108: The electronic device 200 may stop broadcasting the network configuration IE, and connect to the router by using the received network configuration information.

When the hotspot is off, the electronic device 200 may stop broadcasting the network configuration IE. The electronic device 200 may establish a connection to the router 300 by using the received network configuration information.

In the softAP network configuration mode in the embodiment shown of FIG. 1, before the electronic device 200 receives the network configuration information sent by the electronic device 100, the electronic device 200 works in an access point (access point, AP) mode, and the electronic device 100 sends the network configuration information of the router 300 to the electronic device 200 by connecting to the hotspot of the electronic device 200. After the electronic device 200 receives the network configuration information, the electronic device 200 switches from the AP mode to a station (station, STA) mode, and connects to the router 300 based on the network configuration information.

A method for performing softAP network configuration between the electronic device 100 and the electronic device 200 is not limited in this embodiment of this application. In a softAP network configuration process, the electronic device 100 and the electronic device 200 may further exchange more or less information.

It can be learned from the foregoing analysis that, when the electronic device 200 connects to the router 300 in the soft access point network configuration mode, the user needs to start a first application (for example, the AI life application) to perform an operation, for example, enter the name and the password of the router and tap OK, so that the electronic device 200 can obtain the name and the password of the router 300 and connect to the router 300. It can be learned that the entire process requires user intervention to complete a network configuration procedure of the electronic device 200. In addition, when a plurality of to-be-network-configured devices need to be configured with a network, the user needs to repeat a same operation a plurality of times, so that the plurality of to-be-network-configured devices are sequentially connected to the router 300. The operations are complex.

Mode 2: Multicast Network Configuration Solution

Figure 2:
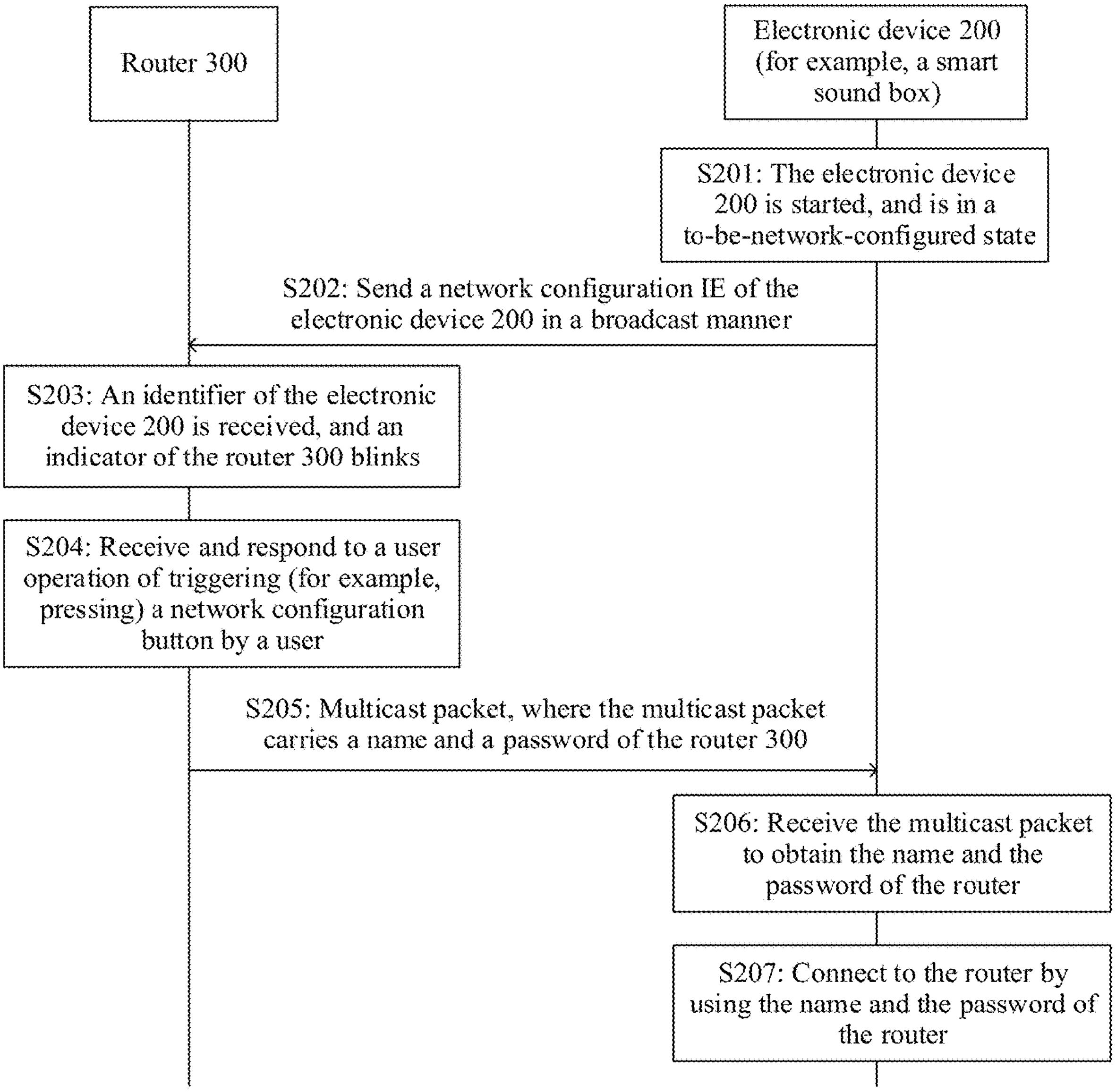
FIG. 2 is a flowchart of a method of a multicast network configuration solution according to an embodiment of this application.

FIG. 2 is a flowchart of an example of a method for configuring a network for an electronic device 200 by an electronic device 100 by using a multicast network configuration solution.

S201: The electronic device 200 (for example, a smart sound box) is started, and the electronic device 200 is in a to-be-network-configured state.

S202: The electronic device 200 sends a network configuration IE of the electronic device 200 in a broadcast manner.

In S201, a user operation of enabling the electronic device 200 in the to-be-network-configured state is the same as the user operation of enabling the electronic device 200 in the to-be-network-configured state in S101. For details, refer to the related descriptions in S101. Details are not described in this embodiment of this application again.

In some embodiments, that the electronic device 200 is in a to-be-network-configured state may also be referred to as that the electronic device 200 is in an AP mode.

In response to the fact that the electronic device 200 is in the to-be-network-configured state, the electronic device 200 sends the network configuration IE of the electronic device 200 in a broadcast manner.

S203: A router 300 receives the network configuration IE of the electronic device 200, and an indicator of the router 300 blinks.

The router 300 receives the network configuration IE of the electronic device 200, and identifies that the electronic device 200 is in the to-be-network-configured state. The indicator of the router 300 blinks, to prompt a user that the router 300 discovers a to-be-network-configured device (for example, the electronic device 200).

In addition to the blinking of the indicator of the router 300, the router 300 may further prompt, in another manner, the user that the router 300 discovers the to-be-network-configured device. This is not limited in this application.

S204: The router 300 receives an operation of triggering (for example, pressing) a network configuration button by the user.

S205: The router 300 sends a multicast packet in response to the operation of triggering (for example, pressing) the network configuration button by the user, where the multicast packet carries a name and a password of the router 300.

The indicator of the router 300 blinks, to prompt the user that the router 300 discovers the to-be-network-configured device. The router 300 receives the operation of triggering (for example, pressing) the network configuration button by the user, and the router 300 sends the multicast packet, where the multicast packet carries the name and the password of the router 300.

The multicast packet may further carry other information. This is not limited in this application.

Optionally, the router 300 may encrypt the multicast packet in preset encryption and decryption manners, and then send an encrypted multicast packet to the electronic device 200. S206: The electronic device 200 receives the multicast packet, and obtains the name and the password that are of the router 300 and that are carried in the multicast packet.

The electronic device 200 receives the multicast packet, and obtains the name and the password that are of the router 300 and that are carried in the multicast packet.

Optionally, the electronic device 200 receives the multicast packet encrypted in the preset encryption and decryption manners, decrypts, in the preset decryption manner, the multicast packet encrypted in the preset encryption and decryption manners, and parses out the name and the password that are of the router 300 and that are carried in the multicast packet.

Herein, the preset encryption manner and the preset decryption manner are preset before the router 300 and the electronic device 200 are delivered from a factory. The router 300 encrypts the multicast packet in a preset protocol-specified encryption manner, and then the electronic device 200 may decrypt the encrypted multicast packet in a preset protocol-specified decryption manner.

S207: The electronic device 200 connects to the router 300 based on the name and the password of the router 300.

It can be learned from the foregoing analysis that, before the electronic device 200 connects to the router 300 based on the name and the password of the router 300, the electronic device 200 is always in the AP mode, and the electronic device 100 does not establish a connection to the router 300. The electronic device 200 and the router 300 need to transmit network configuration information by using a reserved field of the multicast packet. This manner does not comply with a wireless local area network standard specified in the current 802.11 protocol. In addition, when transmitting the network configuration information of the router 300 by using the multicast packet, the electronic device 200 and the router 300 needs to comply with the same encryption and decryption manners. In other words, the encryption and decryption manners are preset before the electronic device 200 and the router 300 are delivered from a factory. If the electronic device 200 and the router 300 300 are not produced by a same vendor, the electronic device 200 cannot complete a network configuration procedure with the router 300 because devices from different vendors have a compatibility problem.

Mode 3: Artificial intelligence of things (artificial intelligence of things, AIoT) antenna-based network configuration solution AIoT is a technology that combines artificial intelligence technologies with internet of things infrastructure to implement more efficient internet of things operations, improve human-machine interaction, and enhance data management and analysis capabilities. When a router 300 includes an AIoT antenna, network configuration of an electronic device 200 may be completed in Mode 3. The AIoT antenna may be an antenna configured to discover and connect to a device that is in a to-be-network-configured state. In Mode 3, the AIoT antenna is additionally mounted on the router 300, so that the router 300 can work in a mode similar to that of the electronic device 100 in Mode 1. In this way, the router 300 can send, by using the AIoT antenna, a name and a password of the router 300 to a to-be-network-configured device (for example, the electronic device 200).

Specifically, if the router 300 does not have the AIoT antenna, after the router 300 discovers the to-be-network-configured device, the router 300 needs to switch a working mode from an AP mode to a STA mode, and connect to a hotspot of the to-be-network-configured device. In this way, the router 300 can send network configuration information to the to-be-network-configured device. However, when the router 300 needs to switch the working mode from the AP mode to the STA mode, another electronic device (for example, an electronic device 100) connects to a wireless network in which the router 300 is located, and performs a video call with another electronic device (for example, a tablet) through the wireless network in which the router 300 is located. However, if the router 300 switches the working mode from the AP mode to the STA mode, the router 300 cannot provide a network service for the electronic device 100 connected to the wireless network in which the router 300 is located. In this case, an ongoing service of the electronic device 100 is affected. For example, a problem that the video call between the electronic device 100 and the tablet is frozen or even interrupted occurs.

The AIoT antenna on the router 300 can well resolve this problem. To be specific, the router 300 may receive, by using the AIoT antenna, a broadcast frame sent by the electronic device 200, and discover the electronic device 200 that is in the to-be-network-configured state. Then, the router 300 may be connected to a hotspot of the electronic device 200 by using the AIoT antenna, and the router 300 sends the network configuration information to the electronic device 200 by using the AIoT antenna. In this way, the router 300 may always work in the AP mode, and an ongoing service of an electronic device connected to the wireless network in which the router 300 is located is not affected. In some embodiments, the AIoT antenna may also be referred to as a smart antenna for short.

Figure 3:
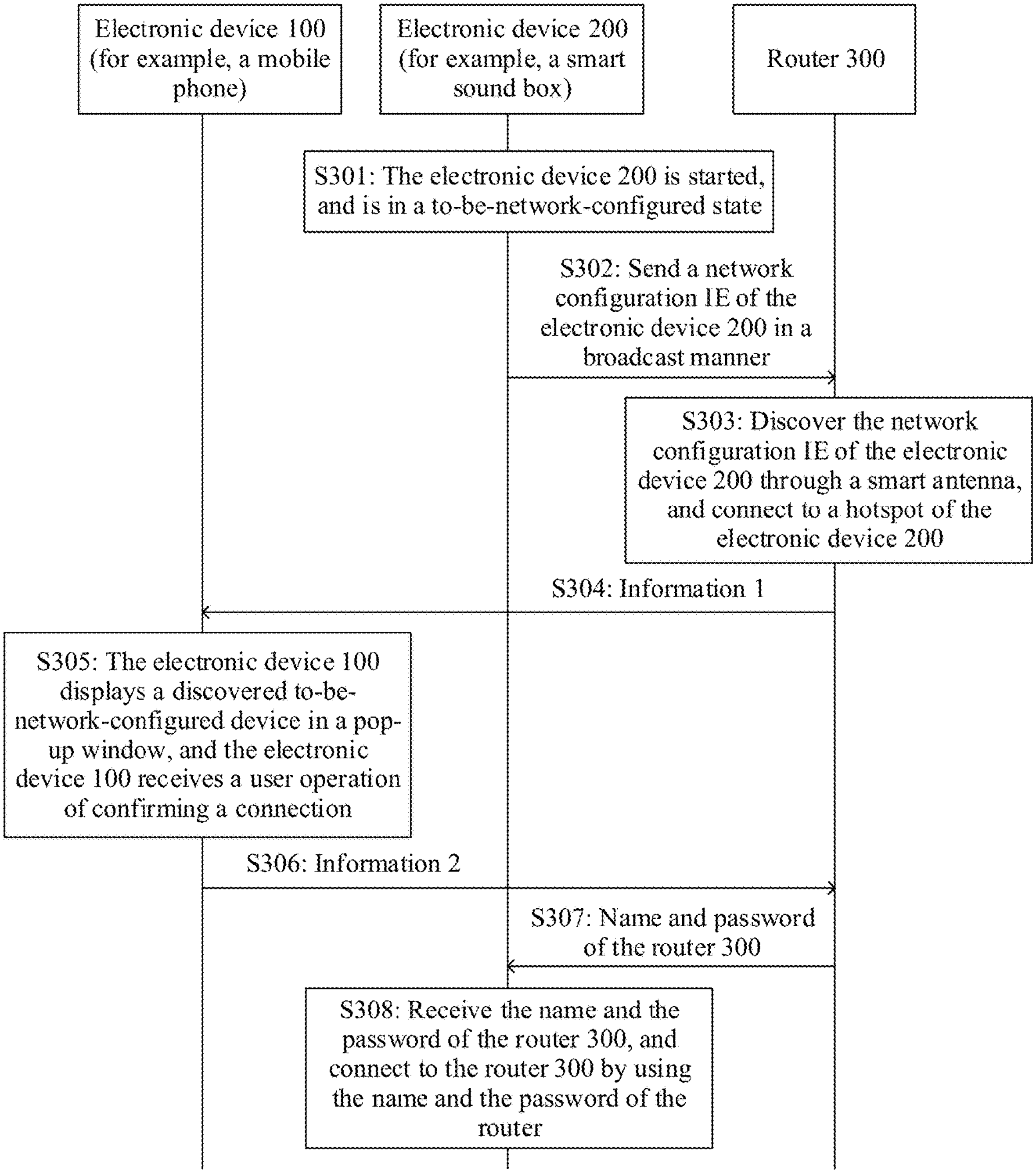
FIG. 3 is a flowchart of a method of an artificial intelligence of things antenna-based network configuration solution according to an embodiment of this application.

FIG. 3 is a flowchart of an example of a method for configuring a network for an electronic device 200 by an electronic device 100 by using an AIoT antenna.

Mode 3 May Include the Following Steps.

S301: The electronic device 200 (for example, a smart sound box) is started, and the electronic device 200 is in a to-be-network-configured state. The to-be-network-configured state is a state of waiting for receiving network configuration information.

In S301, a user operation of enabling the electronic device 200 in the to-be-network-configured state is the same as the user operation of enabling the electronic device 200 in the to-be-network-configured state in S101. For details, refer to the related descriptions in S101. Details are not described in this embodiment of this application again.

S302: In response to the fact that the electronic device 200 is in the to-be-network-configured state, the electronic device 200 sends a configuration IE of the electronic device 200 in a broadcast manner.

S303: A router 300 discovers the network configuration IE of the electronic device 200, and connects to a hotspot of the electronic device 200.

S304: The router 300 sends information 1 to a server.

After the router 300 discovers the network configuration IE of the electronic device 200, a smart antenna of the router 300 switches to a STA mode, and the smart antenna of the router 300 is connected to the hotspot of the electronic device 200. Then, the router 300 sends the information 1 to the server. The information 1 indicates the server that the router 300 discovers the electronic device 200 that is in the to-be-network-configured state. S305: The electronic device 100 displays a discovered to-be-network-configured device in a pop-up window, and the electronic device 100 receives a confirmation operation of a user.

After the server receives the information 1 sent by the router 300, the server 400 displays, on a user interface of a first application (for example, an AI life application), prompt information indicating that the router 300 discovers the to-be-network-configured electronic device 200, so that the user can see the prompt information. Then, the electronic device 100 receives the confirmation operation that is of the user and that is used to agree to configure a network for the electronic device 200. The router 300 can send the network configuration information to the electronic device 200 only when the electronic device 100 receives the confirmation operation of the user.

Figure 3A:
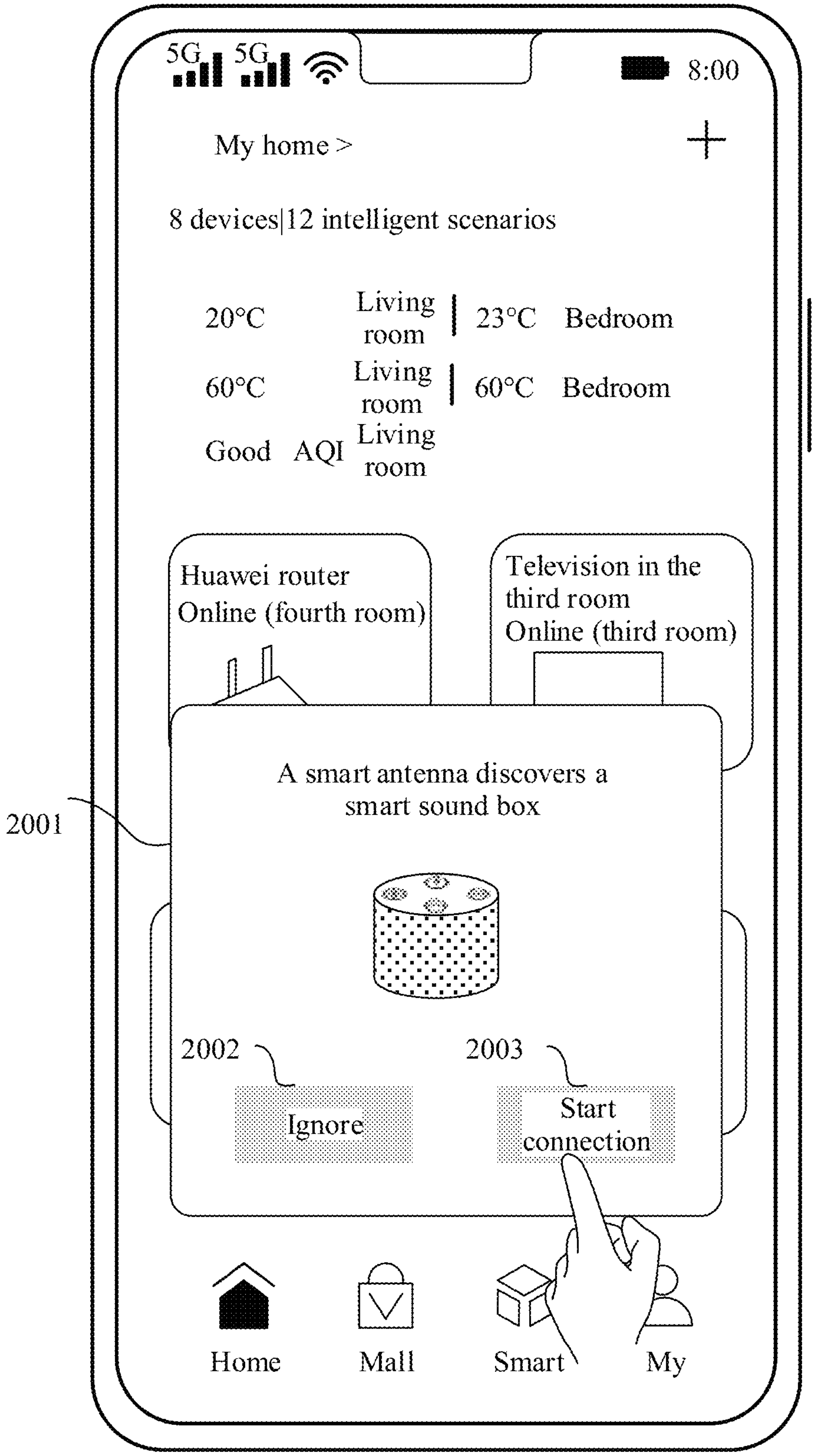
FIG. 3A and FIG. 3B are schematic diagrams of a group of network configuration interfaces according to an embodiment of this application.

For example, FIG. 3A shows an example of a user interface 20 of an electronic device 100.

The user interface 20 may include a prompt bar 2001 displayed on a home screen of a first application (for example, an AI life application) in a floating manner. Alternatively, the prompt bar 2001 may be displayed on another user interface (for example, a home screen of the electronic device 100) in a floating manner. This is not limited in this application. The prompt bar 2001 may include problem prompt information "A smart antenna discovers a smart sound box", a control 2002, and a control 2003. The prompt bar 2001 is used to prompt a user to complete a verification process. The electronic device 100 may receive an operation of triggering (for example, tapping) the control 2002 by the user. The operation indicates that the user does not agree that a router sends network configuration information to an electronic device 200. The electronic device 100 may also receive an operation of triggering (for example, tapping) the control 2003 by the user. The operation indicates that the user agrees that the router 300 sends the network configuration information to the electronic device 200.

For example, as shown in FIG. 3A, the electronic device 100 receives the operation of triggering (for example, tapping) the control 2003 by the user. In response to the operation of triggering (for example, tapping) the control 2003 by the user, the electronic device 100 sends acknowledgment information to the server, and the server sends the acknowledgment information to the router 300. The acknowledgment information is used to notify the router 300 that the user agrees that the router 300 sends the network configuration information to the electronic device 200.

Figure 3B:
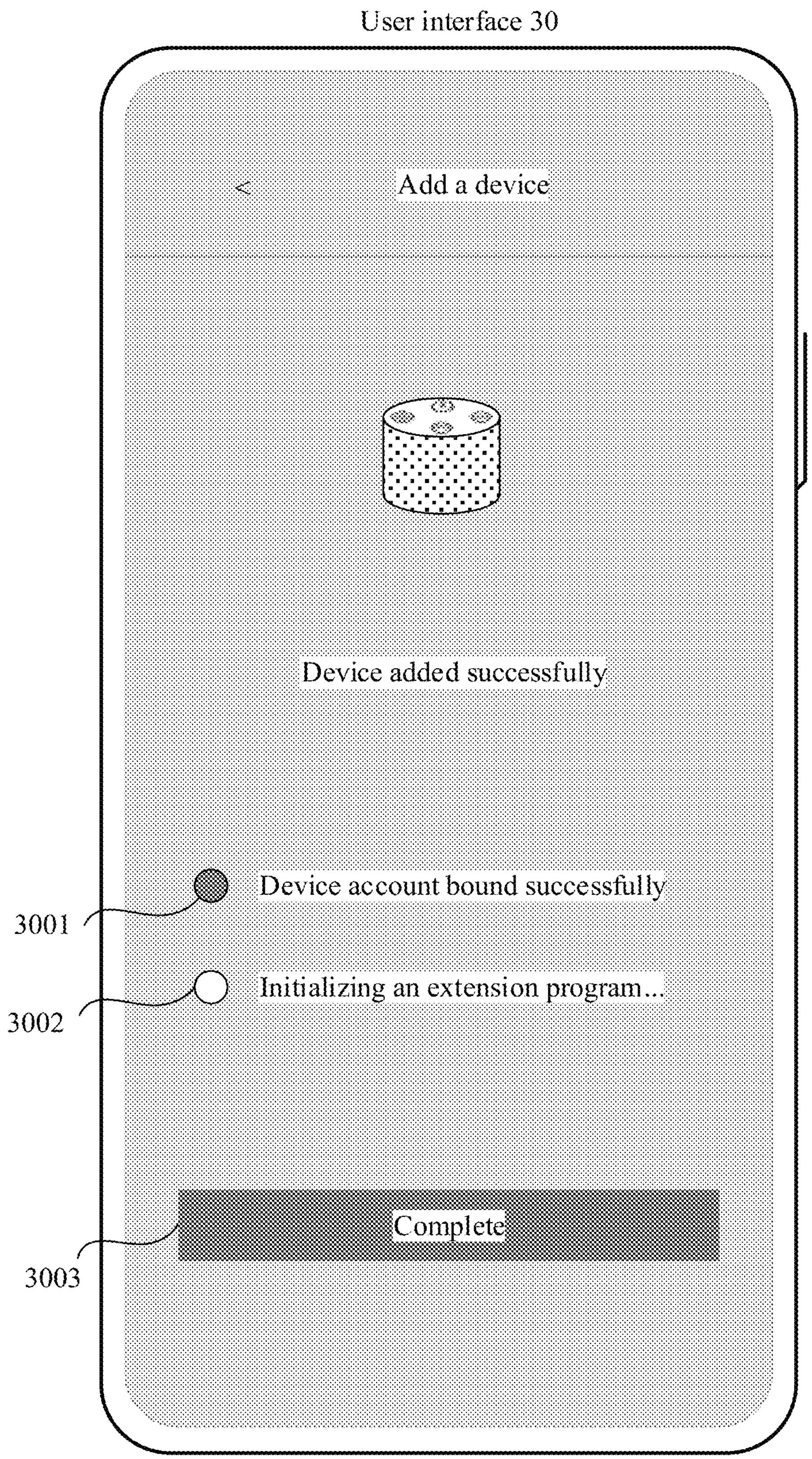

After the electronic device 100 receives the operation of triggering (for example, tapping) the control 2003 by the user, the electronic device 100 displays a user interface 30 shown in FIG. 3B.

The user interface 30 is used to prompt the user to associate the electronic device 200 and the electronic device 100 with a same account, that is, bind the electronic device 100 to the electronic device 200.

The user interface 30 includes a control 3001, a control 3002, and a control 3003.

As shown in FIG. 3B, the electronic device 100 receives a trigger operation (for example, a tap operation) performed by the user on the control 3003, and the electronic device 100 associates the electronic device 200 and the electronic device 100 with the same account, that is, there is a binding relationship between the electronic device 100 and the electronic device 200.

For example, there is the binding relationship between the electronic device 100 and the electronic device 200. The server 400 may record that the electronic device 100 and the electronic device 200 are associated with the same account. The server 400 may receive, from the electronic device 100, an instruction (for example, an instruction for instructing the electronic device 200 to start) that is used to control the electronic device 200. When it is determined that the electronic device 100 and the electronic device 200 are electronic devices associated with the same account, the server 400 may send the control instruction to the electronic device 200, so that the electronic device 200 performs an operation corresponding to the control instruction. The server 400 may also receive a message (for example, a message indicating a battery level of the electronic device 200) that is from the electronic device 200 and that is used to report status information of the electronic device 200 to the electronic device 100. When it is determined that the electronic device 100 and the electronic device 200 are the electronic devices associated with the same account, the server 400 may send, to the electronic device 100, the message indicating the status information of the electronic device 200, so that the electronic device 100 updates the status information of the electronic device 200.

S306: The electronic device 100 sends information 2 to the router 300.

S307: After the router 300 receives the information 2, the router 300 sends a name and a password of the router 300 to the electronic device 200 by using the smart antenna.

After the electronic device 100 receives a user operation for confirming a connection, the electronic device 100 sends the information 2 to the server, and the server sends the information 2 to the router 300. After the router 300 receives the information 2 sent by the server, the router 300 switches the smart antenna from the STA mode to the AP mode. Then, the router 300 sends the name and the password of the router 300 to the electronic device 200 by using the smart antenna, and waits for the electronic device 200 to connect to the router 300.

Optionally, the electronic device 100 may directly send the information 2 to the router 300. After receiving the information 1 sent by the electronic device 100, the router 300 sends the name and the password of the router 300 to the electronic device 200 by using the smart antenna.

S308: The electronic device 200 receives the name and the password of the router 300, and connects to the router 300 by using the name and the password of the router.

It can be learned from the foregoing analysis that an essence of the solution is that a smart antenna is added to the router 300, the router 300 discovers and connects to a hotspot of a device that is in a to-be-network-configured state, and the router 300 sends, by using the smart antenna, the network configuration information to the device that is in the to-be-network-configured state. However, a coverage area of the smart antenna is a range within about 9 meters radiated outside by using the router 300 as a center. In addition, a signal sent by the smart antenna has poor wall penetration, that is, after the signal sent by the smart antenna passes through an obstacle, the signal is almost attenuated and unavailable. Consequently, the electronic device 200 cannot receive the network configuration information sent by the smart antenna of the router 300, and network configuration fails.

In conclusion, to resolve defects in the foregoing network configuration modes, embodiments of this application provide a network configuration method. The method includes the following steps.

First, an electronic device 200 connects to a non-authentication network (open ssid) of a router 300. In an implementation, the electronic device 200 is in a to-be-network-configured state, and the electronic device 200 broadcasts a network configuration IE of the electronic device 200. After the router 300 receives the network configuration IE of the electronic device 200, the router 300 sends the open ssid of the router 300, and after the electronic device 200 receives the open ssid of the router 300, the electronic device 200 connects to the open ssid of the router 300.

Then, a server 400 randomly generates an auth code (authorization code), and the electronic device 200 and the router 300 obtain the auth code. In an implementation, the router 300 and the electronic device 200 obtain a key 1 through negotiation, and the electronic device 200 encrypts registration information and verification information of the electronic device 200 by using the key 1, and then sends encrypted registration information and encrypted verification information of the electronic device 200 to the server 400 via the router 300. After receiving the registration information and the verification information of the electronic device 200, the server 400 determines that the electronic device 200 is a device that allows network configuration, and the server 400 associates the electronic device 200 and the router 300 with a same account. Then, the server 400 randomly generates an auth code (authorization code), and the server 400 sends the auth code to the router 300. The router 300 receives the auth code sent by the server 400, and sends the auth code to the electronic device 200. In this way, both the router 300 and the electronic device 200 obtain the auth code randomly generated by the server 400.

Finally, the router 300 sends, to the electronic device 200, network configuration information encrypted by using a key that is based on the auth code. The electronic device 200 receives and decrypts the encrypted network configuration information, and obtains network configuration information. The electronic device 200 accesses the router 300 by using the network configuration information. In an implementation, the router 300 and the electronic device 200 perform negotiation by using the auth code to obtain a key 2, the router 300 encrypts a name and a password of the router 300 by using the key 2, and then sends the encrypted name and password to the electronic device 200; and the electronic device 200 receives the name and the password of the router 300 that are encrypted by using the key 2, and decrypts the name and the password by using the key 2. The electronic device 200 obtains the name and the password of the router 300. Therefore, the electronic device 200 is connected to the router 300 by using the name and the password of the router 300. The name and the password of the router 300 may also be replaced with a name and a password of a wireless local area network in which the router 300 is located.

It should be understood that "sending" described in embodiments of this application may mean that a device A directly sends a message to a device B, or may mean that a device A sends a message to a device B through forwarding by one or more other devices.

It should be noted that the auth codes sent by the server 400 to the electronic device 200 and the router 300 may be the same or may be different. This is not limited in embodiments of this application. The following embodiments of this application provide descriptions by using an example in which the auth codes sent by the server 400 to the electronic device 200 and the router 300 are the same.

When the auth codes sent by the server 400 to the electronic device 200 and the router 300 are the same, there are the following two implementations.

Implementation 1: The server 400 generates an auth code set 1, where the auth code set 1 includes m auth codes, and m is greater than or equal to 1. The server 400 sends the auth code set 1 to the router 300. After the router 300 receives the auth code set 1, the router 300 locally stores the auth code set 1. Then, the router 300 sends the auth code set 1 to the electronic device 200, and the electronic device 200 obtains the auth code set 1. Then, the electronic device 200 and the router 300 perform negotiation based on the m auth codes in the auth code set 1 by using a preset algorithm to obtain the key 2.

Implementation 2: The server 400 generates an auth code set 1 and an auth code set 2, where the auth code set 1 includes m auth codes, the auth code set 2 includes m auth codes, and m is greater than or equal to 1. The m auth codes in the auth code set 1 are the same as the m auth codes in the auth code set 2. In other words, the auth code set 1 is the same as the auth code set 2. The server 400 sends the auth code set 1 and the auth code set 2 to the router 300. After the router 300 receives the auth code set 1 and the auth code set 2, the router 300 locally stores the auth code set 1. Then, the router 300 sends the auth code set 2 to the electronic device 200, and the electronic device 200 obtains the auth code set 2. Then, the electronic device 200 and the router 300 perform negotiation based on the m auth codes in the auth code set 1 and the m auth codes in the auth code set 2 by using the preset algorithm to obtain the key 2.

When the auth codes sent by the server 400 to the electronic device 200 and the router 300 are different, there are the following two implementations.

Implementation 1: The server 400 needs to generate an auth code set 1, where the auth code set 1 includes m auth codes, and m is greater than or equal to 2. The server 400 sends the auth code set 1 to the router 300. After the router 300 receives the auth code set 1, the router 300 locally stores the auth code set 1. Then, the router 300 sends the auth code set 1 to the electronic device 200, and the electronic device 200 obtains the auth code set 1. Then, the electronic device 200 based on x auth codes in the auth code set 1 and the router 300 based on y auth codes in the auth code set 1 perform negotiation to obtain the key 2. The x auth codes in the auth code set 1 are different from the y auth codes in the auth code set 1, x is greater than or equal to 1 and less than or equal to m, and y is greater than or equal to 1 and less than or equal to m.

Implementation 2: The server 400 needs to generate different auth code sets (for example, an auth code set 1 and an auth code set 2), and the auth code set 1 and the auth code set 2 are different. In other words, an auth code included in the auth code set 1 is different from an auth code included in the auth code set 2. The server 400 sends the auth code set 1 and the auth code set 2 to the router 300. After the router 300 receives the auth code set 1 and the auth code set 2, the router 300 may locally store the auth code set 2. Then, the router 300 sends the auth code set 1 to the electronic device 200, and the electronic device 200 obtains the auth code set 1. Alternatively, the router 300 may locally store the auth code set 1, the router 300 sends the auth code set 2 to the electronic device 200, and the electronic device 200 obtains the auth code set 2. The electronic device 200 and the router 300 perform negotiation based on the auth code set 1 and the auth code set 2 by using a preset algorithm to obtain the key 2. The auth code set 2 may include one or more auth codes.

The preset algorithm herein may be a diffie hellman (diffie hellman, DH) algorithm described in the following embodiments, or the preset algorithm may be another algorithm. This is not limited in embodiments of this application. It should be noted that the auth code set 1 may include one or more auth code sets, and the auth code 2 may also include one or more auth codes.

The network configuration method provided in embodiments of this application may have beneficial effects in at least the following aspects.

According to a first aspect, compared with the softAP network configuration solution in Mode 1, the network configuration method provided in embodiments of this application can reduce manual intervention in a network configuration process. Specifically, in the network configuration method provided in embodiments of this application, a user does not need to enter the name and the password of the router 300, and operations are simple.

According to a second aspect, compared with the multicast network configuration solution provided in Mode 2, the wireless local area network standard specified in the 802.11 protocol is not modified in the network configuration method provided in embodiments of this application. Specifically, the electronic device 200 and the router 300 do not need to transmit the network configuration information by using a reserved field of a multicast packet.

According to a third aspect, compared with the AIoT antenna-based network configuration solution in Mode 3, the network configuration method provided in embodiments of this application has no hardware addition requirement. Specifically, the router 300 does not need to be additionally equipped with an AIoT antenna, and the router 300 may be always in an AP mode in a network configuration process. In this way, an ongoing service of another device connected to the router 300 is not affected.

According to a fourth aspect, the network configuration method provided in embodiments of this application can improve security of a network configuration process. After the server 400 verifies, by using the verification information, that the electronic device 200 is a device that allows network configuration, the server 400 randomly generates the auth code. It may be understood that the server 400 generates different auth codes for different devices. The auth code is to be used by the router 300 and the electronic device 200 to perform negotiation to obtain a high-security channel, to complete transmission of sensitive information (the name and the password of the router 300). Different devices have different auth codes. Therefore, each to-be-network-configured device uses a different high-security channel. This solution improves security of transmission of sensitive information (for example, the name and the password of the router 300), and ensures security of the network configuration process.

The network configuration method provided in embodiments of this application may be applied to an application scenario of "one-tap network configuration", that is, network configuration is performed for one or more to-be-network-configured devices at a time. Specifically, when the router 300 discovers one or more to-be-network-configured devices, the router 300 receives a user operation indicating that network configuration is agreed. Then, the router 300 continuously broadcasts the open ssid of the router 300. After the one or more to-be-network-configured devices are connected to the open ssid of the router 300, the router 300 sequentially completes a network configuration process of the one or more to-be-network-configured devices connected to the open ssid of the router 300. The router 300 can complete the network configuration process with the one or more to-be-network-configured devices by receiving only one user operation. Compared with the fact that the router 300 can complete a network configuration process with only one to-be-network-configured device by receiving one user operation, the network configuration solution provided in embodiments of this application improves network configuration efficiency of the router, reduces a quantity of user operations, and improves user experience.

The network configuration method provided in embodiments of this application may also be applied to an application scenario of "remote network configuration". A user A operating the electronic device 100 may also remotely instruct a user B operating the electronic device 200 to power on the electronic device 200, and the user A remotely operates the electronic device 100 to complete network configuration on the electronic device 200. Specifically, the router 300 discovers the electronic device 200 that is in a to-be-network-configured state, and the electronic device 100 displays, on a remote network configuration interface of a first application, prompt information indicating that the electronic device 200 in the to-be-network-configured state is discovered. Then, the electronic device 100 may receive an input operation performed by the user A on the remote network configuration interface of the first application, and trigger the router 300 to send network configuration information to the electronic device 200 that is in the to-be-network-configured state, so that the electronic device 200 receives the network configuration information sent by the router 300, and the electronic device 200 connects to the router 300 by using the network configuration information of the router 300. The user A and the user B may not be a same user, and the user A does not need to be near the router 300 and the electronic device 200, so that the user A remotely connects the electronic device 200 to the router 300.

Figure 4:
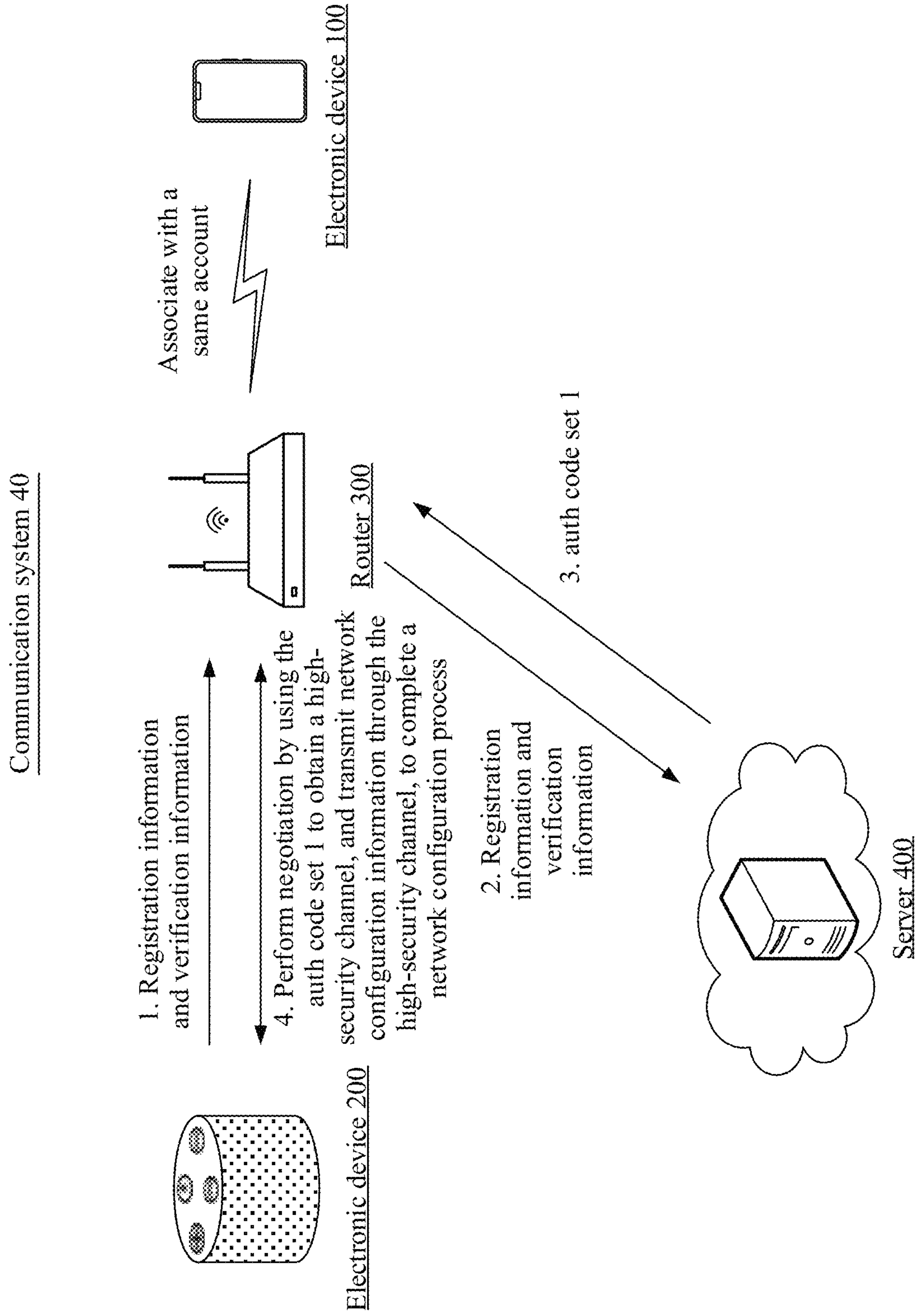
FIG. 4 is a schematic diagram of a system architecture according to an embodiment of this application.

FIG. 4 is a schematic diagram of a system architecture according to an embodiment of this application.

As shown in FIG. 4, a communication system 40 may include an electronic device 100, an electronic device 200, a router 300, and a server 400. The electronic device 100 may be a mobile phone, a tablet computer, a desktop computer, a laptop computer, a handheld computer, a notebook computer, an ultra-mobile personal computer (ultra-mobile personal computer, UMPC), a netbook, a personal digital assistant (personal digital assistant, PDA), or the like.

The electronic device 200 may be a smart light, a smart oven, a smart fan, a smart air conditioner, a smart television, a smart large screen, a smart band, a smartwatch, a smart sound box, a smart refrigerator, a smart door and window, a smart automobile, a smart monitor, a smart robot, a smart camera, or the like.

Types of the electronic device 100 and the electronic device 200 are not limited in this embodiment of this application. The following embodiments of this application provide descriptions by using an example in which the electronic device 100 is a mobile phone and the electronic device 200 is a smart sound box.

The electronic device 100 may be connected to a wireless local area network in which the router 300 is located, or the electronic device 100 may not be connected to a wireless local area network in which the router 300 is located. This is not limited in this embodiment of this application. The electronic device 100 and the router 300 may be associated with a same account, and the server 400 may record information that the electronic device 100 and the router 300 are associated with the same account. The electronic device 100 may communicate with the server 400, and the electronic device 100 may also verify, by using the server 400, that the electronic device 100 and the router 300 are associated with the same account. Specifically, the server 400 may receive, from the electronic device 100, an instruction (for example, an instruction for instructing the router 300 to start) used to control the router 300. When the server 400 determines that the electronic device 100 and the router 300 are associated with the same account, the server 400 may send the control instruction to the router 300, so that the router 300 performs an operation corresponding to the control instruction. The server 400 may also receive a message that is from the router 300 and that is used to report status information (for example, a quantity of devices connected to the router 300) of the server 400 to the electronic device 100. When the server 400 determines that the electronic device 100 and the router 300 are associated with the same account, the server 400 may send, to the electronic device 100, the message indicating the status information of the router 300, so that the electronic device 100 can receive the status information of the router 300.

When the electronic device 200 needs to connect to the router 300, the electronic device 200 receives a user operation, so that the electronic device 200 is started and is in a to-be-network-configured state. The electronic device 200 that is in the to-be-network-configured state may send a network configuration IE of the electronic device 200 in a broadcast manner.

After the router 300 receives and identifies the network configuration IE of the electronic device 200, the router 300 sends, to the server 400, a request for generating registration information of the electronic device 200. The server 400 receives and responds to the request, and the server 400 generates the registration information of the electronic device 200. Then, the server 400 sends the registration information to the router 300.

After the router 300 receives the registration information that is of the electronic device 200 and that is sent by the server 400, the router 300 negotiates with the electronic device 200 by using a preset parameter to obtain a key 1, encrypts the registration information by using the key 1, and sends encrypted registration information to the electronic device 200. How the router 300 negotiates with the electronic device 200 by using the preset parameter to obtain the key 1 is described in detail in a subsequent embodiment. Details are not described in this embodiment of this application. After the electronic device 200 receives the registration information that is of the electronic device 200 and that is encrypted by using the key 1 and is sent by the router 300, the electronic device 200 decrypts, based on the key 1, the registration information that is of the electronic device 200 and that is encrypted by using the key 1, to obtain the registration information of the electronic device 200.

It should be noted that the foregoing steps that the electronic device 200 broadcasts the network configuration IE, the server 400 generates the registration information of the electronic device 200, the server 400 sends the registration information of the electronic device 200 to the router 300 and the electronic device 200, and the like are not shown in FIG. 4.

Then, the electronic device 200 encrypts the registration information and verification information of the electronic device 200 by using the key 1, and sends the encrypted registration information and the encrypted verification information to the router 300 (which may correspond to step 1 in FIG. 4). The router 300 decrypts, by using the key 1, the registration information and the verification information of the electronic device 200 that are encrypted by using the key 1, and sends the registration information and the verification information of the electronic device 200 to the server 400 (which may correspond to step 2 in FIG. 4).

After the server 400 receives the registration information and the verification information of the electronic device 200, after the server 400 verifies, based on the registration information and the verification information of the electronic device 200, that the electronic device 200 is a valid device, the server 400 randomly generates an auth code (for example, an auth code set 1). The server 400 sends the auth code set 1 to the router 300 and the electronic device 200 (which may correspond to step 3 in FIG. 4). In an implementation, the router 300 receives the auth code set 1 sent by the server 400, and the router 300 encrypts the auth code set 1 by using the key 1 and sends an encrypted auth code set 1 to the electronic device 200. After receiving the auth code set 1 encrypted by using the key 1, the electronic device 200 decrypts, by using the key 1, the auth code set 1 encrypted by using the key 1, and the electronic device 200 obtains the auth code set 1. Herein, how the server 400 verifies, based on the registration information and the verification information of the electronic device 200, that the electronic device 200 is a valid device is described in detail in a subsequent embodiment. Details are not described in this embodiment of this application. After the electronic device 200 obtains the auth code set 1, the electronic device 200 negotiates with the router 300 by using the auth code set 1 to obtain a key 2. The router 300 sends network configuration information of the router 300 (for example, a name and a password of the router 300) to the electronic device 200 by using the key 2 (which may correspond to step 4 in FIG. 4). After receiving the name and the password of the router 300, the electronic device 200 connects to the router 300 by using the name and the password of the router 300.

In some embodiments, after the electronic device 200 connects to the router 300 by using the name and the password of the router 300, the electronic device 200 and the electronic device 100 may establish a binding relationship (for example, associate with a same account). Specifically, after the electronic device 200 connects to the router 300 by using the name and the password of the router 300, the router 300 sends information to the server 400. After the server 400 receives the information, the server 400 may associate the electronic device 200 and the router 300 with a same account. The foregoing embodiment describes that the electronic device 100 and the router 300 have been associated with the same account. In this case, the electronic device 100, the router 300, and the electronic device 200 are all associated with the same account, so that the electronic device 200 may establish a binding relationship with the electronic device 100.

For example, the electronic device 100 and the electronic device 200 are associated with the same account, and the server 400 records information that the electronic device 100 and the electronic device 200 are associated with the same account. The electronic device 100 may communicate with the server 400, and the electronic device 100 may also verify, by using the server 400, that the electronic device 100 and the electronic device 200 are associated with the same account. Specifically, the server 400 may receive an instruction (for example, an instruction for instructing the electronic device 200 to start) that is from the electronic device 100 and that is used to control the electronic device 200. When the server 400 determines that the electronic device 100 and the electronic device 200 are associated with the same account, the server 400 may send the control instruction to the electronic device 200, so that the electronic device 200 performs an operation corresponding to the control instruction. The server 400 may also receive a message (for example, a message indicating a battery level of the electronic device 200) that is from the electronic device 200 and that is used to report status information of the electronic device 200 to the electronic device 100. When the server 400 determines that the electronic device 100 and the electronic device 200 are associated with the same account, the server 400 may send, to the electronic device 100, the message indicating the power level of the electronic device 200, so that the electronic device 100 can receive the message indicating the power level of the electronic device 200.

It should be noted that a specific manner of communication between the electronic device 200 and the server 400 is not limited in the network configuration method provided in embodiments of this application. The electronic device 100 may communicate with the server 400 by using any one of a cellular communication network, a wireless local area network (wireless local area network, WLAN), a wired network, or the like. For example, when the electronic device 100 is located near the router 300 (for example, 50 meters), preferably, the electronic device 100 may communicate with the server 400 by accessing a wireless local area network provided by the router 300. When the electronic device 100 is not located near the router 300, the electronic device 100 may communicate with the server 400 by using any one of a wireless local area network provided by another device, a cellular communication network, a wired network, or the like. In other words, in the network configuration method provided in embodiments of this application, the electronic device 100 is not required to access the wireless local area network of the router 300, and the electronic device 100 is not required to access a hotspot of the electronic device 200.

Figure 5:
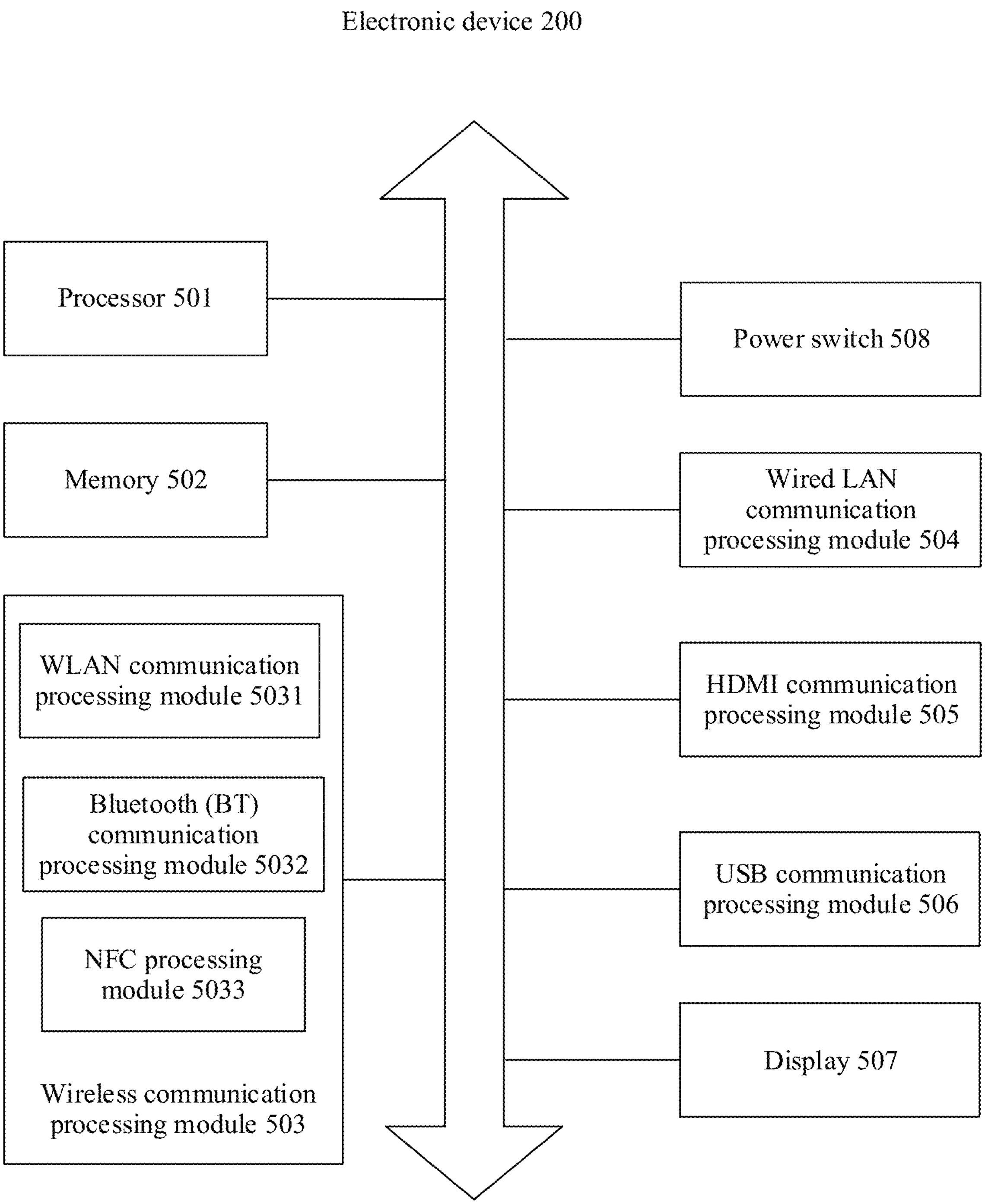
FIG. 5 is a schematic diagram of a structure of an electronic device 200 according to an embodiment of this application.

FIG. 5 is a schematic diagram of an example of a structure of an electronic device 200.

As shown in FIG. 5, the electronic device 200 may include: a processor 501, a memory 502, a wireless communication processing module 503, a wired LAN communication processing module 504, an HDMI communication processing module 505, a USB communication processing module 506, a display 507, and a power switch 508.

The processor 501 may be configured to read and execute a computer-readable instruction. During specific implementation, the processor 501 may mainly include a controller, an arithmetic unit, and a register. The controller is mainly responsible for instruction decoding, and sends a control signal for an operation corresponding to the instruction. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor 501 may be an application-specific integrated circuit (ASIC) architecture, an MIPS architecture, an ARM architecture, an NP architecture, or the like.

In some embodiments, the processor 501 may be configured to parse a signal received by the wireless communication processing module 503 and/or the wired LAN communication processing module 504, for example, network configuration information sent by a router 300. The processor 501 may be configured to perform a corresponding processing operation based on a parsing result, for example, generate a probe response, or drive, based on a display request or according to a display instruction, the display 507 to perform displaying.

In some embodiments, the processor 501 may be further configured to generate a signal like a Bluetooth broadcast signal or a beacon signal that is sent by the wireless communication processing module 503 and/or the wired LAN communication processing module 504 to the outside, or send, to the router 300, a signal that includes a network configuration IE of the electronic device 200.

The memory 502 is coupled to the processor 501, and is configured to store various software programs and/or a plurality of sets of instructions. During specific implementation, the memory 502 may include a high-speed random access memory, and may further include a nonvolatile memory, for example, one or more magnetic disk storage devices, a flash device, or another non-volatile solid-state storage device. The memory 502 may store an operating system, for example, an embedded operating system like uCOS, VxWorks, RTLinux, or HarmonyOS. The memory 502 may further store a communication program, and the communication program may be used to communicate with one or more servers or a nearby device.

The wireless communication processing module 503 may include one or more of a WLAN communication processing module 5031, a Bluetooth (BT) communication processing module 5032, and an NFC processing module 5033.

In some embodiments, the wireless communication processing module 503 may further include a cellular mobile communication processing module (not shown). The cellular mobile communication processing module may communicate with another device (for example, a server) by using a cellular mobile communication technology.

The wired LAN communication processing module 504 may be configured to communicate with another device in a same LAN by using a wired LAN, and may be further configured to connect to a WAN by using the wired LAN to communicate with a device in the WAN.

The HDMI communication processing module 505 may be configured to communicate with another device through an HDMI interface (not shown).

The USB communication processing module 506 may be configured to communicate with another device through a USB interface (not shown).

The display 507 is configured to display an image, a video, and the like. The display 507 may be a liquid crystal display (liquid crystal display, LCD), an organic light-emitting diode (organic light-emitting diode, OLED) display, an active-matrix organic light-emitting diode (active-matrix organic light-emitting diode, AMOLED) display, a flexible light-emitting diode (flexible light-emitting diode, FLED) display, a quantum dot light-emitting diode (quantum dot light-emitting diode, QLED) display, or the like.

In some embodiments, the electronic device 200 may alternatively not include the display 507. This is not limited in this application The power switch 508 may be configured to control a power supply to supply power to the electronic device 200.

It may be understood that the structure shown in FIG. 5 does not constitute any specific limitation on the electronic device 200. In some other embodiments of this application, the electronic device 200 may include more or fewer components than those shown in the figure, or combine some components, or split some components, or have different component arrangements. The components shown in the figure may be implemented by hardware, software, or a combination of software and hardware.

Figure 6:
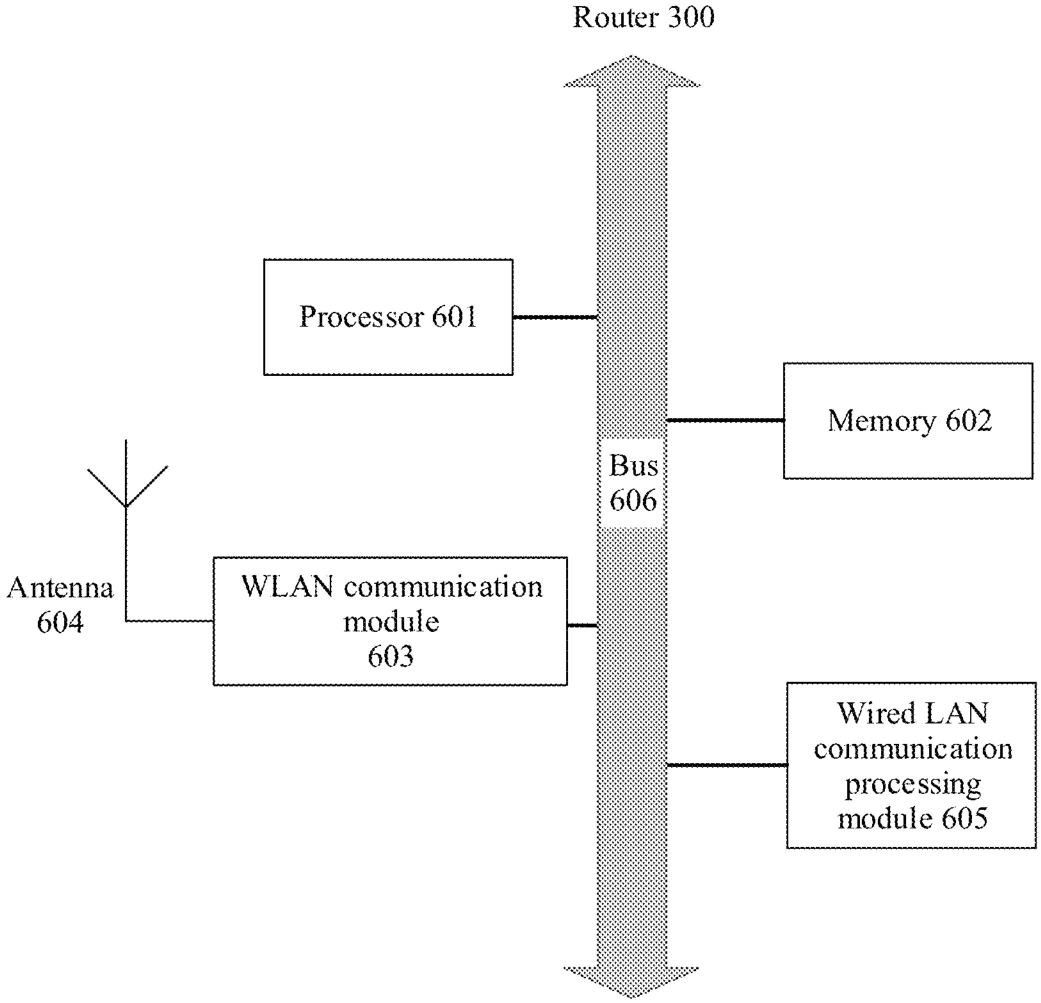
FIG. 6 is a schematic diagram of a structure of a router 300 according to an embodiment of this application.

FIG. 6 is a schematic diagram of an example of a structure of a router 300.

Refer to FIG. 6. FIG. 6 shows a router according to some embodiments of this application. As shown in FIG. 6, the router may include a processor 601, a memory 602, a WLAN communication module 603, an antenna 604, a wired local area network (local area network, LAN) communication processing module 605, and a bus 606. The processor 601, the memory 602, the WLAN communication module 603, and the wired LAN communication processing module 605 may be connected through the bus 606.

It should be noted that the router shown in FIG. 6 is merely an example, and the router may have more or fewer components than those shown in FIG. 6, or may have two or more components that are combined, or may have different component configurations. Various components shown in FIG. 6 may be implemented by hardware that includes one or more signal processing and/or application-specific integrated circuits, software, or a combination of hardware and software.

As shown in FIG. 6, the processor 601 may be configured to read and execute a computer-readable instruction. During specific implementation, the processor 601 may mainly include a controller, an arithmetic unit, and a register. The controller is mainly responsible for instruction decoding, and sends a control signal for an operation corresponding to the instruction. The arithmetic unit is mainly responsible for storing a register operand, an intermediate operation result, and the like that are temporarily stored during instruction execution. During specific implementation, a hardware architecture of the processor 601 may be an application-specific integrated circuit (ASIC) architecture, an MIPS architecture, an ARM architecture, an NP architecture, or the like.

A memory may be further disposed in the processor 601, and is configured to store instructions and data. In some embodiments, the memory in the processor 601 is a cache. The memory may store instructions or data just used or cyclically used by the processor 601. If the processor 601 needs to use the instructions or the data again, the processor may directly invoke the instructions or the data from the memory. This avoids repeated access and reduces waiting time of the processor 601, thereby improving system efficiency.

The memory 602 is coupled to the processor 601, and is configured to store various software programs and/or a plurality of sets of instructions. During specific implementation, the memory 602 may include a high-speed random access memory, and may further include a nonvolatile memory, for example, one or more magnetic disk storage devices, a flash device, or another non-volatile solid-state storage device. The memory 602 may store an operating system, for example, an embedded operating system like uCOS, VxWorks, or RTLinux. The memory 602 may further store a communication program, and the communication program may be used to communicate with an electronic device or another device. The memory 602 may further store a current configuration, a routing table, and a forwarding table. The routing table can be used to store routing information. The routing table is usually maintained by a routing protocol and routing table management module, including more information (such as a network address, a next hop, and timeout duration). The forwarding table can be generated based on the routing table and is used by the router during actual forwarding. The router can send a data packet to a next hop device based on the forwarding table.

The WLAN communication module 603 may be configured to modulate and demodulate an electromagnetic wave signal, and the WLAN communication module 603 may convert, into electromagnetic wave signals, information and an instruction sent by the processor 601, convert the received electromagnetic wave signals into digital signals, and send the digital signals to the processor 601 for processing.

The antenna 604 may be configured to transmit and receive an electromagnetic wave signal, and the router may have one or more antennas.

The wired LAN communication processing module may include one or more LAN physical interfaces, and the one or more LAN physical interfaces may be used for another electronic device to establish a connection to the router through a network cable.

The router may further include a wired wide area network (WAN) communication processing module, where the wired wide area network (WAN) communication processing module may include a WAN physical interface, and the WAN physical interface may be configured to connect the router to the internet.

The router may further include a network configuration button. The network configuration button may be a "Hi button", a "WPS button", or the like. A name of the network configuration button is not limited in this application.

A type of the network configuration button is a pressing type, or may be a rotating type, or may be a flipping type. The type of the network configuration button is not limited in this application.

The router may further include a network configuration indicator. The network configuration indicator may blink, to prompt a user that the router discovers a to-be-network-configured device.

The router may further include a cellular communication module, configured to communicate with a cellular communication base station. In this case, the router may not include the wired LAN communication processing module 605.

The router shown in FIG. 6 is merely an implementation of this embodiment of this application. During actual application, the router may further include more or fewer components. This is not limited herein.

The network configuration method provided in embodiments of this application mainly includes the following three steps.

Step 1: An electronic device 200 connects to an open ssid (a non-authentication network) of a router 300.

Step 2: A server 400 generates registration information of the electronic device 200, and completes a task item of verification performed on the electronic device 200. Specifically, the router 300 sends, to the server 400, a request for generating the registration information of the electronic device 200, the server 400 receives and responds to the request, and the server 400 generates the registration information of the electronic device 200. Then, the server 400 sends the registration information of the electronic device 200 to the router 300. The router 300 receives the registration information that is of the electronic device 200 and that is sent by the server 400, and sends the registration information of the electronic device 200 to the electronic device 200. Subsequently, the electronic device 200 sends the registration information and verification information to the server 400 via the router 300. After the server 400 receives the registration information and the verification information of the electronic device 200 and determines that the electronic device 200 is a valid device, the server 400 binds the electronic device 200 to the router 300.

Step 3: After determining that the electronic device 200 is the valid device, the server 400 sends an auth code set 1 to the router 300; and the router 300 receives the auth code set 1, and sends the auth code set 1 to the electronic device 200. Then, the electronic device 200 and the router 300 perform negotiation by using the auth code set 1 to obtain a high-security channel, and complete transmission of network configuration information (for example, a name and a password of the router 300) through the high-security channel.

Step 4: The electronic device 200 connects to a wireless local area network in which the router 300 is located.

It can be learned that the electronic device 200 and the router 300 perform negotiation by using the auth code set 1 randomly delivered by the server 400, to obtain the high-security channel, and different high-security channels are obtained by different devices and the router 300 through negotiation. In addition, a device that fails in verification cannot establish a high-security channel with the router 300. This can avoid data eavesdropping and obtaining of the device that fails in verification. In this way, security of transmitting network configuration information between the electronic device 200 and the router 300 in a network configuration process is ensured.

First, a process in which an electronic device 200 connects to an open ssid of a router 300 is described.

The electronic device 200 connects to the open ssid of the router 300, where only a connection relationship is established between the electronic device 200 and the router 300. The electronic device 200 may transmit data to the router 300, but the electronic device 200 cannot use a wireless network of the router 300. The electronic device 200 connects to the open ssid of the router 300, so that the electronic device 200 subsequently transmits registration information and verification information to a server 400 via the router 300, and the router 300 transmits network configuration information to the electronic device 200.

Figure 7:
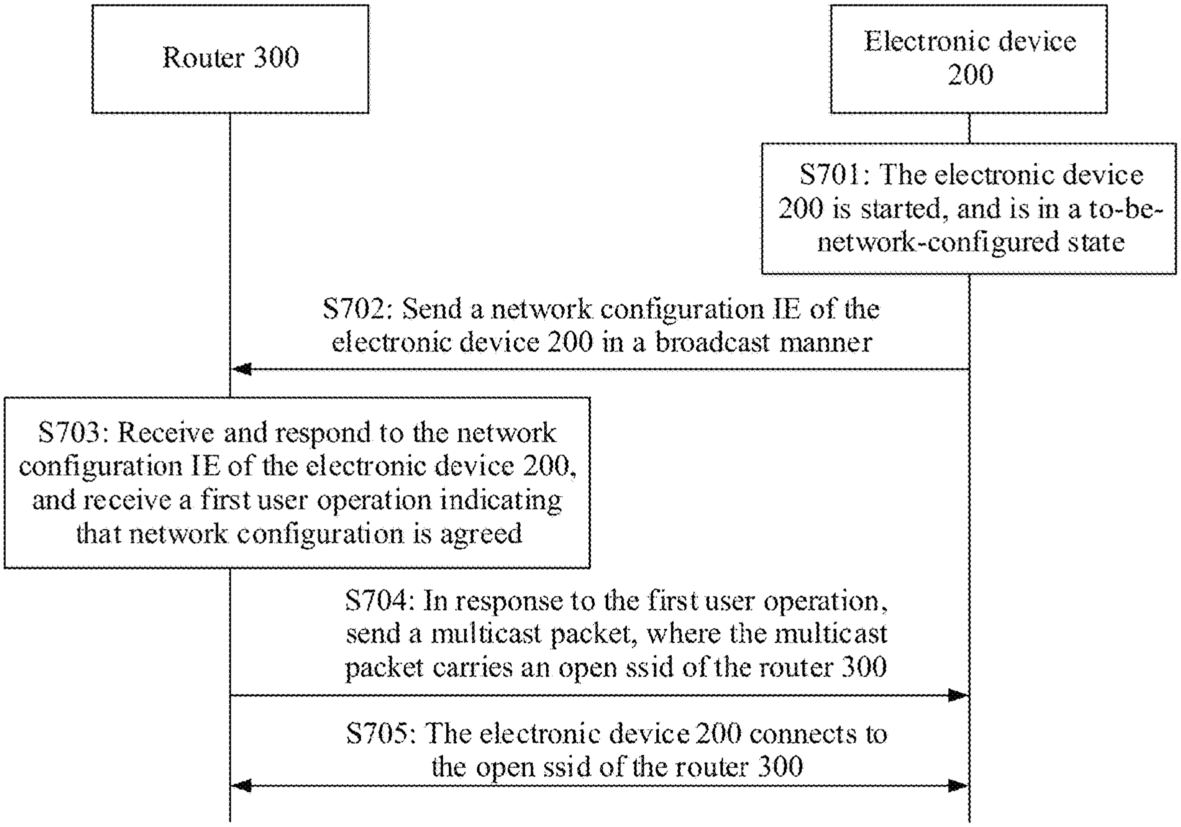
FIG. 7 is a flowchart of a method for connecting an electronic device 200 to an open ssid of a router 300 according to an embodiment of this application.

FIG. 7 is a flowchart of an example of a method for connecting an electronic device 200 to an open ssid of a router 300.

S701 to S705 show examples of steps of the method for connecting the electronic device 200 to the open ssid of the router 300. It should be noted that in some embodiments, the method for connecting the electronic device 200 to the open ssid of the router 300 may include more or fewer steps than S701 to S705. This is not limited in this application. In addition, an execution sequence of each step in S701 to S705 is not limited in this application.

S701: The electronic device 200 is started, and the electronic device 200 is in a to-be-network-configured state.

In S701, a user operation of enabling the electronic device 200 in the to-be-network-configured state is the same as the user operation of enabling the electronic device 200 in the to-be-network-configured state in S101. For details, refer to the related descriptions in S101. Details are not described in this embodiment of this application again.

In some embodiments, that the electronic device 200 is in a to-be-network-configured state may also be referred to as that the electronic device 200 is in an AP mode.

S702: The electronic device 200 sends a network configuration IE of the electronic device 200 in a broadcast manner.

In response to the fact that the electronic device 200 is in the to-be-network-configured state, the electronic device 200 sends the network configuration IE of the electronic device 200 in a broadcast manner.

S703: The router 300 receives the network configuration IE of the electronic device 200, and receives a first user operation indicating that network configuration is agreed.

S704: In response to the first user operation, the router 300 sends a multicast packet, where the multicast packet carries the open ssid of the router 300.

The router 300 receives the network configuration IE of the electronic device 200, and in response to the network configuration IE of the electronic device 200, an indicator of the router 300 blinks, to prompt a user that the router 300 discovers the electronic device 200 that is in the to-be-network-configured state.

In addition to the blinking of the indicator of the router 300, the router 300 may further prompt, in another manner, the user that the router 300 discovers the electronic device 200 that is in the to-be-network-configured state. This is not limited in this application.

When the indicator of the router 300 blinks, the router 300 receives the user operation indicating that network configuration is agreed. The user operation indicates that the user agrees that the router 300 sends the open ssid to the electronic device 200.

In a possible implementation, the foregoing user operation may be an operation of receiving, by the router 300, an operation of triggering (for example, pressing) a network configuration button on the router 300 by the user.

In another possible implementation, the router 300 discovers the to-be-network-configured electronic device 200, and the indicator of the router 300 blinks. In addition, the router 300 sends information 1 to the server 400, where the information 1 is to be used by the server 400 to display, on a user interface of a first application (for example, an AI life application), prompt information indicating that the router 300 discovers the to-be-network-configured electronic device 200.

An electronic device 100 may receive and respond to an input operation performed by the user on the first application, where the input operation indicates that the user agrees that the router 300 sends the open ssid to the to-be-network-configured device. Specifically, the electronic device 100 sends information 2 to the server 400 by using the first application, and the server 400 forwards the information 2 to the router 300.

Herein, for how the electronic device 100 receives and responds to the input operation performed by the user on the first application, refer to subsequent embodiments in FIG. 9B to FIG. 9E. Details are not described in this embodiment of this application.

After the router 300 receives the information 2, the router 300 sends a multicast packet, where the multicast packet carries the open ssid of the router 300.

Before the router 300 sends network configuration information to the electronic device 200, the router 300 continuously sends the open ssid of the router 300.

S705: The electronic device 200 obtains the open ssid that is of the router 300 and that is carried in the multicast packet sent by the router 300, and connects to the open ssid of the router 300.

After the electronic device 200 receives the multicast packet that is of the router 300 and that is sent by the router 300, the electronic device 200 switches from the AP mode to a STA mode, and the electronic device 200 parses out the open ssid that is of the router 300 and that is carried in the multicast packet, and connects to the open ssid of the router 300.

The electronic device 200 connects to the open ssid of the router 300, where only a connection relationship is established between the electronic device 200 and the router 300. The electronic device 200 may transmit data to the router 300. The electronic device 200 connects to the open ssid of the router 300, so that the electronic device 200 subsequently transmits registration information and verification information to the server 400 via the router 300, and the router 300 transmits the network configuration information to the electronic device 200.

The following describes a task item in which the electronic device 200 sends, to the server 400 via the router 300, a request for generating the registration information of the electronic device 200, and the server 400 generates the registration information of the electronic device 200 after receiving the request, and completes verification performed on the electronic device 200.

After the electronic device 200 connects to the open ssid of the router 300, the router 300 sends, to the server 400, the request for generating the registration information of the electronic device 200, the server 400 receives and responds to the request, and the server 400 generates the registration information of the electronic device 200. Then, the server 400 sends the registration information of the electronic device 200 to the router 300. The router 300 receives the registration information that is of the electronic device 200 and that is sent by the server 400, and the router 300 sends the registration information of the electronic device 200 to the electronic device 200. Subsequently, the electronic device 200 sends the registration information and the verification information to the server 400. After the server 400 verifies that the electronic device 200 is a valid device, the server 400 binds the electronic device 200 to the router 300.

In this way, the server 400 first generates the registration information of the electronic device 200, and the server 400 sends the registration information of the electronic device 200 to the electronic device 200 via the router 300. The electronic device 200 sends the registration information and the verification information of the electronic device 200 to the server 400 via the router 300. The server 400 receives the registration information and the verification information that are of the electronic device 200 and that are sent by the electronic device 200 via the router 300. If the server 400 determines that the registration information that is of the electronic device 200 and that is sent by the electronic device 200 via the router 300 is registration information that is sent by the server to the electronic device 200 via the router 300 before, the server 400 preliminarily determines that the electronic device 200 is a valid device. Then, the server 400 further determines that the verification information sent by the electronic device 200 via the router 300 is valid verification information, and then the server 400 further determines that the electronic device 200 is the valid device. In this case, the server 400 sends a message to the router 300, where the message is used to notify the router 300 and the electronic device 200 that the network configuration information can be transmitted. In this way, the server 400 improves, by using a double verification mechanism, a security mechanism for verifying validity of a device by the server 400, and security of subsequently transmitting the network configuration information between the router 300 and the electronic device 200 is ensured.

Figure 8:
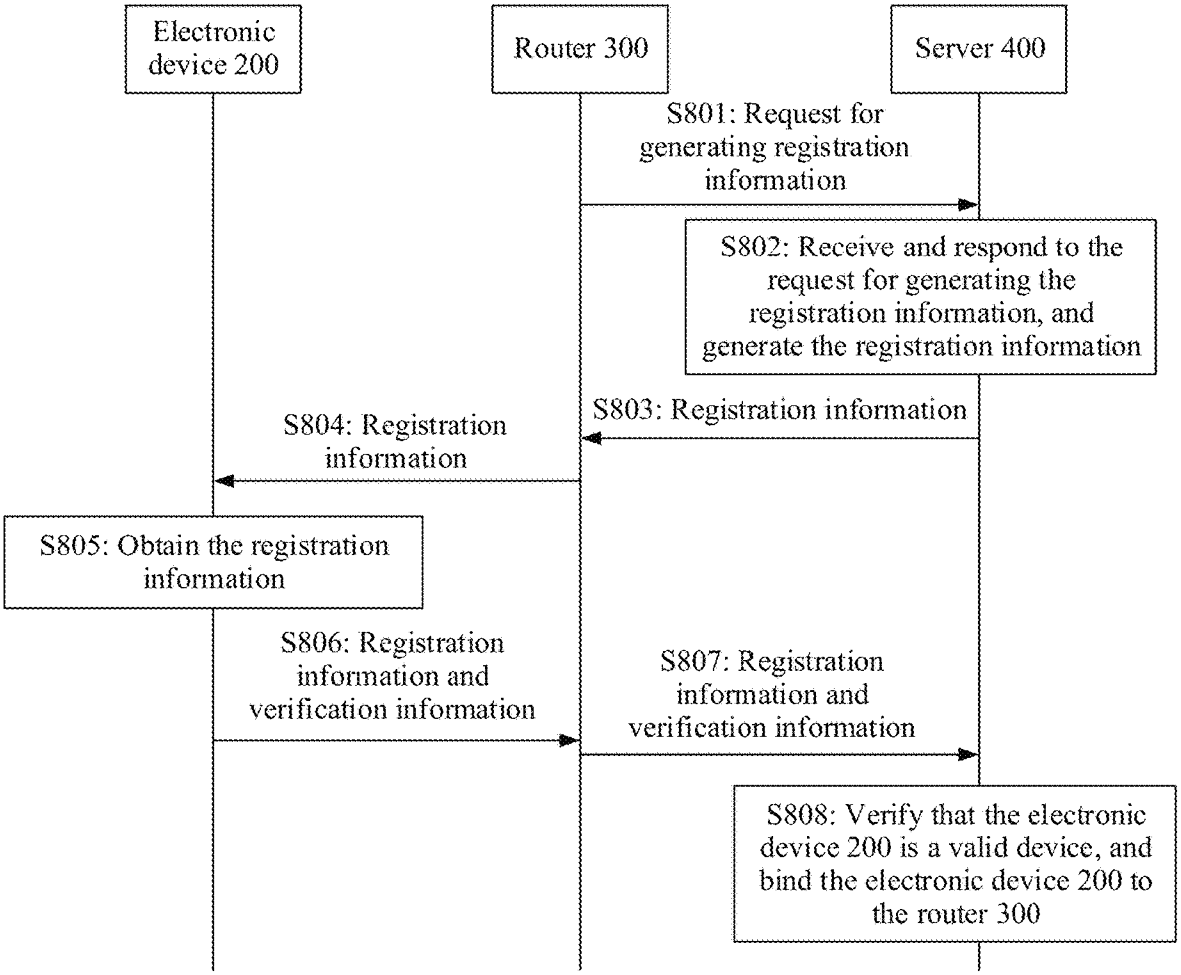
FIG. 8 is a flowchart of a method of a task item in which a server 400 generates registration information of an electronic device 200 and completes verification performed on the electronic device 200 according to an embodiment of this application.

Optionally, the server 400 may not perform steps, shown in FIG. 8, in the task item of generating the registration information of the electronic device 200 and completing verification performed on the electronic device 200. In other words, in the embodiment shown in FIG. 7, after the electronic device 200 connects to the open ssid of the router 300, the server 400 directly performs the embodiment shown in FIG. 9. To be specific, the server 400 directly randomly generates an auth code (for example, an auth code set 1), and sends the auth code set 1 to the router 300. The router 300 receives the auth code set 1 sent by the server 400. The router 300 sends the auth code set 1 to the electronic device 200, and the electronic device 200 obtains the auth code set 1.

In embodiments of this application, whether an electronic device 200, a router 300, and a server 400 perform steps, shown in FIG. 8, in the task items of generating the registration information of the electronic device 200 and completing verification performed on the electronic device 200 is not limited.

FIG. 8 is a flowchart of an example of a method of a task item in which the server 400 generates the registration information of the electronic device 200 and completes verification performed on the electronic device 200.

S801 to S808 show examples of steps of the method of the task item in which the server 400 complete registration of the electronic device 200 and verification performed on the electronic device 200. It should be noted that in some embodiments, the steps of the method of the task item in which the server 400 completes registration of the electronic device 200 and verification performed on the electronic device 200 may include more or fewer steps than S801 to S808. This is not limited in this application. In addition, an execution sequence of each step in S801 to S808 is not limited in this application.

S801: The router 300 sends, to the server 400, a request for generating the registration information of the electronic device 200.

After the electronic device 200 connects to an open ssid of the router 300, the router 300 sends, to the server 400, the request for generating the registration information of the electronic device 200. The request is to be used by the server 400 to generate the registration information of the electronic device 200.

S802: The server 400 receives and responds to the request for generating the registration information of the electronic device 200, and the server 400 generates the registration information of the electronic device 200.

S803: The server 400 sends the registration information of the electronic device 200 to the router 300. Correspondingly, the router 300 obtains the registration information of the electronic device 200.

After the server 400 receives the request that is for generating the registration information of the electronic device 200 and that is sent by the router 300, the server 400 agrees the request sent by the router 300, and the server 400 generates the registration information of the electronic device 200. The server 400 sends the registration information of the electronic device 200 to the router 300.

The registration information may include but is not limited to information such as a registration code of the electronic device 200. A type of information included in the registration information is not limited in this application.

S804: The router 300 sends the registration information to the electronic device 200. Correspondingly, the electronic device 200 obtains the registration information of the electronic device 200.

In some embodiments, to ensure security of data transmission between the electronic device 200 and the router 300, before the router 300 sends the registration information to the electronic device 200, the router 300 and the electronic device 200 perform negotiation by using a preset parameter to obtain a key 1, and transmit the registration information based on the key 1.

Herein, when the electronic device 200 may negotiate with the router 300 by using the preset parameter to obtain the key 1, it may be considered that the electronic device 200 is a preliminarily trusted device. In some embodiments, the preliminarily trusted device may be referred to as a "level-1 whitelist device". An electronic device can initiate a registration request to a server only when the electronic device is a "level-1 whitelist device". In other words, the electronic device can access the server. This can ensure that a device that accesses the server is trusted.

First, the router 300 and the electronic device 200 perform negotiation by using the preset parameter to obtain the key 1.

After the router 300 receives the registration information that is of the electronic device 200 and that is sent by the server 400, the router 300 and the electronic device 200 perform negotiation by using the preset parameter to obtain the key 1.

It should be noted that the router 300 and the electronic device 200 perform negotiation by using the preset parameter to obtain the key 1 before the router 300 sends, to the server 400, a request for generating registration information of the electronic device 200, or after the router 300 sends, to the server 400, a request for generating registration information of the electronic device 200. This is not limited herein in this application.

In other words, the router 300 and the electronic device 200 perform negotiation by using the preset parameter to obtain the key 1 before step S801 or after step S801. This is not limited in this application, provided that the router 300 and the electronic device 200 have obtained the key 1 through negotiation by using the preset parameter before step S804.

In some embodiments, a same preset parameter has been configured for the router 300 and the electronic device 200 before delivery. Alternatively, if no preset parameter is configured for the router 300 and the electronic device 200 before factory settings, the router 300 and the electronic device 200 may download the preset parameter from the server, and store the preset parameter in the router 300 and the electronic device 200. It should be noted that the router 300 and the electronic device 200 obtain the same preset parameter from the server.

In an optional implementation, the preset parameter may be integrated into a software development kit (software development kit). The SDK is a collection of documents, examples, and tools related to mobile application software (Application, APP) development. To improve development efficiency, developers may provide a function for a third party to develop. The third party encapsulates the function into the SDK for developers to use. Therefore, the preset parameter only needs to be integrated into the SDK, and the router 300 and the electronic device 200 can obtain the preset parameter integrated in the SDK by downloading the SDK from the server.

A principle of how the router 300 and the electronic device 200 obtain the key 1 through negotiation by using the preset parameter is consistent with a principle of how the router 300 and the electronic device 200 obtain the key 2 through negotiation by using the auth code set 1 described in the subsequent embodiment. A difference lies only in that the key 1 is obtained through negotiation based on the preset parameter, and the key 2 is obtained through negotiation based on the auth code set 1. Therefore, for a process in which the router 300 and the electronic device 200 obtain the key 1 through negotiation by using the preset parameter, refer to a process in which the router 300 and the electronic device 200 obtain the key 2 through negotiation by using the auth code set 1 described in the subsequent embodiment. Details are not described in this application.

Then, the router 300 sends, to the electronic device 200, registration information encrypted by using the key 1.

To ensure security of data transmission between the electronic device 200 and the router 300, the router 300 encrypts the registration information of the electronic device 200 by using the key 1, and sends, to the electronic device 200, the registration information of the electronic device 200 that is encrypted by using the key 1.

S805: The electronic device 200 obtains the registration information.

In some embodiments, the electronic device 200 receives the registration information that is encrypted by using the key 1 and that is sent by the router 300, and the electronic device 200 decrypts, by using the key 1, the registration information encrypted by using the key 1, to obtain the registration information.

S806: The electronic device 200 sends the registration information and verification information to the router 300. Correspondingly, the router 300 obtains the registration information and the verification information.

The verification information may include one or more of the following: a public key infrastructure (public key Infrastructure, KPI) certificate and a software license (license).

After the electronic device 200 obtains the registration information, the electronic device 200 initiates a registration request to the server 400, that is, the electronic device 200 sends the registration information and the verification information to the router 300.

Optionally, the electronic device 200 may alternatively send only the registration information to the router 300.

Optionally, the electronic device 200 may alternatively send only the verification information to the router 300.

In some embodiments, the electronic device 200 sends, to the router 300, registration information encrypted by using the key 1 and verification information encrypted by using the key 1.

Optionally, the electronic device 200 may alternatively send, to the router 300, only the registration information encrypted by using the key 1.

Optionally, the electronic device 200 may alternatively send, to the router 300, only the verification information encrypted by using the key 1.

S807: The router 300 sends the registration information and the verification information to the server 400. Correspondingly, the server 400 obtains the registration information and the verification information.

After the router 300 obtains the registration information and the verification information, the router 300 sends the registration information and the verification information to the server 400.

Optionally, when the electronic device 200 sends only the registration information to the router 300, the router 300 receives the registration information sent by the electronic device 200, and the router 300 sends the registration information to the server 400.

Optionally, when the electronic device 200 sends only the verification information to the router 300, the router 300 receives the verification information sent by the electronic device 200, and the router 300 sends the verification information to the server 400.

In some embodiments, the router 300 receives the registration information encrypted by using the key 1 and the verification information encrypted by using the key 1 that are sent by the electronic device 200; the router 300 decrypts, based on the key 1, the registration information encrypted by using the key 1 and the verification information encrypted by using the key 1, to obtain the unencrypted registration information and the unencrypted verification information; and the router 300 sends the unencrypted registration information and the unencrypted verification information to the server 400.

Optionally, when the electronic device 200 sends, to the router 300, only the registration information encrypted by using the key 1, the router 300 receives the registration information that is encrypted by using the key 1 and that is sent by the electronic device 200, the router 300 decrypts, based on the key 1, the registration information encrypted by using the key 1, to obtain the unencrypted registration information, and the router 300 sends the unencrypted registration information to the server 400.

Optionally, when the electronic device 200 sends only the verification information encrypted by using the key 1 to the router 300, the router 300 receives the verification information that is encrypted by using the key 1 and that is sent by the electronic device 200, the router 300 decrypts, based on the key 1, the verification information encrypted by using the key 1, to obtain the unencrypted verification information, and the router 300 sends the unencrypted verification information to the server 400.

It should be noted that, when the electronic device 200 needs to send the verification information to the server 400 via the router 300, before the server 400 verifies that the electronic device 200 is a valid device, the electronic device 200 obtains the verification information in advance, and stores the verification information locally. That is, the electronic device 200 needs to obtain and store the verification information before S807.

The following describes how the electronic device 200 obtains the verification information.

Specifically, the electronic device 200 generates a pair of public and private keys (a public key 1 and a private key 1). After a device A encrypts data by using the private key 1, a device B may decrypt, based on the public key 1 corresponding to the private key 1, data encrypted by using the private key 1, and obtain the unencrypted data. Alternatively, the device A may encrypt the data by using the private key 1, and the device B may decrypt, based on the private key 1 corresponding to the public key 1, the data encrypted by using the private key 1, and obtain the unencrypted data. After the electronic device 200 generates the pair of public and private keys, the electronic device 200 sends the public key 1 and a request for obtaining the verification information to the server 400. After the server 400 receives the public key 1 and the request for obtaining the verification information, the server 400 presets the public key 1 in the verification information in response to the request for obtaining the verification information. Then, the server 400 sends, to the electronic device 200, the verification information in which the public key 1 is preset, and the electronic device 200 obtains the verification information in which the public key 1 is preset. It should be noted that the verification information is locally stored by the server 400.

S808: The server 400 determines, based on the registration information and the verification information, that the electronic device 200 is a valid device, and binds the electronic device 200 to the router 300.

Herein, when the server 400 determines, based on the registration information and the verification information, that the electronic device 200 is a valid device, the server 400 may consider that the electronic device 200 is a secure device. In some embodiments, a secure device may be referred to as a "level-2 whitelist device". Only when the electronic device is a "level-2 whitelist device", the electronic device can obtain network configuration information and connect, by using the network configuration information, to a wireless local area network in which the router is located. In this way, it can be ensured that the electronic device that accesses the wireless local area network in which the router is located is a secure device.

After receiving the registration information and the verification information that are of the electronic device 200 and that are forwarded by the router 300, the server 400 verifies, based on the registration information and the verification information of the electronic device 200, whether the electronic device 200 is a valid device.

Optionally, after receiving the registration information that is of the electronic device 200 and that is forwarded by the router 300, the server 400 verifies, based on the registration information of the electronic device 200, whether the electronic device 200 is a valid device.

Optionally, after receiving the verification information that is of the electronic device 200 and that is forwarded by the router 300, the server 400 verifies, based on the verification information of the electronic device 200, whether the electronic device 200 is a valid device.

Specifically, the server 400 may verify, in any one of the following manners, whether the electronic device 200 is a valid device.

Manner 1: The server 400 verifies, by using the registration information and the verification information, that the electronic device 200 is a valid device.

Specifically, first, when the server 400 determines that the registration information that is of the electronic device 200 and that is sent by the electronic device 200 via the router 300 is registration information that is sent by the server to the electronic device 200 via the router 300 before, the server 400 may preliminarily determine that the electronic device 200 is a valid device.

Then, the server 400 further verifies, by using the verification information, that the electronic device 200 is a valid device.

The following describes how the server 400 further verifies, based on the verification information, that the electronic device 200 is a valid device.

After the server 4000 obtains, by using the router 300, the verification information sent by the electronic device 200, the server 400 may obtain the public key 1 preset in the verification information, and the server 400 randomly generates a random number, and verifies validity of the electronic device 200 by using the public key 1 preset in the verification information.

If an attacker obtains, by using a special means, the verification information in which the public key 1 is preset, an electronic device of the attacker sends, to the server 400 via the router 300, the verification information in which the public key 1 is preset. If the server 400 receives the verification information that is sent by the electronic device of the attacker and in which the public key 1 is preset, the server 400 may determine that the electronic device of the attacker is a valid device. Therefore, to prevent this case from occurring, after the server 200 receives the verification information that is sent by the electronic device 200 and in which the public key 1 is preset, the server further verifies validity of the electronic device 200 based on the random number. This can improve security of subsequently transmitting the network configuration information of the router 300.

Specifically, the server 400 randomly generates the random number, and sends the random number to the electronic device 200 via the router 300.

After the electronic device 200 receives the random number via the router 300, the electronic device 200 encrypts the random number by using the private key 1, and then the electronic device 200 sends, to the server 400 via the router 300, a random number encrypted by using the private key 1.

The server 400 receives, via the router 300, the random number that is encrypted by using the private key 1 and that is sent by the electronic device 200, and the server 400 decrypts, by using the public key 1 corresponding to the private key 1, the random number encrypted by using the private key 1.

In this way, if the server 400 may receive the random number that is encrypted by using the private key 1 and that is sent by the electronic device 200, and decrypt, by using the public key 1 corresponding to the private key 1, the random number encrypted by using the private key 1, the server 400 determines that the electronic device 200 is a valid device, and the router 300 and the electronic device 200 may transmit the network configuration information.

In some embodiments, if the server 400 may receive the verification information and the registration information that are sent by the electronic device 200, but the server 400 cannot receive the random number that is encrypted by using the private key 1 and that is sent by the electronic device 200. Because the private key 1 is generated before the valid device applies to the server 400 for the verification information, an invalid device cannot obtain the private key 1 in the electronic device 200. In this way, the server 400 further improves, by using a double verification mechanism, a security mechanism for verifying validity of a device by the server 400, and security of subsequently transmitting the network configuration information between the router 300 and the electronic device 200 is ensured.

Optionally, in step S808, after the server 400 receives, via the router 300, the registration information and the verification information that are of the electronic device 200 and that are sent by the electronic device 200, the server 40 does not need to generate a random number to verify the validity of the electronic device 200. The server 400 only needs to determine that the registration information that is of the electronic device 200 and that is sent by the electronic device 200 via the router 300 is registration information that is sent by the server to the electronic device 200 via the router 300 before, and the server 400 obtains, from the verification information, the public key 1 preset in the verification information. In this case, the server 400 may determine that the electronic device 200 is a valid device.

Manner 2: The server 400 verifies, by using only the registration information, that the electronic device 200 is a valid device.

Specifically, in step S806 to step S808, the electronic device 200 only needs to send the registration information to the server 400, and the server 400 only needs to verify, by using the registration information of the electronic device 200, that the electronic device 200 is a valid device. Specifically, the electronic device 200 sends the registration information of the electronic device 200 to the server 400 via the router 300. After the server 400 receives, via the router 300, the registration information of the electronic device 200 sent by the electronic device 200, the server 400 determines that the registration information that is of the electronic device 200 and that is sent by the electronic device 200 via the router 300 is the same as the registration information that is sent by the server to the electronic device 200 via the router 300 before. In this case, the server 400 may determine that the electronic device 200 is a valid device.

Manner 3: The server 400 verifies, by using only the verification information, that the electronic device 200 is a valid device.

Specifically, in step S806 to step S808, the electronic device 200 only needs to send the verification information to the server 400, and the server 400 only needs to verify, by using the verification information of the electronic device 200, that the electronic device 200 is a valid device. Specifically, the electronic device 200 only needs to send the verification information of the electronic device 200 to the server 400 via the router 300. After the server 400 receives, via the router 300, the verification information that is of the electronic device 200 and that is sent by the electronic device 200, the server 400 verifies, by using the verification information, that the electronic device 200 is a valid device.

How the server 400 verifies, by using the verification information, that the electronic device 200 is a valid device is described in detail in Manner 1. For details, refer to the specific description in Manner 1. Details are not described in this embodiment of this application.

After the server 400 verifies that the electronic device 200 is a valid device, the server 400 stores a binding relationship between the electronic device 200 and the router 300. The electronic device 200 and the router 300 are associated with a same account. After the electronic device 200 and the router 300 are associated with the same account, the server 400 records information that the electronic device 200 and the router 300 are associated with the same account. The electronic device 200 may communicate with the server 400, and the electronic device 200 may also verify, by using the server 400, that the electronic device 200 and the router 300 are associated with the same account. Specifically, the server 400 may receive, from the electronic device 200, an instruction (for example, an instruction for instructing the router 300 to start) used to control the router 300. When the server 400 determines that the electronic device 200 and the router 300 are associated with the same account, the server 400 may send the control instruction to the router 300, so that the router 300 performs an operation corresponding to the control instruction.

After verifying that the electronic device 200 is a valid device, the server 400 sends an auth code set 1 to the router 300. The router 300 receives the auth code set 1 sent by the server 400, and then the router 300 sends the auth code set 1 to the electronic device 200. Then, the electronic device 200 and the router 300 perform negotiation by using the auth code set 1 to obtain a key 2, and completes transmission of network configuration information (for example, a name and a password of the router 300) by using the key 2.

Herein, the auth code set 1 is randomly generated by the server 400, and the auth code set 1 may include one or more auth codes.

Figure 9:
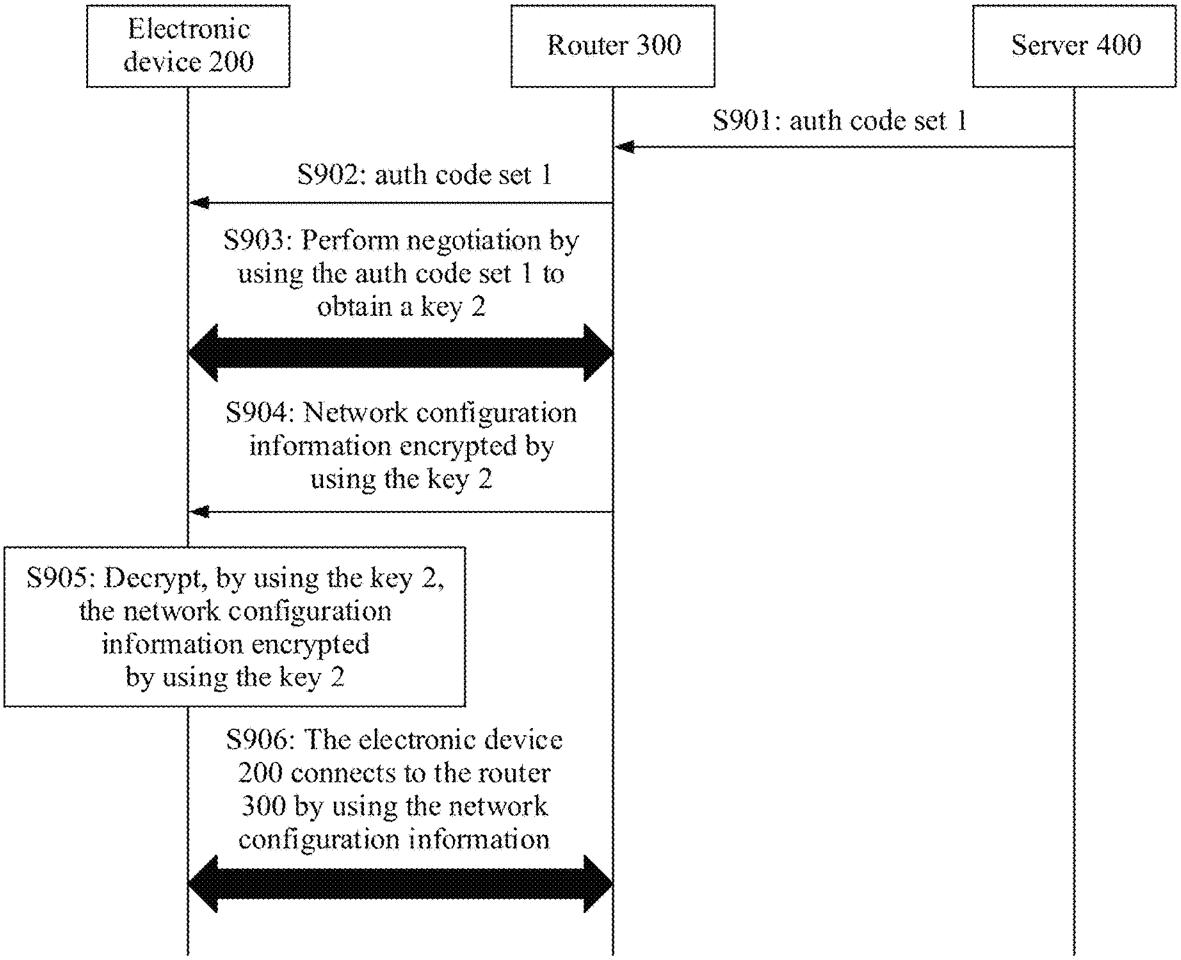
FIG. 9 is a flowchart of a method for transmitting network configuration information between an electronic device 200 and a router 300 according to an embodiment of this application.

FIG. 9 is a flowchart of an example of a method for transmitting network configuration information between an electronic device 200 and a router 300.

S901 to S906 show examples of steps of the method for transmitting the network configuration information between the electronic device 200 and the router 300. It should be noted that, in some embodiments, steps of the method for transmitting the network configuration information between the electronic device 200 and the router 300 may include more or fewer steps than S901 to S906. This is not limited herein in this application. In addition, an execution sequence of each step in S901 to S906 is not limited in this application.

S901: A server 400 sends an auth code set 1 to the router 300.

S902: The router 300 sends the auth code set 1 to the electronic device 200.

After the server 400 verifies that an electronic device 100 is a valid device, the server 400 randomly generates an auth code (the auth code set 1), and sends the auth code set 1 to the router 300. The router 300 receives the auth code set 1 sent by the server 400, and then the router 300 sends the auth code set 1 to the electronic device 200, so that the router 300 and the electronic device 200 subsequently perform negotiation based on the auth code set 1 to obtain a key 2 to transmit the network configuration information.

It should be noted that, for a different to-be-network-configured device, the server 400 randomly generates a different auth code set 1. Therefore, the different to-be-network-configured device and the router 300 perform negotiation based on the auth code set 1 to obtain a different key 2. In this way, security of transmitting the network configuration information between the electronic device 200 and the router 300 is further improved.

S903: The electronic device 200 negotiates with the router 300 based on the auth code set 1 to obtain the key 2.

In some embodiments, the electronic device 200 and the router 300 may perform negotiation based on the auth code set 1 by using a diffie-hellman (diffie hellman, DH) algorithm to obtain the key 2. In another embodiment, the electronic device 100 and the router 300 may alternatively perform negotiation based on the auth code set 1 by using another algorithm to obtain the key 2. This is not limited in this embodiment of this application. In the following embodiment of this application, an example in which the electronic device 200 and the router 300 perform negotiation based on the auth code set 1 by using the DH algorithm to obtain the key 2 is used for description.

In the DH algorithm, the electronic device 200 and the router 300 only transfer a parameter in a formula that is used to perform calculation to obtain the key 2, and do not directly transfer the key 2. In this way, if an attacker monitors a communication process of the electronic device 200 and the router 300, even if the attacker obtains the parameter in the formula that is used to perform calculation to obtain the key 2, the attacker does not know which formula is used to obtain the key 2. In this way, it is difficult for the attacker to obtain the key 2. The electronic device 200 and the router 300 perform negotiation in this manner to obtain the key 2, to ensure that the key 2 may not be stolen by the attacker, and ensure security of transmitting the network configuration information between the electronic device 200 and the router 300.

The following describes the basic principles of the DH algorithm. The DH algorithm may include but is not limited to the following steps.

Step 1: The router 300 sends a prime number P and a prime number G to the electronic device 200.

It should be noted that the prime number P is a very large number, and the prime number G may be a relatively small number. This is not limited in this application.

In some embodiments, the prime number P and the prime number G may alternatively be generated by the electronic device 200 and sent to the router 300. This is not limited in embodiments of this application.

Step 2: The electronic device 200 calculates a value of $(G^A)$ mod P, and sends the value of $(G^A)$ mod P to the router 300.

Step 3: The router 300 calculates a value of (GB) mod P, and sends the value of (GB) mod P to the electronic device 200.

In step 2 and step 3, the auth code set 1 includes m auth codes, where m is greater than or equal to 1. When m=1, that is, the auth code set 1 includes only one auth code, A indicates the one auth code in the auth code set 1. When m is greater than or equal to 2, that is, when the auth code set 1 includes at least two auth codes, A indicates a product of the m auth codes in the auth code set 1. A calculation principle of B is similar to that of A.

Step 4: The electronic device 200 may obtain the key 2 through calculation according to Formula (1) based on the value of (GB) mod P sent by the router 300.

$$K = ((G^B))^A \bmod P \qquad \text{Formula (1)}$$

It can be learned from Formula (1) that $K = G^{A \times B} \bmod P$. A is an auth code set 1 sent by the server 400 to the electronic device 200, and K is a key 2 obtained through negotiation between the electronic device 200 and the router 300.

Step 5: The router 300 may obtain the key 2 through calculation according to Formula 2 based on the value of $(G^A)$ mod P sent by the electronic device 200.

$$K = ((G^A))^B \bmod P \qquad \text{Formula (2)}$$

It can be learned from Formula (2) that $K = G^{A \times B} \bmod P$. B is an auth code set 1 sent by the server 400 to the router 300, and K is a key 2 obtained through negotiation between the electronic device 200 and the router 300.

It can be learned from step 4 and step 5 that the key 2 obtained by the electronic device 200 through negotiation is the same as the key 2 obtained by the router 300 through negotiation. Then, the electronic device 200 and the router 300 may transmit the network configuration information by using the key 2.

It should be noted that the formulas shown in the foregoing embodiment are merely used to explain a process of obtaining the key 2 through negotiation by the electronic device 200 and the router 300. In another embodiment, a formula for calculating a key in the DH algorithm may be the same as or different from the formula for calculating the key 2 in the foregoing steps. This is not limited in this application.

It can be learned from the foregoing analysis that a manner in which the electronic device 200 and the router 300 obtain the key 2 through negotiation by using the DH algorithm can improve security of subsequently transmitting the network configuration information. In a manner of obtaining the key 2 by the electronic device 200 and the router 300 through negotiation by using the DH algorithm, only a parameter value in the formula is transferred between the electronic device 200 and the router 300. Even if the attacker monitors the communication process between the electronic device 200 and the router 300 and intercepts the parameter value in the formula transferred between the electronic device 200 and the router 300, it is difficult to obtain a true key through calculation according to the parameter value in the formula. In addition, after the server 400 verifies that the electronic device 200 is a valid device, the server 400 sends the auth code set 1 to the router 400 and the electronic device 200. To be specific, after different devices initiate verification to the server 400 at different times, the server 400 randomly sends different auth code sets 1 to the different electronic devices, that is, different devices obtain different keys through negotiation with the router 300 by using the DH algorithm. Therefore, it is difficult for the attacker to obtain the key. In this way, security of transmitting network configuration information between different devices and the router 300 is further improved.

S904: The router 300 sends, to the electronic device 200, network configuration information encrypted by using the key 2. Correspondingly, the electronic device 200 obtains the network configuration information encrypted by using the key 2.

S905: The electronic device 200 decrypts, by using the key 2, the network configuration information encrypted by using the key 2, to obtain the network configuration information.

The router 300 encrypts the network configuration information by using the key 2, and sends the network configuration information encrypted by using the key 2 to the electronic device 200. After the electronic device 200 receives the network configuration information encrypted by using the key 2, the electronic device 200 decrypts, by using the key 2, the network configuration information encrypted by using the key 2, to obtain the network configuration information of the router 300.

After the router 300 sends the network configuration information encrypted by using the key 2 to the electronic device 200, the router 300 stops sending the open ssid of the router 300.

S906: The electronic device 200 connects to the router 300 based on the network configuration information of the router 300.

The network configuration information may include but is not limited to a name and a password of the router 300, and the network configuration information may further include more other information. This is not limited in this application.

After the electronic device 200 obtains the network configuration information of the router 300, the electronic device 200 connects to the router 300 based on the network configuration information of the router. In this way, the electronic device 200 may access the internet by using the router 300.

Based on the network configuration method provided in embodiments of this application, the following describes two application scenarios in embodiments of this application.

Scenario 1: Remote Network Configuration

A remote network configuration application scenario means that a user A operating the electronic device 100 may also remotely instruct a user B operating the electronic device 200 to power on the electronic device 200, and the user A remotely operates the electronic device 100 to complete network configuration on the electronic device 200. Specifically, the router 300 discovers the electronic device 200 that is in the to-be-network-configured state, and the electronic device 100 displays, on a remote network configuration interface of a first application (for example, an AI life application), prompt information indicating that the electronic device 200 in the to-be-network-configured state is discovered. Then, the electronic device 100 may receive an input operation performed by the user A on the remote network configuration interface of the first application, and trigger the router 300 to send network configuration information to the electronic device 200 that is in the to-be-network-configured state, so that the electronic device 200 receives the network configuration information sent by the router 300, and the electronic device 200 connects to the router 300 by using the network configuration information of the router 300. The user A and the user B may not be a same user, and the user A does not need to be near the router 300 and the electronic device 200. In this way, even if the user A does not operate the router 300 and the electronic device 200, the electronic device 200 may remotely connect to the router 300 on the electronic device 100.

For example, the child purchases a smart product (for example, a smart sound box) for the parent at home, and the parent does not know how to connect the smart sound box to a router at home. In this case, according to the network configuration method provided in embodiments of this application, the child guides, by a phone, the parent to power on the smart sound box and enable the smart sound box to be in a to-be-network-configured state, and the smart sound box broadcasts a network configuration information element. The router at home receives the network configuration information element and discovers the smart sound box that is in the to-be-network-configured state. In this case, an indicator of the router blinks. If the parent does not know how to press a network configuration button of the router, or the router is located in a place that is inconvenient to obtain, for example, a weak-current box or a cabinet top. In this case, the child may enter the remote network configuration interface of the first application (for example, the AI life application) by using a mobile phone of the child. The mobile phone of the child may display, on the remote network configuration interface of the AI life application, prompt information indicating that a device in a to-be-network-configured state is discovered. The child determines that the to-be-network-configured device displayed on the remote network configuration interface is the smart sound box purchased for the parent. Then, the mobile phone may receive an input operation performed by the child on the remote network configuration interface. In response to the input operation, the router 300 sends network configuration information to the smart sound box, and the smart sound box connects to the router at home after obtaining the network configuration information.

Figure 9A:
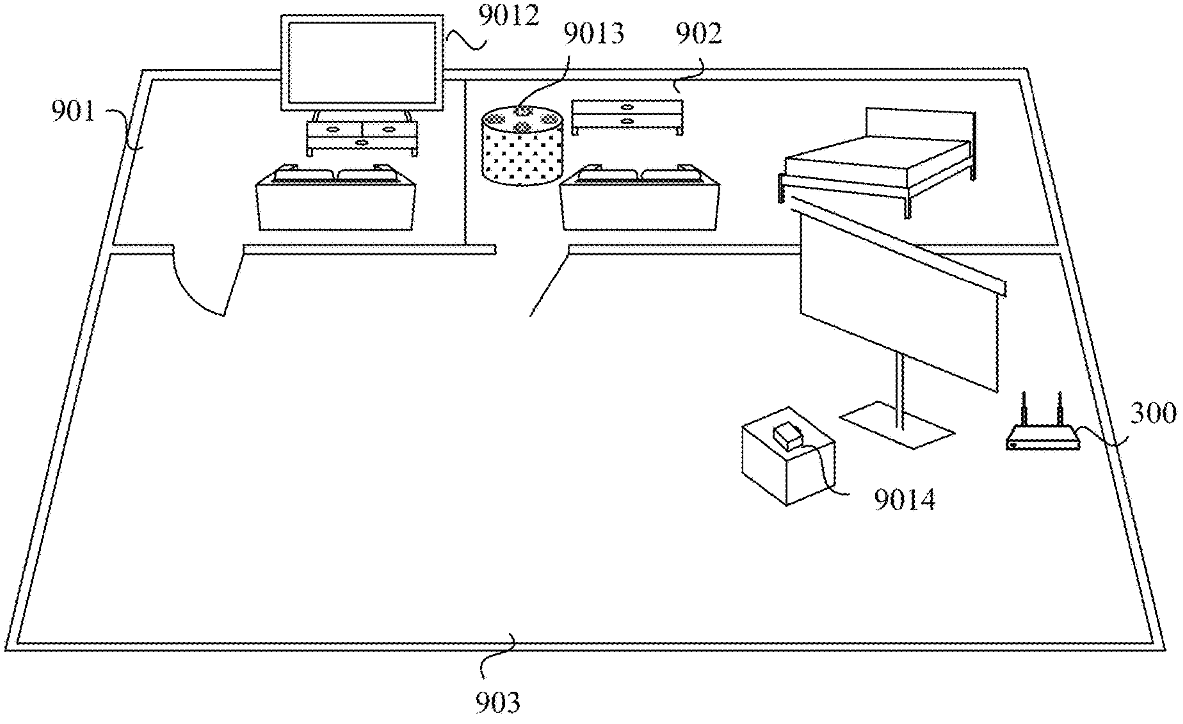
FIG. 9A to FIG. 9F are diagrams of a group of "remote network configuration" UIs according to an embodiment of this application.

As shown in FIG. 9A, this home application scenario includes a first room area 901, a second room area 902, and a living room area 903. The first room area 901 includes a smart television 9012, the second room area 902 includes a smart sound box 9013, and the living room area 903 includes a router 300, a smart projector 9014, and the like.

It should be understood that, in the remote network configuration application scenario described herein, a user who starts the electronic device 200 and enables the electronic device 200 to be in a to-be-network-configured state and a user who enters an operation on the electronic device 100 may be different users, or may be a same user.

In a case of different users, if the user who starts the electronic device 200 and enables the electronic device 200 to be in a to-be-network-configured state is referred to as a "user B", the user who enters an operation on the electronic device 100 is referred to as a "user A", the user B needs to be located at the home shown in FIG. 9A, to start the electronic device 200 and enable the electronic device 200 to be in the to-be-network-configured state. The user A may not be located at the home shown in FIG. 9A, and the router 300 at the home shown in FIG. 9A does not need to be accessed. The user A may remotely instruct the user B to power on the electronic device 200, and remotely perform network configuration on the electronic device 200 by operating the electronic device 100. Therefore, this solution can be used to implement remote network configuration.

For example, when the user B is a user who is unfamiliar with a network configuration operation, the user B only needs to power on the electronic device 200, and then the user A can remotely complete other network configuration operations. Therefore, the network configuration method provided in embodiments of this application is applied to the remote network configuration scenario. Learning costs of the user B can be reduced, operations of the user B can be simplified, and the remote user A can complete the network configuration operations for the user B. In addition, before the router 300 sends the network configuration information to the electronic device 200, the server 400 verifies whether the electronic device 200 is a valid device. After the server 400 verifies that the electronic device 200 is a valid device, the server 400 randomly generates an auth code set 1 and sends the auth code set 1 to the router 300 and the electronic device 200. The router 300 and the electronic device 200 perform negotiation by using the auth code set 1 to obtain a key to encrypt and transmit the network configuration information. It can be learned from analysis of the foregoing embodiments that after different devices initiate verification on the server 400 at different times, the server 400 randomly sends different auth code sets 1 to the different devices. In this way, security of transmission the network configuration information between the router 300 and the electronic device 200 is further improved.

FIG. 9B to FIG. 9F are diagrams of examples of UIs on which a user controls, on a remote network configuration interface of a first application, the electronic device 200 to connect to the router 300.

Figure 9B:
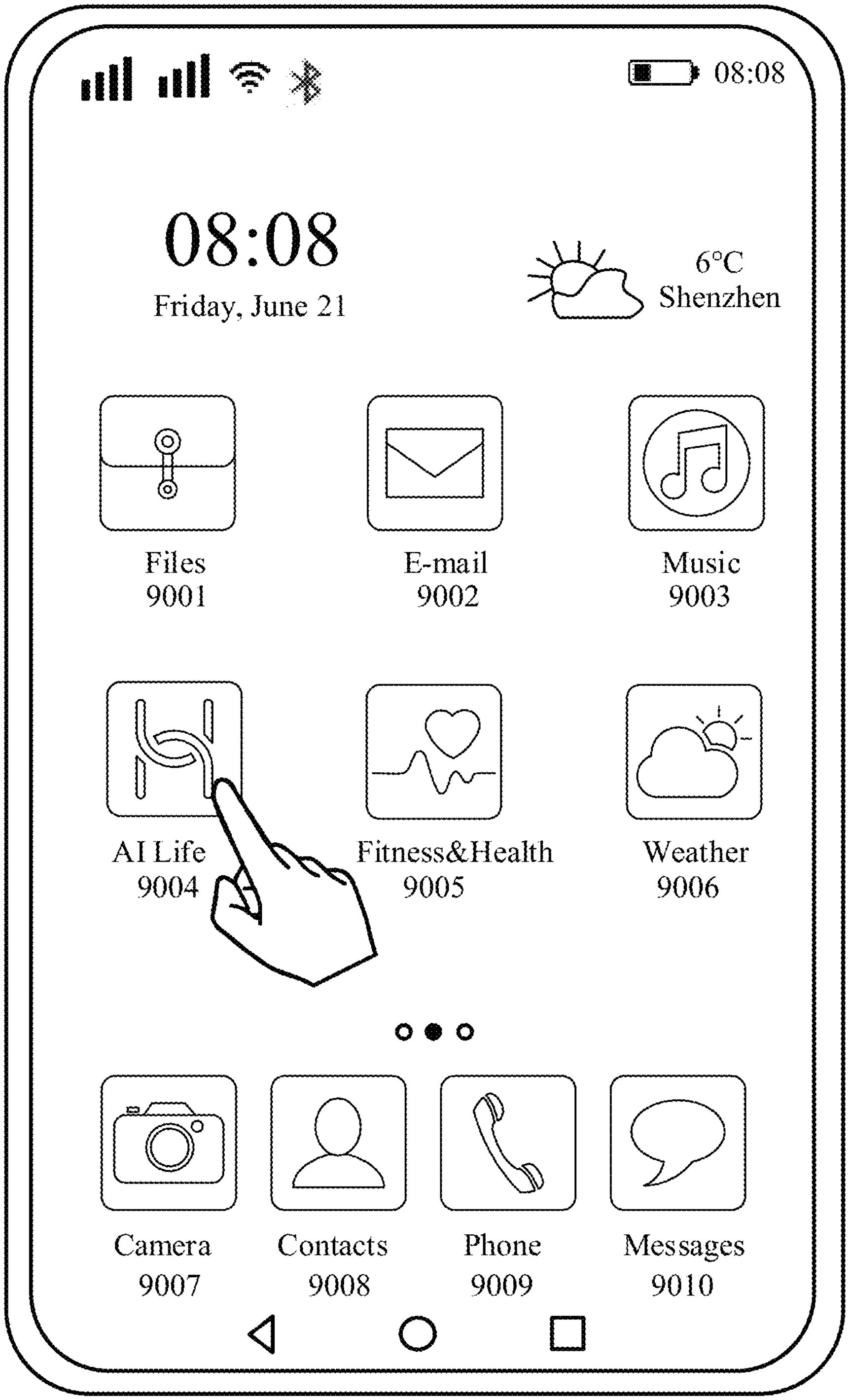

FIG. 9B shows an example of a user interface 910 of the electronic device 100. The user interface 910 may include icons of some applications, for example, a Files icon 9001, an E-mail icon 9002, a Music icon 9003, an AI life icon 9004, a Fitness & Health icon 9005, a Weather icon 9006, a Camera icon 9007, a Contacts icon 9008, a Phone icon 9009, and a Messages icon 9010. In some embodiments, the user interface 910 may include icons of more or fewer applications. In some embodiments, the user interface 910 may include icons of some applications that are different from the applications shown in FIG. 9B. This is not limited herein.

The electronic device 100 may start the AI life application in response to a user operation performed on the AI life icon 9004 on the user interface 910.

Figure 9C:
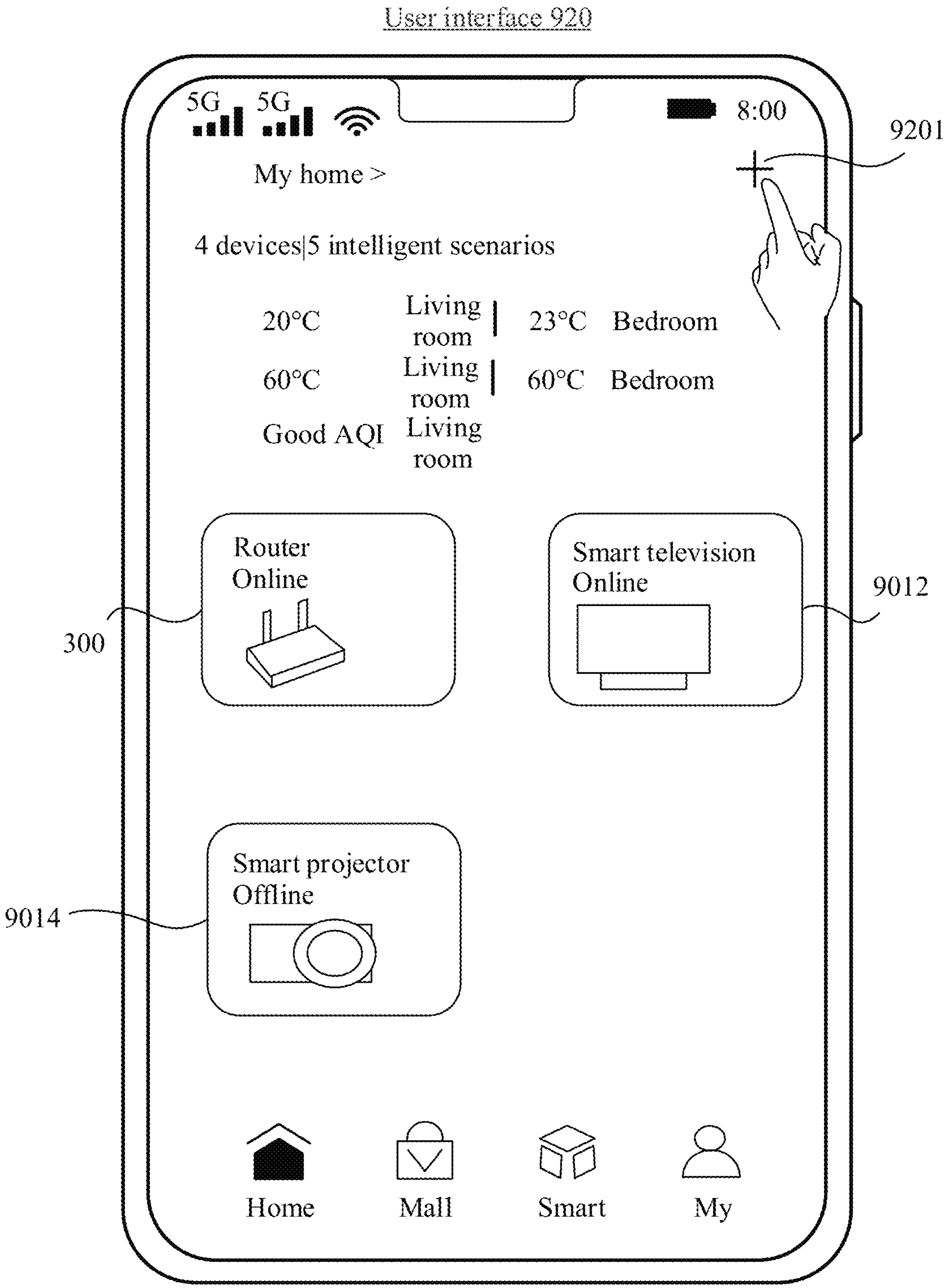

FIG. 9C shows an example of a user interface 920 displayed after the electronic device 100 starts the AI life application. The user interface 920 is a home page provided by the AI life application.

The user interface 920 includes one or more electronic devices associated with a same account, and there is a binding relationship between the one or more electronic devices associated with the same account. The user interface 920 shows an example of a router 300. The router 300 is in an online state, and the router 300 is placed in the living room area 903 shown in FIG. 9A. The smart television 9012 is in an online state, and the smart television 9012 is placed in the first room area 901 shown in FIG. 9A. The smart projector 9014 is in an offline state, and the smart projector 9014 is placed in the living room area 903 shown in FIG. 9A. The "online state" may be a state in which the electronic device 200 can communicate with the server 400 or the electronic device 100. The user A may control the electronic device 200 in the online state by using the electronic device 100, or obtain status information of the electronic device 200. The "offline state" may be a state in which the electronic device 200 cannot communicate with the server 400 or the electronic device 100, and the user A cannot control the electronic device 200 in the offline state by using the electronic device 100.

When the user B operating the electronic device 200 needs to establish a connection between the electronic device 200 and the router 300, the electronic device 200 is already in the to-be-network-configured state and is near the router 300. However, the user B is not familiar with an operation of establishing a connection between the electronic device 200 and the router 300. In this case, the user A operating the electronic device 100 may verify, on the remote network configuration interface of the first application, whether there is prompt information indicating that the router 300 discovers the electronic device 200 in the to-be-network-configured state. If the user A confirms that the prompt information displayed on the remote network configuration interface is information about the electronic device 200 that requires network configuration, the electronic device 100 may receive a confirmation operation of the user A, and the router 300 sends the network configuration information of the router 300 to the electronic device 200.

Figure 9D:
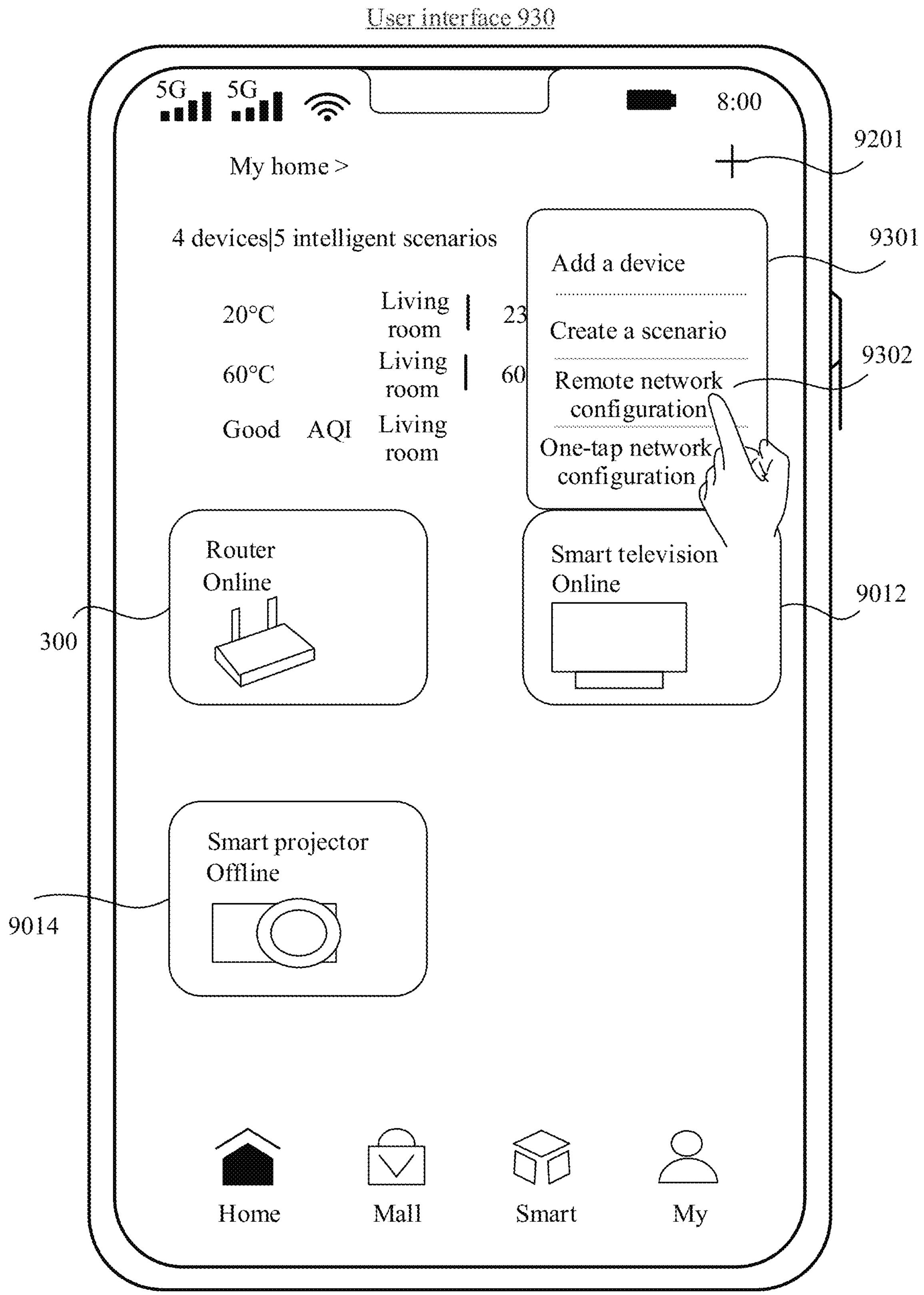
Figure 9E:
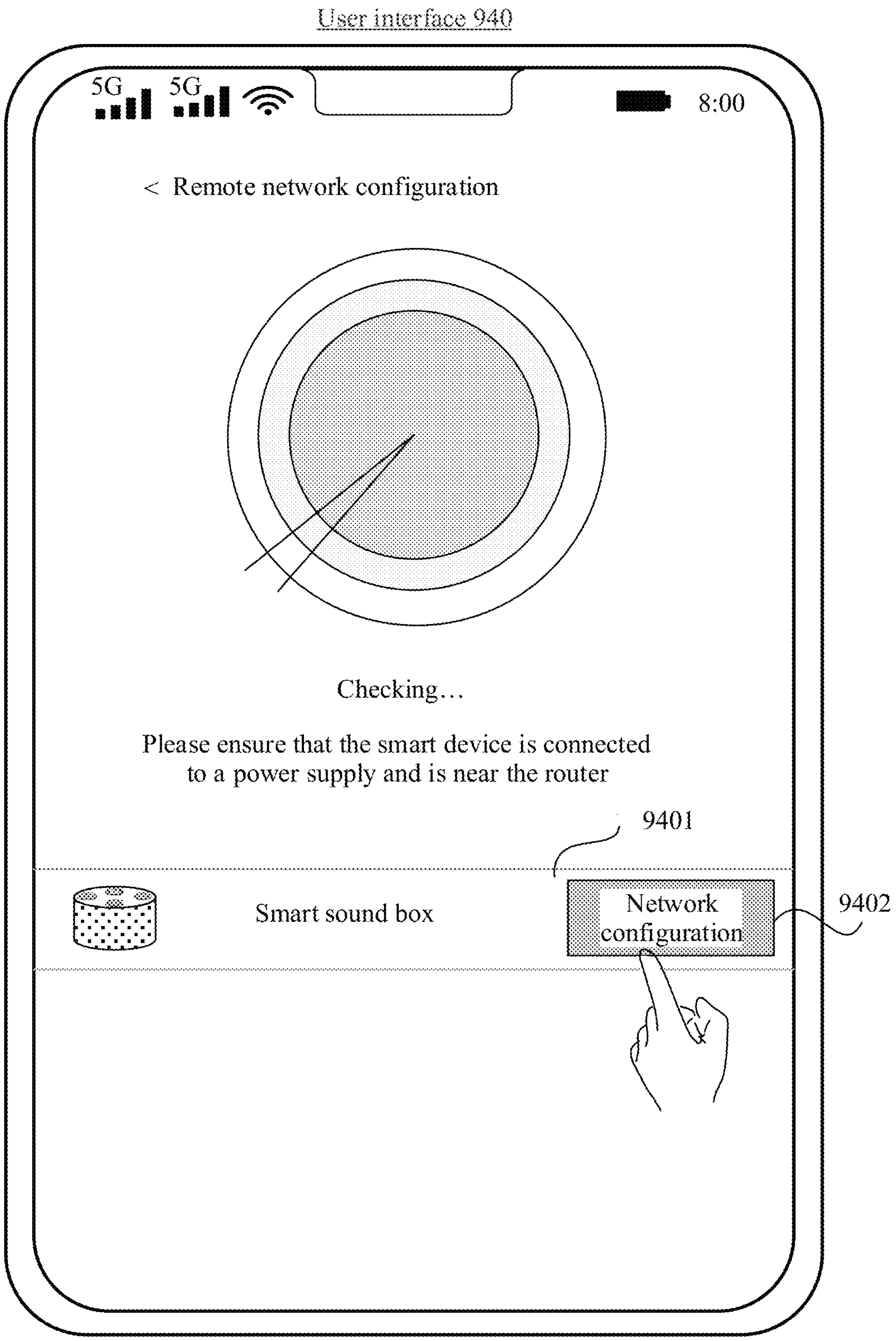

Specifically, as shown in FIG. 9C, the icon 9201 may receive a trigger (for example, tap) operation of a user, and in response to the trigger operation of the user, the electronic device 200 displays a user interface 930 shown in FIG. 9D.

The user interface 930 includes an information bar 9301, and the information bar 9301 includes an icon 9302. The icon 9302 may receive a trigger (for example, tap) operation of the user, and in response to the trigger operation of the user, the electronic device 100 displays a user interface 940 of remote network configuration shown in FIG. 9E. The icons 9302 on the user interface 930 include a text "Remote network configuration". However, it should be understood that the text information may also be "Network configuration". In other words, regardless of whether the network configuration is remote network configuration or non-remote network configuration, the network configuration method provided in embodiments of this application is applicable. Content shown in the accompanying drawings does not constitute a limitation on embodiments of this application.

The user interface 940 may include a prompt bar 9401, and the prompt bar 9401 includes an icon, a name (for example, a smart sound box), and a control 9402 of a to-be-network-configured device that is discovered by the router 300.

The electronic device 100 may receive and respond to a trigger (for example, tap) operation performed by the user on the control 9402. The operation indicates that the user agrees that the router 300 sends the open ssid to the to-be-network-configured device. Specifically, the electronic device 100 sends the information 2 to the server 400 by using the first application (such as the AI life application), and the server 400 forwards the information 2 to the router 300.

In some other implementations, the electronic device 100 may also automatically pop up and display the prompt bar 9401 on the user interface of the electronic device 100 in response to the prompt information that is sent by the server 400 and that is about discovering the electronic device 200 in the to-be-network-configured state, instead of requiring the user to tap the icon 9302 to display the prompt bar 9401.

Before the electronic device 100 automatically displays the prompt bar 9401, the electronic device 100 may be on any user interface, for example, a home screen, a leftmost screen, an interface of another application, an interface of the AI life application, a lock screen, or a screen-off interface. In this way, the user A can obtain the network configuration prompt information related to the electronic device 200 at any time, to respond to and perform a user operation in a timely manner.

After the router 300 receives the information 2, the router 300 sends the open ssid to the to-be-network-configured device (for example, the electronic device 200).

The electronic device 200 receives the open ssid of the router 300, and connects to the open ssid of the router 300. Then, after the electronic device 200 establishes a binding relationship with the router 300 by using the embodiment shown in FIG. 8, the electronic device 200 and the router 300 are associated with a same account. In this case, an icon, a name, and a connection status of the electronic device 200 may be displayed on the user interface 950.

Figure 9F:
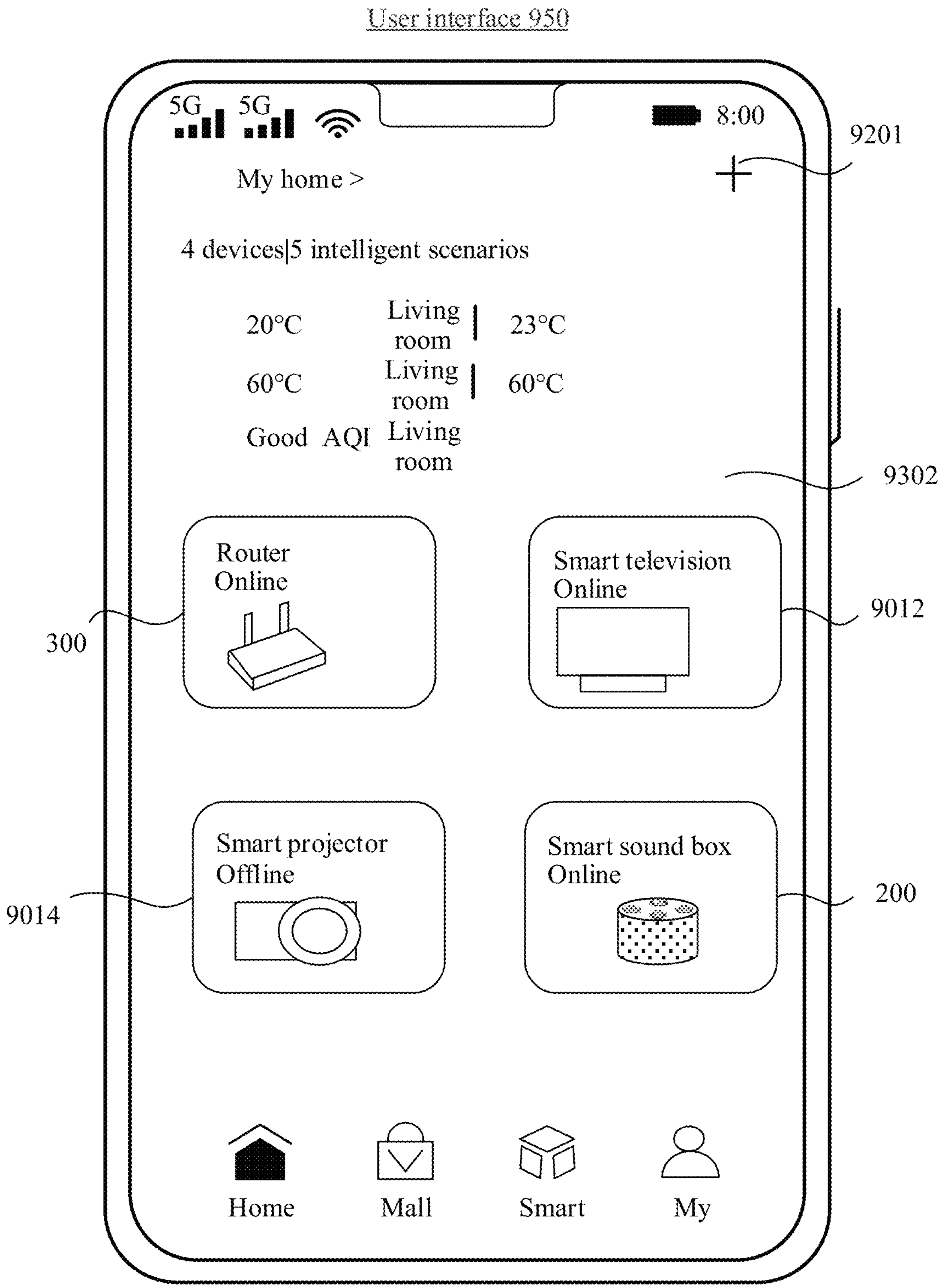

As shown in FIG. 9F, the user interface 950 includes one or more electronic devices associated with a same account, and there is a binding relationship between the one or more electronic devices associated with the same account. The router 300, the smart television 9012, the smart projector 9014, and the electronic device 200 are all associated with a same account. The user interface 950 shows, as an example, that the router 300 is in an online state. The smart television 9012 is in an online state. The smart projector 9014 is in an offline state. The electronic device 200 is in an online state.

In some implementations, when the electronic device 200 completes the step of connecting to the open ssid of the router 300 but has not completed the entire network configuration procedure, on the user interface 950, a status of the electronic device 200 (the smart sound box is used as an example herein) may be displayed as "connecting", "network configuring", "configuring", or the like. After the electronic device 200 completes the entire network configuration procedure, on the user interface 950, the status of the electronic device 200 may be displayed as "online", "connected", "network configuration completed", or the like. Therefore, the user A can accurately sense the network configuration progress of the electronic device 200 by using the electronic device 100.

In some implementations, if the electronic device 200 encounters a fault in the network configuration procedure and cannot successfully complete the entire network configuration procedure, failure prompt information may also be displayed on a user interface of the electronic device 100 to notify the user A that the network configuration fails. Therefore, the user A can take actions in time to locate a fault cause. For example, the user A may call the user B to query whether a power supply of the electronic device 200 is securely connected, whether the router works normally, and the like.

After the electronic device 200 connects to the open ssid of the router 300, the electronic device 200 and the router 300 may obtain, by using the embodiment shown in FIG. 9, the network configuration information of the router 300, and the electronic device 200 connects, by using the network configuration information of the router 300, to a wireless local area network in which the router 300 is located. In this way, the entire procedure of performing remote network configuration for the electronic device 200 is completed.

Scenario 2: One-Tap Network Configuration

One-tap network configuration means that one or more to-be-network-configured devices are configured with a network at a time. That is, a user needs to perform an operation only once. A router 300 continuously sends an open ssid, and sequentially completes a network configuration procedure of a plurality of to-be-network-configured devices connected to the open ssid of the router 300. After the router 300 determines that a quantity of devices connected to the open ssid of the router 300 is 0, the router 300 stops sending the open ssid.

For example, there are a plurality of smart products (such as a smart sound box and a smart projector) at home. The router 300 discovers the smart sound box and the smart projector that are in a to-be-network-configured state. The router 300 receives a user operation indicating that network configuration is agreed. The router 300 continuously sends the open ssid. After the smart sound box and the smart projector are connected to the open ssid of the router 300, the router 300 may sequentially complete a network configuration procedure with the smart sound box and the smart projector. It can be learned that the router 300 can complete a network configuration procedure with a plurality of smart products by receiving only one user operation indicating that network configuration is agreed. Compared with the fact that currently the router 300 can complete a network configuration procedure with only one device by receiving one user operation indicating that network configuration is agreed, embodiments of this application can implement network configuration for a plurality of devices at the same time, and improve efficiency of network configuration for the plurality of devices.

Specifically, after the router 300 receives a packet that carries a network configuration IE and that is sent by one or more electronic devices in the to-be-network-configured state nearby, the router 300 may prompt, in a manner in which the indicator of the router 300 blinks or in another manner, the user that the router 300 discovers the one or more electronic devices that are in the to-be-network-configured state, which is not limited in this application.

After the indicator of the router 300 blinks, the router 300 receives a first user operation indicating that network configuration is agreed. The first user operation indicates that the user agrees that the router 300 sends an open ssid to the one or more electronic devices in the to-be-network-configured state.

Alternatively, the first user operation may be an input operation on a one-tap network configuration interface of the first application, or the first user operation may be an operation that is received by the router 300 and that triggers (for example, presses) a network configuration button on the router 300 by the user. A specific implementation of the first user operation indicating that network configuration is agreed is not limited in this embodiment of this application.

Figure 10A:
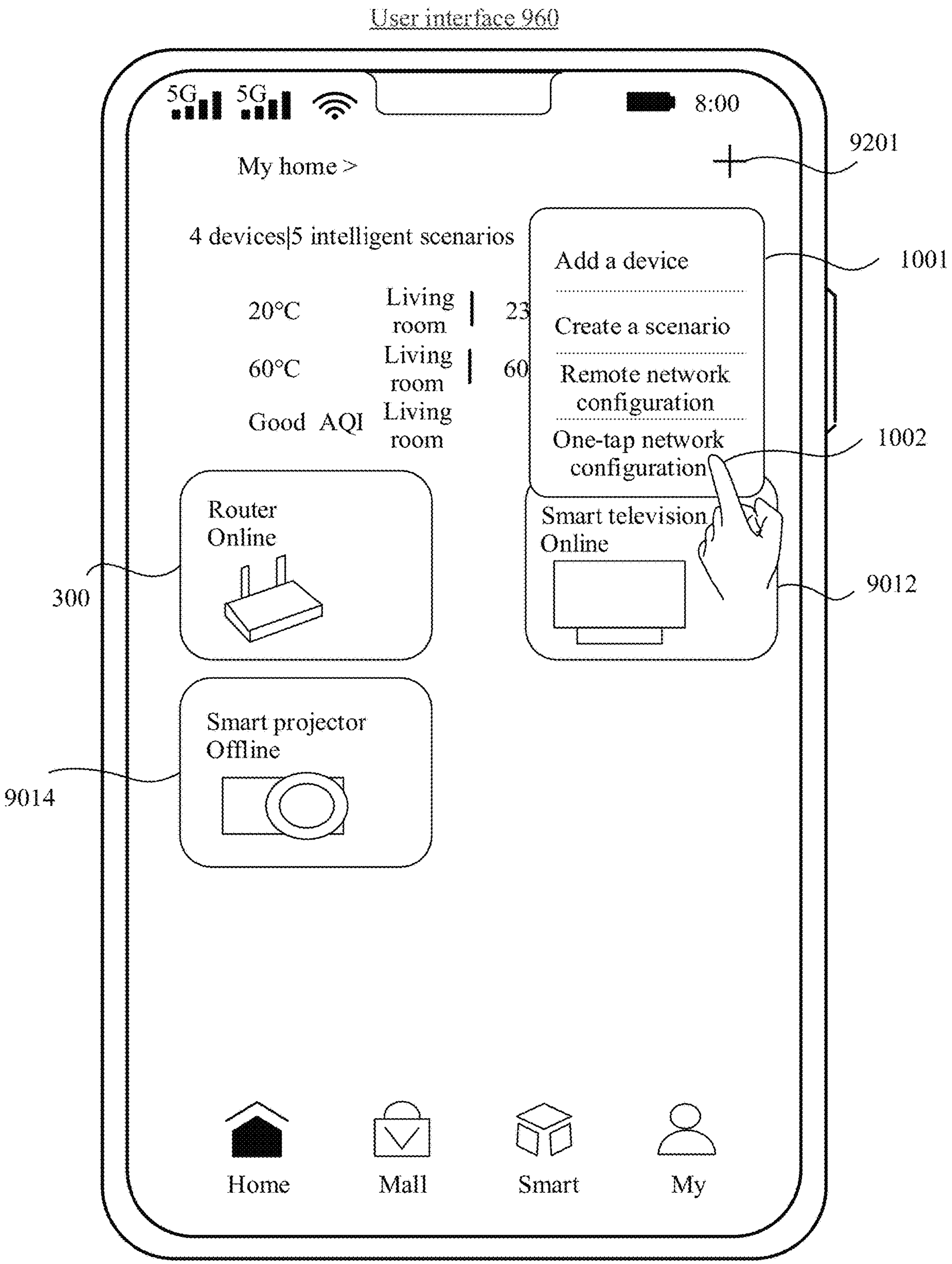
FIG. 10A to FIG. 10C are diagrams of a group of "one-tap network configuration" UIs according to an embodiment of this application.
Figure 10B:
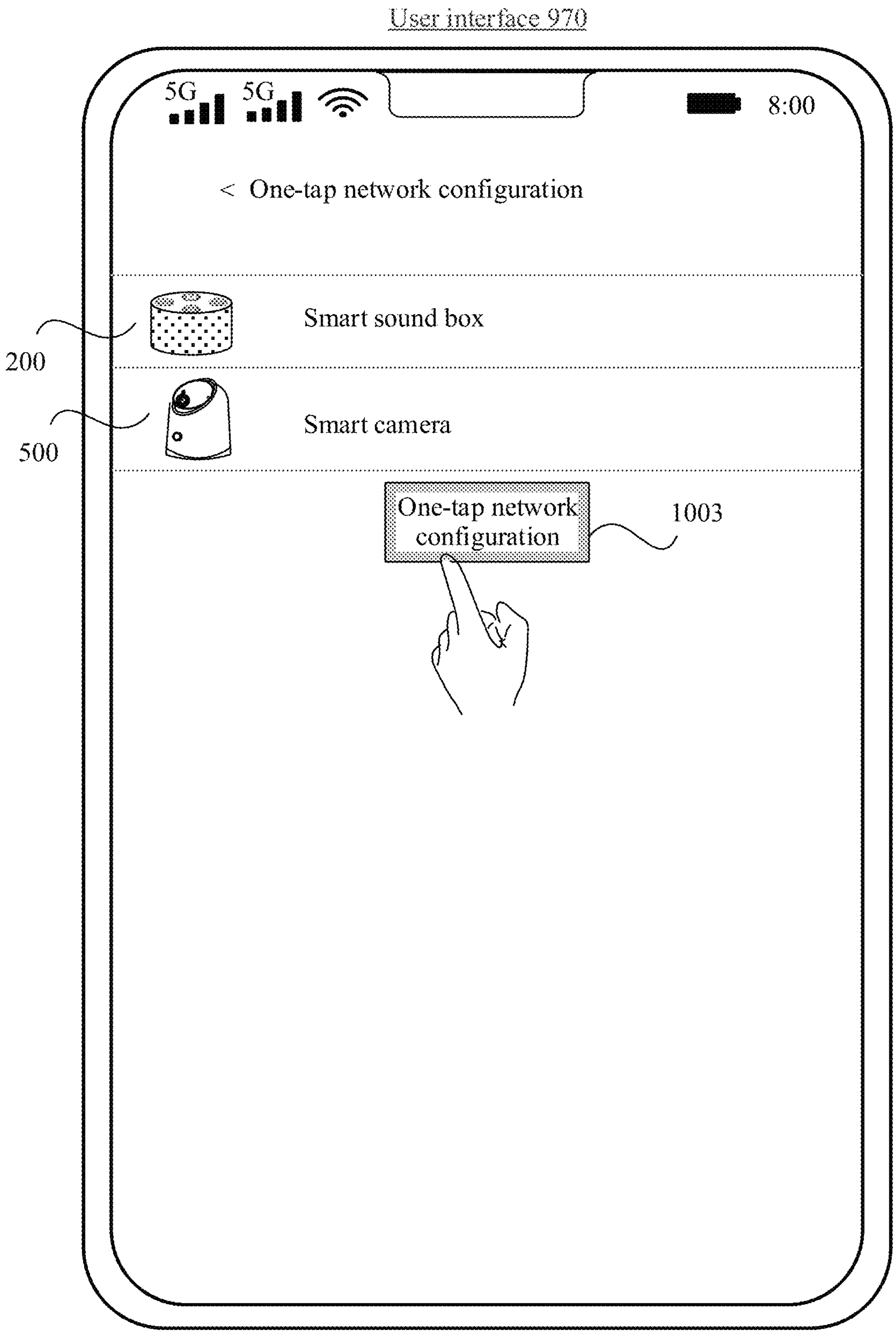

FIG. 10A and FIG. 10B describe a schematic diagram of receiving a first user operation on a one-tap network configuration interface of a first application by an electronic device 100.

First, the electronic device 100 receives a user operation to open the first application (for example, an AI life application).

For details, refer to the embodiments shown in FIG. 9B and FIG. 9C.

Then, the electronic device 100 receives an operation of opening the one-tap network configuration interface of the first application by a user.

Specifically, as shown in FIG. 9C, the icon 9201 may receive a trigger (for example, tap) operation of the user, and in response to the trigger operation of the user, the electronic device 100 displays a user interface 960 shown in FIG. 10A.

The user interface 960 includes an information bar 1001, and the information bar 1001 includes an icon 1002. The icon 1002 may receive a trigger (for example, tap) operation of the user. In response to the trigger operation of the user, the electronic device 100 displays a user interface 970 of one-tap network configuration shown in FIG. 10B.

The user interface 970 may include a control 1003 and icons of one or more electronic devices that are in a to-be-network-configured state and that are discovered by a router 300. For example, an icon of an electronic device that is in a to-be-network-configured state and that is discovered by the router 300 is an icon of an electronic device 200 (a smart sound box) and an icon of an electronic device 500 (a smart camera).

The electronic device 100 may receive and respond to a trigger operation (for example, a tap operation) of the user on the control 1003. The operation indicates that the user agrees that the router 300 sends an open ssid. The electronic device 100 sends information 2 to a server 400 by using the first application (such as the AI life application), and the server 400 forwards the information 2 to the router 300.

After the router 300 receives the information 2, the router 300 sends the open ssid. It may be understood that, in a one-tap network configuration application scenario, the router 300 continuously sends the open ssid. The user may tap the icon 1003 only once, so that a plurality of to-be-network-configured devices can complete a network configuration process with the router 300 at a time.

After the router 300 continuously sends the open ssid in a broadcast form, one or more electronic devices in a to-be-network-configured state receive the open ssid sent by the router 300. Then, according to the embodiments shown in FIG. 7 to FIG. 9, the router 300 sequentially establishes a connection to the one or more electronic devices, so that the one or more electronic devices may obtain network configuration information of the router 300 according to the embodiments shown in FIG. 7 to FIG. 9, and connect to the router 300 by using the network configuration information of the router 300.

For example, the electronic device 200 (the smart sound box) and the electronic device 500 (the smart camera) receive and connect to the open ssid of the router 300. Then, the server 400 sequentially associates the smart sound box, the smart camera, and the router 300 with a same account according to the embodiment shown in FIG. 8. After the smart sound box, the smart camera, and the router 300 are associated with the same account, the icon, a name, and a connection status of the smart sound box and the icon, a name, and a connection status of the smart camera may be displayed on the user interface 920.

Figure 10C:
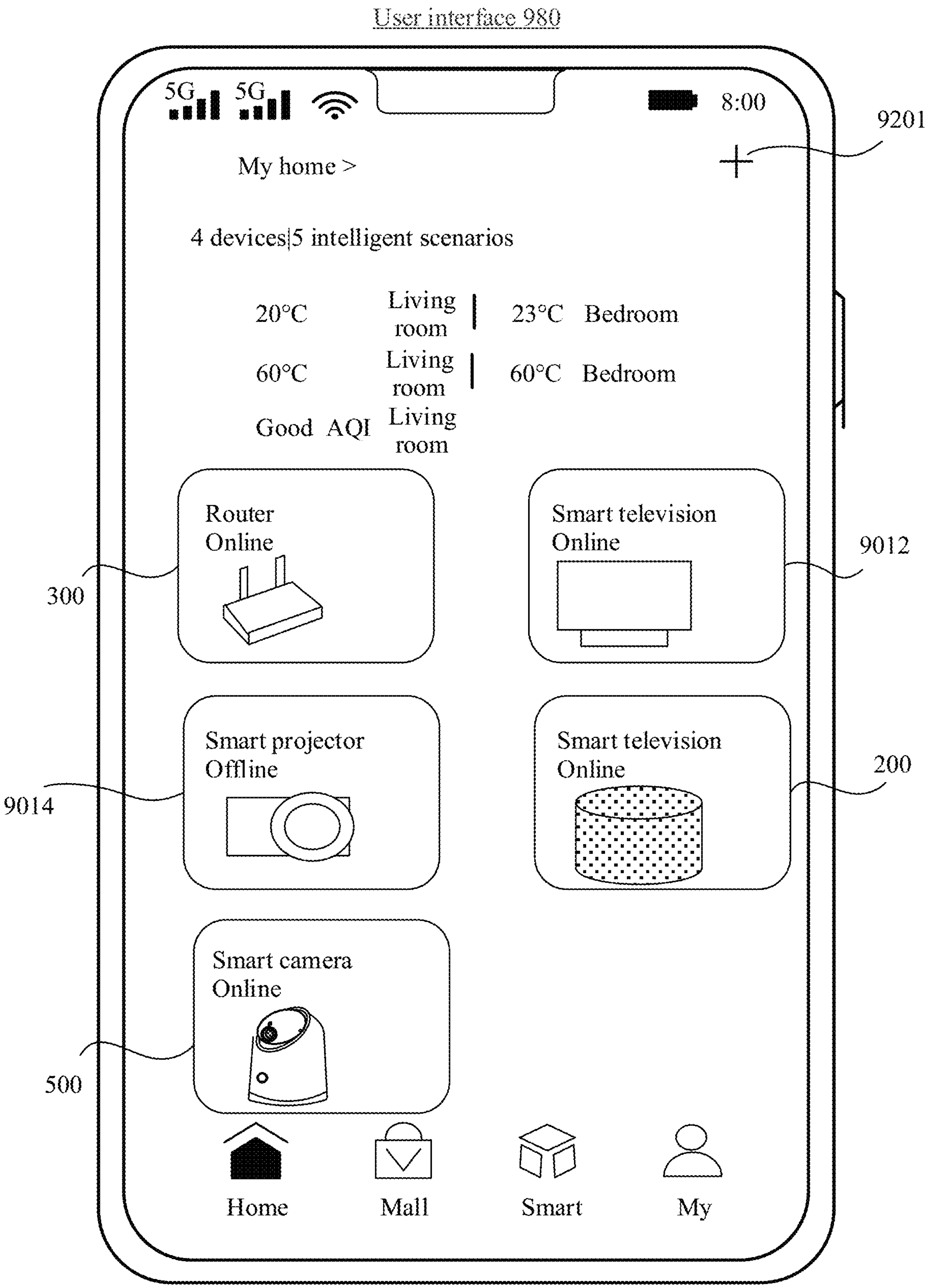

As shown in FIG. 10C, a user interface 980 includes one or more electronic devices associated with a same account, and there is a binding relationship between the one or more electronic devices associated with the same account. The router 300, a smart television 9012, a smart projector 9014, the smart sound box, and the smart camera are all associated with a same account. The user interface 980 shows, as an example, that the router 300 is in an online state. The smart television 9012 is in an online state. The smart projector 9014 is in an offline state. The smart sound box 200 is in an online state. The smart camera 500 is in an online state.

After the smart sound box and the smart camera connect to the open ssid of the router 300, the smart sound box and the smart camera may sequentially obtain, according to the embodiment shown in FIG. 9, the configuration information of the router 300 with the router 300, and the smart sound box and the smart camera sequentially connect to a wireless local area network in which the router 300 is located by using the configuration information of the router 300.

It should be noted that, because the router 300 continuously sends the open ssid of the router 300, in some embodiments, in a process in which the router 300 establishes a connection to one or more electronic devices that are in the to-be-network-configured state, another electronic device in the to-be-network-configured state connects to the open ssid of the router 300. To sequentially complete network configuration processes of electronic devices connected to the open ssid of the router 300, after the router 300 completes a network configuration process with an electronic device, the router 300 determines a quantity of electronic devices connected to the open ssid of the router 300. If the quantity of electronic devices connected to the open ssid of the router 300 is greater than or equal to 1, the router randomly selects one device from the electronic devices connected to the open ssid of the router 300 to complete the network configuration process, until the router 300 determines that the quantity of electronic devices connected to the open ssid of the router 300 is 0.

After the router 300 determines that the quantity of electronic devices connected to the open ssid of the router 300 is 0, the router further continues to continuously send the open ssid of the router 300 for a specific time period. If another to-be-network-configured device connects to the open ssid of the router 300 within the specific time period, the another to-be-network-configured device obtains the network configuration information of the router 300 according to the embodiments shown in FIG. 7 to FIG. 9, and connects to the router 300 by using the network configuration information of the router 300. If no other to-be-network-configured device connects to the open ssid of the router 300 within the specific time period, the router 300 disables a function of sending the open ssid, and network configuration connection ends.

It can be learned from the foregoing analysis that the router 300 can complete a task item of network configuration with one or more to-be-network-configured devices by receiving only one user operation, thereby implementing "one-tap network configuration", and improving efficiency of network configuration between a plurality of to-be-network-configured devices and the router 300.

Figure 11:
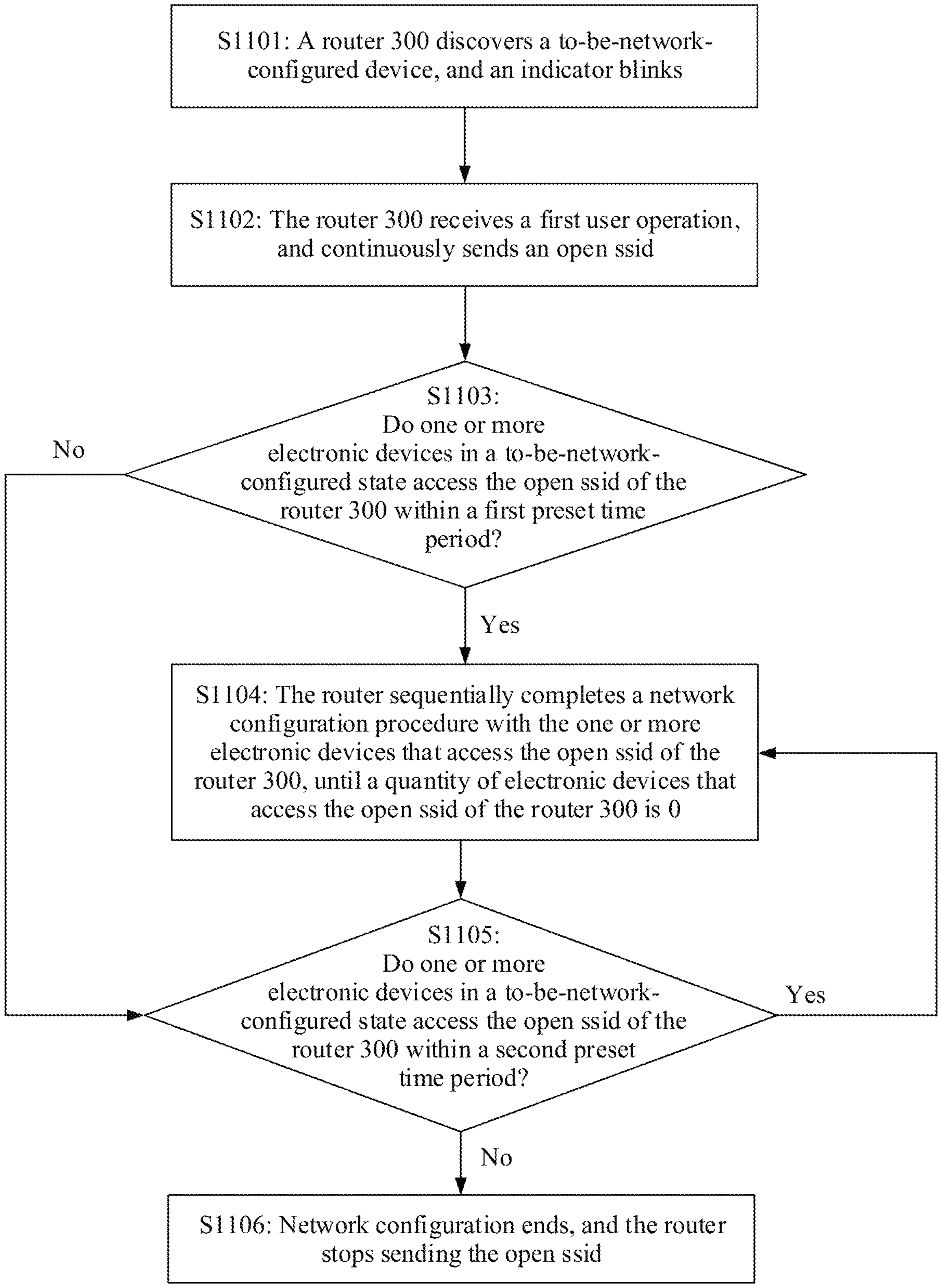
FIG. 11 to FIG. 13 are several flowcharts of "one-tap network configuration" according to an embodiment of this application.
Figure 12:
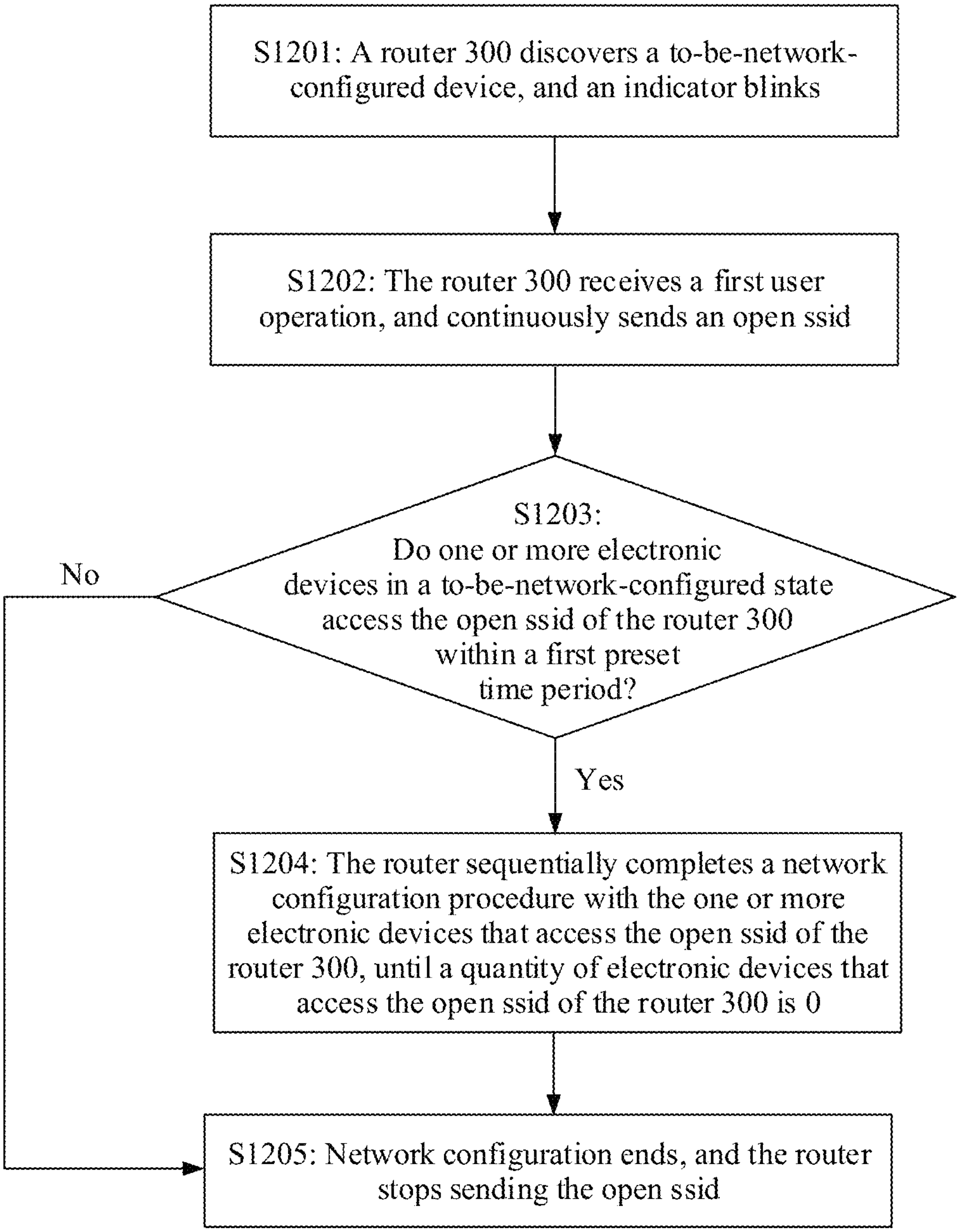
Figure 13:
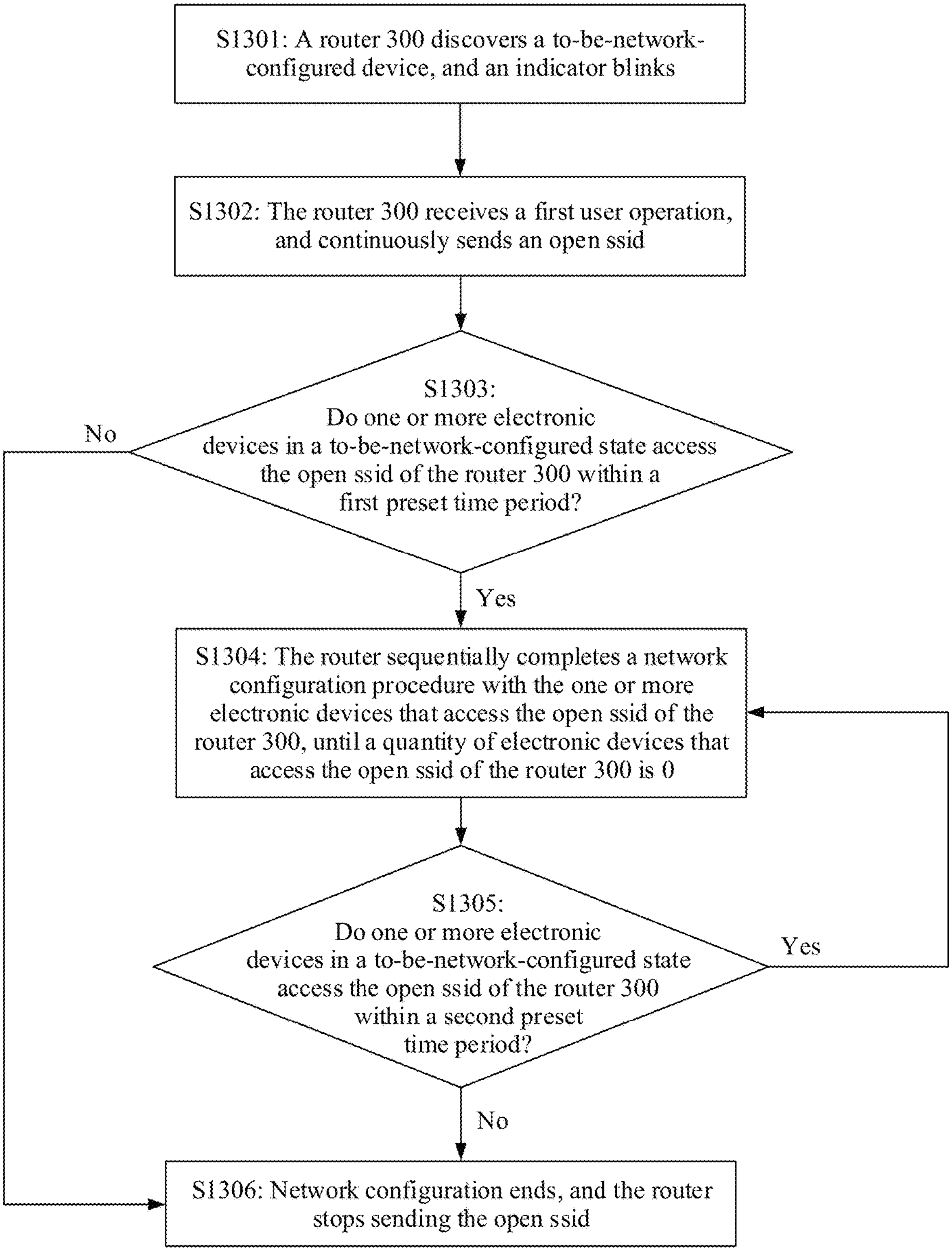

FIG. 11 to FIG. 13 are several example flowcharts of "one-tap network configuration" according to an embodiment of this application.

As shown in FIG. 11, a "one-tap network configuration" procedure may include S1101 to S1106.

In the procedure shown in FIG. 11, first, a router discovers a to-be-network-configured device, and continuously sends an open ssid of the router in response to a first user operation (that is, S1101 and S1102 are performed), and by using a moment at which the router starts to send the open ssid as a timing start point, determines whether one or more electronic devices access the open ssid of the router within a first preset time period after the moment (that is, a determining step of S1103 is performed).

If one or more electronic devices access the open ssid of the router within the first preset time (that is, a determining result in S1103 is "yes"), the router sequentially completes network configuration procedures of the one or more electronic devices accessing the open ssid of the router, until a quantity of electronic devices accessing the open ssid of the router is 0 (that is, S1104 is performed). In a process of performing S1104, the router may continue to continuously send the open ssid. Therefore, in this process, one or more new electronic devices in a to-be-network-configured state may continuously access the open ssid of the router, and the router may also sequentially complete a network configuration procedure of the one or more newly accessed electronic devices until a quantity of electronic devices accessing the open ssid of the router is 0. After S1104 is performed, the router may further start a timer again, to determine whether one or more electronic devices access the open ssid of the router within a second preset time period after S1104 is performed (that is, a determining step of S1105 is performed). If yes, S1104 is performed again; otherwise, S1106 is performed.

If no electronic device accesses the open ssid of the router within the first preset time period (that is, the determining result in S1103 is "no"), the router may also start the timer again, and by using a moment at which the determining result is "no" as a timing start point (or use a timing end moment of the first preset time period as a timing start point), determine whether one or more electronic devices access the open ssid of the router within a second preset time period after the moment (that is, the determining step in S1105 is performed). If yes (that is, a determining result in S1105 is "yes"), S1104 is performed; otherwise, S1106 is performed to end network configuration, and the router stops sending the open ssid. The second preset time period may be the same as or different from the first preset time period.

Therefore, the following is provided in a procedure in the embodiment shown in FIG. 11.

According to a first aspect, in S1103, after starting to send the open ssid, the router waits for a period of time, and determines whether one or more electronic devices access the router within the period of time. If yes, the router sequentially completes network configuration with the one or more electronic devices.

According to a second aspect, in a process of performing S1104, the router may still continuously send the open ssid, so that in this period of time, new devices in a to-be-network-configured state may continuously access the open ssid of the router, and the router can also sequentially complete network configuration procedures of these newly accessed devices.

According to a third aspect, after the determining result in S1103 is "no" or S1104 is performed, the router further performs the determining step of S1105. To be specific, when the router determines that the quantity of electronic devices currently accessing the open ssid of the router is 0, the router does not directly end network configuration and stop sending the open ssid, but waits for a period of time to determine whether a new electronic device in a to-be-network-configured state accesses the open ssid of the router, and if yes, the router also completes the network configuration procedure of the newly accessed device.

In the foregoing several aspects or some of the several aspects, the method shown in FIG. 11 can achieve an effect of "one-tap network configuration", that is, an effect of network configuration for a plurality of electronic devices can be completed by using only one user operation.

Embodiments of this application further provide a "one-tap network configuration" procedure shown in FIG. 12. FIG. 12 is similar to FIG. 11, S1201 is similar to S1101, and S1202 is similar to S1102. A difference lies in that the procedure shown in FIG. 12 may not include S1105 in the embodiment shown in FIG. 11, that is, after a determining result in S1203 is "no" or S1204 is performed, the router may directly end network configuration without waiting for the second preset time period. Because the procedure shown in FIG. 12 still includes S1203 (equivalent to S1103 in the embodiment shown in FIG. 11) and S1204 (equivalent to S1104 in the embodiment shown in FIG. 11), it can be learned from the foregoing analysis that the procedure shown in FIG. 12 can also achieve an effect of "one-tap network configuration".

Embodiments of this application further provide a "one-tap network configuration procedure" shown in FIG. 13. FIG. 13 is similar to FIG. 11, S1301 is similar to S1101, and S1302 is similar to S1102. A difference lies in that in the procedure shown in FIG. 13, after a determining result in S1303 is "no", the router may directly perform S1306 to end network configuration without waiting for the second preset time period. Because the procedure shown in FIG. 13 still includes S1303 (equivalent to S1103 in the embodiment shown in FIG. 11), S1304 (equivalent to S1104 in the embodiment shown in FIG. 11), and S1305 (equivalent to S1105 in the embodiment shown in FIG. 11), it can be learned from the foregoing analysis that the procedure shown in FIG. 13 can also achieve an effect of "one-tap network configuration".

Figure 14:
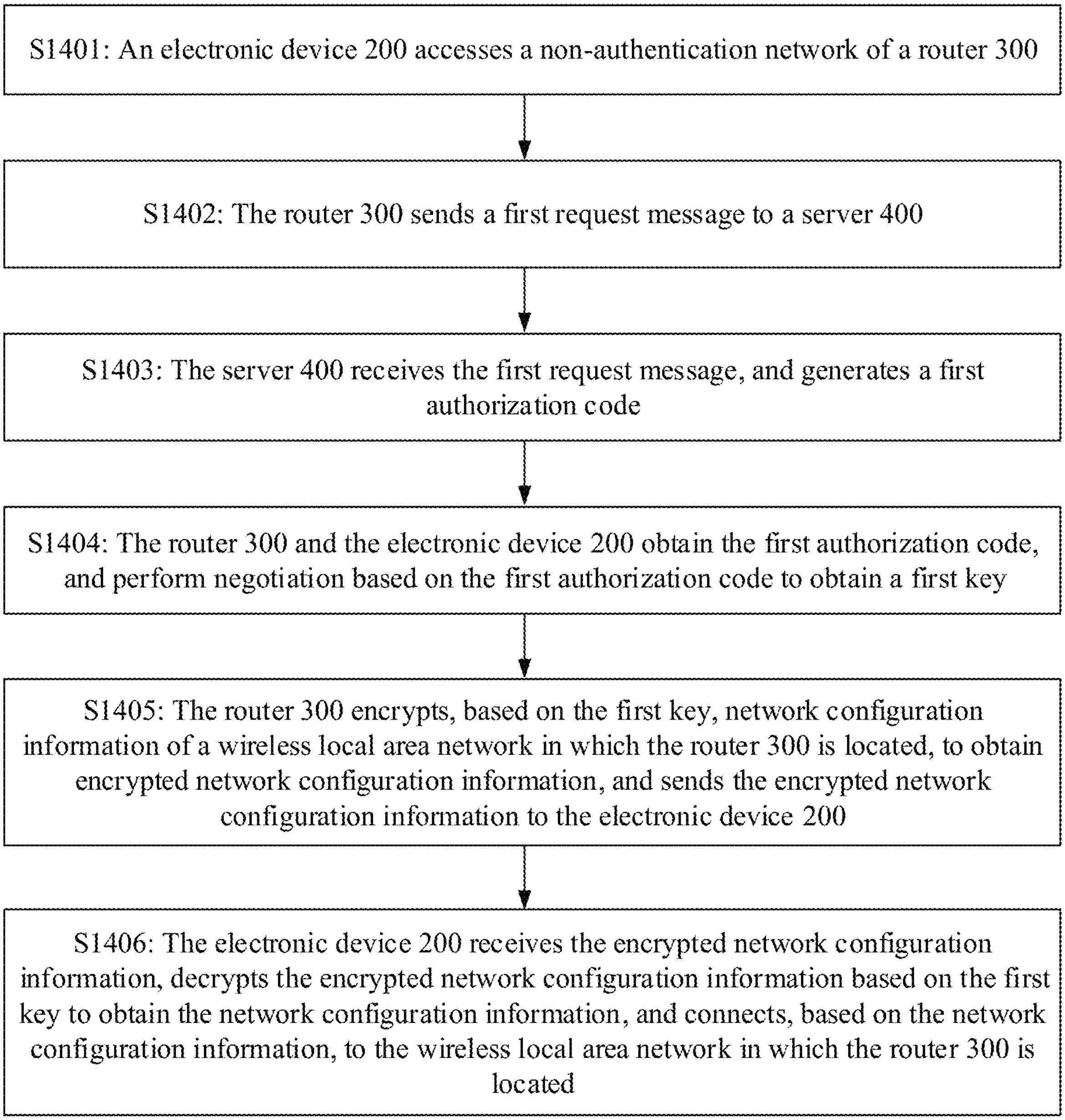
FIG. 14 is a schematic flowchart of a network configuration method according to an embodiment of this application.

FIG. 14 is a schematic flowchart of a network configuration method according to an embodiment of this application.

S1401: An electronic device 200 accesses a non-authentication network of a router 300.

The electronic device 200 may also be referred to as a first electronic device. The router 300 may be referred to as a wireless access device.

Optionally, before the electronic device 200 accesses the non-authentication network of the router 300, the electronic device 200 broadcasts a network configuration information element of the electronic device 200, where the network configuration information element is used to enable another electronic device to discover the electronic device 200 that is in a to-be-network-configured state. The network configuration information element of the electronic device 200 includes one or more of the following: an identifier of the electronic device 200, a capability indicating whether the electronic device 200 supports interconnection, a physical address of the electronic device 200, and the like.

After the router 300 receives the network configuration IE of the electronic device 200, the router 300 sends access information of the router 300. The access information of the router 300 may include an identifier of the non-authentication network, a physical address of the non-authentication network, and the like. After the electronic device 200 receives the access information of the router 300, the electronic device 200 connects to the non-authentication network of the router 300 based on the access information of the router 300.

S1402: The router 300 sends a first request message to a server 400.

After the electronic device 200 accesses the non-authentication network of the router 300, the router 300 sends the first request message to the server 400, where the first request information is to be used by the server 400 to generate a first authorization code. In other words, in the embodiment shown in FIG. 7, after S705 is performed, in the embodiment shown in FIG. 9, before the server 400 performs 901, the router 300 sends the first request message to the server 400. The server 400 generates the first authorization code only after the server 400 receives the first request message (that is, S901 is performed).

Alternatively, the first request message may be used by the server 400 to generate registration information of the electronic device 200. The first request message may be a request for generating registration data in S801 in the embodiment shown in FIG. 8.

S1403: The server 400 receives the first request message, and generates the first authorization code.

The first authorization code may also be referred to as an auth code set 1.

When the first request information is used by the server 400 to generate the first authorization code, that is, before the server 400 performs 901, the router 300 sends the first request message to the server 400. After the server 400 receives the first request message, the server 400 generates the first authorization code (that is, S901 is performed).

When the first request message may alternatively be used by the server 400 to generate the registration information of the electronic device 200, after the server 400 receives the first request message, the server 400 generates the registration information of the electronic device 200. Then, the electronic device 200, the router 300, and the server 400 perform steps S803 to S808, and the server 400 verifies that the electronic device 200 is a valid device, and binds the electronic device 200 and the router 300 to a same account. Then, the server 400 performs S901 to generate the first authorization code.

In some implementations, the first authorization code is randomly generated by the server 400 in response to a request message of a different electronic device, where an authorization code may be randomly generated by the server 400 according to a preset random number generation algorithm. In some implementations, the server 100 may also generate a same authorization code for different electronic devices.

In some other implementations, the server 400 may also generate the first authorization code and a second authorization code (which may also be referred to as an auth code set 2). The server 400 sends the first authorization code and the second authorization code to the router 300. The router 300 locally stores the first authorization code, and the router 300 sends the second authorization code to the electronic device 200. Subsequently, the router 300 negotiates with the electronic device 200 based on the first authorization code and the second authorization code to obtain a first key. When the first authorization code is the same as the second authorization code, the router 300 and the electronic device 200 perform negotiation based on the same authorization code to obtain the first key. When the first authorization code is different from the second authorization code, the router 300 and the electronic device 200 perform negotiation based on the different authorization codes to obtain the first key.

Optionally, before the server 400 generates the first authorization code, a second electronic device (for example, an electronic device 100) receives a second user operation, where the second user operation indicates the router 300 to send the access information of the non-authentication network.

In some implementations, the second user operation is used to control the router 300 to send the access information of the non-authentication network. Specifically, after the router 300 discovers the electronic device 200 that is in the to-be-network-configured state, the router 300 displays, by using the server 400, prompt information on an application on a mobile phone of the electronic device 100 that is connected to a network, so that a user can see the prompt information. The prompt information prompts the user to enter the second user operation on a network configuration interface of an application, so that the router 300 sends the access information of the non-authentication network. In other words, the user may not press the network configuration button (that is, perform the first user operation) on the router 300, and the router 300 can still send the access information of the non-authentication network. It can be ensured that, when it is inconvenient for the user to press the network configuration button of the router 300, the user can control, on the application, the router 300 to send the access information of the non-authentication network.

In addition, this solution can also be used in a "remote network distribution" application scenario. That is, a user operating the electronic device 200 is not familiar with a procedure of connecting the electronic device 200 to the router 300, and even if the user operating the electronic device 100 is not near the user of the electronic device 200, the user operating the electronic device 100 may remotely control, by using a second user operation performed on the electronic device 200, the electronic device 200 to connect to the router 300.

Specifically, for a specific description of an application scenario of "remote network configuration", refer to the embodiments shown in FIG. 9A to FIG. 9F. Details are not described in this embodiment of this application again.

In some other implementations, the second user operation may also be controlling the server 400 to send the first authorization code to the router 300 and the electronic device 200. Specifically, before the server 400 sends the first authorization code to the router 300 and the electronic device 200, the server 400 displays prompt information on an application on a mobile phone of the electronic device 100, so that the user can see the prompt information. The prompt information prompts the user to enter the second user operation on a network configuration interface of the application, so that the server 400 sends the first authorization code to the router 300 and the electronic device 200.

S1404: The router 300 and the electronic device 200 obtain the first authorization code, and perform negotiation based on the first authorization code to obtain a first key.

The first key may also be referred to as a key 2.

The first authorization code includes m authorization codes, and m is a positive integer greater than or equal to 1; and The router 300 based on x authorization codes in the first authorization code and the electronic device 200 based on y authorization codes in the first authorization code perform negotiation to obtain the first key, where x is greater than or equal to 1 and less than or equal to m, and y is greater than or equal to 1 and less than or equal to m.

That is, the server 400 sends the first authorization code to the router 300, the router 300 locally stores the first authorization code, and the router 300 further needs to send the first authorization code to the electronic device 200. The router 300 and the electronic device 200 may select a part or all of the authorization codes from the first authorization code to perform negotiation to obtain the first key.

In some implementations, if the x authorization codes in the first authorization code are the same as the y authorization codes in the first authorization code, the router 300 and the electronic device 200 perform negotiation based on the same authorization code to obtain the first key.

In some other implementations, if the x authorization codes in the first authorization code are different from the y authorization codes in the first authorization code, the router 300 and the electronic device 200 perform negotiation based on the different authorization codes to obtain the first key.

Herein, for how the router 300 and the electronic device 200 obtain the first key through negotiation based on the first authorization code, refer to related descriptions in the embodiment shown in FIG. 9. Details are not described again in this embodiment of this application.

Optionally, before the router 300 and the electronic device 200 obtain the first authorization code, and obtain the first key through negotiation based on the first authorization code, the electronic device 200 sends, to the server 400 via the router 300, first authentication information locally stored by the electronic device 200; and the server 400 receives the first authentication information, and determines, based on the first authentication information, that the electronic device 200 is a valid device. In this way, only after the server 400 determines, by using the first authentication information, that the electronic device 200 is a valid device, the server 400 generates the first authorization code for the electronic device 200 and the router 300 to perform negotiation to obtain the first key to transmit the network configuration information. When the server 400 determines, by using the first authentication information, that the router 300 is not a valid device, the server 400 does not generate the first authorization code, the router 300 cannot obtain the network configuration information, and the router 300 cannot access the wireless local area network in which the router 300 is located, thereby ensuring security in the network configuration process.

Specifically, when determining that the first authentication information meets a first condition, the server 400 determines that the electronic device 200 is the valid device.

In some implementations, the first authentication information includes first registration information (the first registration information may be the registration information described in the embodiment shown in FIG. 8).

After the server 400 receives the first request information and before the server 400 receives the first authentication information sent by the router 300, the server 400 generates the first registration information (for example, a registration code), and locally stores the first registration information, to obtain second registration information. The server 400 sends the first registration information to the electronic device 200 via the router 300. After receiving the first registration information, the electronic device 200 locally stores the first registration information.

The first condition includes: The first registration information in the first authentication information is the same as the second registration information that is of the electronic device 200 and that is locally stored by the server 400. To be specific, when the server 400 determines that the first registration information sent by the electronic device 200 via the router 300 is registration information that is of the electronic device 200 and that is sent by the server 400 via the router 300 before, the server 400 may preliminarily determine that the electronic device 200 is the valid device.

In some other implementations, the first authentication information includes first registration information and first verification information (the first verification information may be the verification information described in the embodiment shown in FIG. 8). The first verification information may be any one of a digital certificate or a KPI certificate.

The first condition includes: The first registration information in the first authentication information is the same as second registration information that is of the electronic device 200 and that is locally stored by the server 400. In addition, the first verification information is valid verification information.

Specifically, before the server 400 determines that the first verification information is the valid verification information, the server 400 generates a first random number and sends the first random number to the electronic device 200 via the router 300. After receiving the first random number, the electronic device 200 encrypts the first random number based on a first private key, to obtain an encrypted first random number. The electronic device 200 sends the encrypted first random number to the server 400 via the router 300. After receiving the encrypted first random number, the server 400 decrypts the encrypted first random number based on a first public key preset in the first verification information, to obtain the first random number, and the server 400 determines that the first verification information is the valid verification information.

After the server 400 determines, by using the first registration information, that the electronic device 200 is the valid device, the server 400 further verifies validity of the electronic device 200 based on the verification information. This can improve security of subsequent transmission of the network configuration information.

Specifically, for how the server 400 verifies the validity of the electronic device 200 based on the first registration information and the first verification information, refer to related descriptions in the embodiment shown in FIG. 8. Details are not described in this embodiment of this application.

Optionally, before the electronic device 200 sends, to the server 400 via the router 300, first authentication information locally stored by the electronic device 200, the electronic device 200 based on a locally stored preset parameter and the router 300 based on a locally stored preset parameter performs negotiation to obtain a second key (which may also be referred to as a key 1); and that the electronic device 200 sends, to the server 400 via the router 300, first authentication information locally stored by the electronic device 200 specifically includes: The electronic device 200 encrypts the first authentication information based on the second key, to obtain encrypted first authentication information; the electronic device 200 sends the encrypted first authentication information to the router 300; after receiving the encrypted first authentication information, the router 300 decrypts the encrypted first authentication information based on the second key, to obtain the first authentication information; and the router 300 sends the first authentication information to the server 400.

In some implementations, before the router 300 sends the first registration information to the electronic device 200, the router 300 encrypts the first registration information by using the second key, to obtain the encrypted first registration information. The router 300 sends the encrypted first registration information to the electronic device 200. In this way, security of transmitting information between the electronic device 200 and the router 300 can be ensured.

In this way, before the electronic device 200 initiates a registration request to the server 400 (in other words, before the electronic device 200 sends the first authentication information to the server 400 via the router 300), if the electronic device 200 and the router 300 may obtain the second key through negotiation by using the locally stored preset parameters, it may be considered that the electronic device 200 is a preliminarily valid device, and the electronic device 200 may initiate the registration request to the server 400 via the router 300. This can ensure that the electronic device 200 that initiates the registration request to the server 400 is a preliminarily valid electronic device, that is, the electronic device 200 stores the preset parameter. In addition, information transmitted between the electronic device 200 and the router 300 is encrypted by using the second key and then transmitted, which can ensure security of transmitting information between the electronic device 200 and the router 300.

S1405: The router 300 encrypts, based on a first key, network configuration information of the wireless local area network in which the router 300 is located, to obtain encrypted network configuration information, and sends the encrypted network configuration information to the electronic device 200.

The network configuration information may include but is not limited to a name and a password of the router 300, and the network configuration information may further include more other information. This is not limited in this application.

After the router 300 and the electronic device 200 obtain the first authorization code, and perform negotiation based on the first authorization code to obtain the first key, the router 300 encrypts, based on the first key, the network configuration information of the wireless local area network in which the router 300 is located, to obtain the encrypted network configuration information, and sends the encrypted network configuration information to the electronic device 200. In this way, the electronic device 200 can obtain the configuration information of the wireless local area network in which the router 300 is located.

S1406: The electronic device 200 receives the encrypted network configuration information, decrypts the encrypted network configuration information based on the first key, to obtain the network configuration information, and connects, based on the network configuration information, to the wireless local area network in which the router 300 is located.

After receiving the encrypted network configuration information, the electronic device 200 decrypts the encrypted network configuration information based on the first key, to obtain the network configuration information, and connects, based on the network configuration information, to the wireless local area network in which the router 300 is located. In this way, the electronic device 200 may access the internet by using the router 300.

Optionally, before the electronic device 200 accesses the non-authentication network of the router 300, the router 300 sends the access information of the non-authentication network in response to the first user operation. The electronic device 200 receives the access information, and accesses the non-authentication network of the router 300 based on the access information. The first user operation may be a pressing operation performed on a network configuration button of the router 300, and the access information of the non-authentication network may include an identifier of the non-authentication network, a physical address of the router 300, and the like. The router 300 sends the access information of the non-authentication network of the router 300 only after the router 300 receives the first user operation (that is, obtains authorization from the user).

In some implementations, the router 300 continuously sends the access information of the non-authentication network in response to the first user operation.

After the electronic device 200 accesses the wireless local area network in which the router 300 is located, a third electronic device (an electronic device 500) accesses the non-authentication network of the router 300. The router 300 sends a second request message to the server 400. After receiving the second request message, the server 400 generates the second authorization code. The second authorization code is different from the authorization code generated after the server 400 receives the request message that is of the another electronic device and that is sent by the router 300. The router 300 and the electronic device 500 obtain the second authorization code, and perform negotiation based on the second authorization code to obtain a second key. The router 300 encrypts, based on the second key, the network configuration information of the wireless local area network in which the router 300 is located, to obtain the encrypted network configuration information, and sends the encrypted network configuration information to the electronic device 500. The electronic device 500 receives the encrypted network configuration information, decrypts the encrypted network configuration information based on the second key, to obtain the network configuration information, and connects, based on the network configuration information, to the wireless local area network in which the router 300 is located. In this way, the router 300 needs to receive only one user operation, and continuously sends the access information of the non-authentication network. Before the router 300 stops sending the access information of the non-authentication network, one or more electronic devices may connect to the non-authentication network of the router 300. In this case, the router 300 may complete a network configuration procedure with one or more other electronic devices (for example, the electronic device 500) like a network configuration procedure with the electronic device 200. In other words, the router 300 needs to receive only one user operation, and can complete a network configuration procedure with a plurality of electronic devices. Compared with the fact that currently the router 300 receives one user operation and can complete a network configuration procedure with only one electronic device, this improves network configuration efficiency of the electronic device.

In some implementations, after the router 300 completes a network configuration procedure with the electronic device 500, and the router 300 determines that a quantity of electronic devices that connect to the non-authentication network of the router 300 is 0, the router 300 stops sending the access information of the non-authentication network.

In some implementations, after the router 300 completes a network configuration procedure with the electronic device 500, a period of time pasts after the router 300 determines that a quantity of electronic devices that connect to the non-authentication network of the router 300 is 0. In this period of time, the router 300 still continuously sends the access information of the non-authentication network. If no other electronic device connects to the non-authentication network of the router 300, the router 300 stops sending the access information of the non-authentication network.

Specifically, for how the router 300 implements "one-tap network configuration", refer to the embodiments shown in FIG. 10A to FIG. 10C and FIG. 11 to FIG. 13. Details are not described in this embodiment of this application again.

Optionally, there are one or more electronic devices 200. Before the electronic device 100 receives the second user operation of the user, the electronic device 100 displays a first user interface (the user interface 940 shown in FIG. 9E or the user interface 970 shown in FIG. 10B), where the first user interface includes one or more device identifiers corresponding to the one or more electronic devices 200. After the electronic device 100 receives the second user operation of the user, the electronic device 100 displays a second user interface (the user interface 950 shown in FIG. 9F or the user interface 980 shown in FIG. 10C), where the second user interface includes one or more state identifiers corresponding to one or more electronic devices 200, and the one or more state identifiers indicate that the one or more electronic devices 200 have completed network configuration, or the one or more electronic devices 200 have connected to a network.

The second user interface may further include information such as the one or more device identifiers corresponding to the one or more electronic devices 200.

In this way, after the server 400 verifies that the electronic device 200 is the valid device, the server 400 associates the electronic device 200 and the router 300 with a same account. Therefore, the user may view a network connection status of the electronic device 200 on an application of the electronic device 100. The network connection status includes but is not limited to online, offline, network configuration, network configuration failure, and the like.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

According to the context, the term “when” used in the foregoing embodiments may be interpreted as “if”, “after”, “in response to determining”, or “in response to detecting”. Similarly, according to the context, the phrase “when it is determined that” or “if (a stated condition or event) is detected” may be interpreted as a meaning of “if it is determined that”, “in response to determining”, “when (a stated condition or event) is detected”, or “in response to detecting (a stated condition or event)”.

Persons of ordinary skill in the art may understand that all or some of the procedures of the methods in embodiments may be implemented by a computer program instructing relevant hardware. The program may be stored in a computer-readable storage medium. When the program runs, the procedures of the methods in embodiments are performed. The storage medium includes any medium that can store program code, such as a ROM, a random access memory RAM, a magnetic disk, or a compact disc.

What is claimed is:

1. A network configuration method, applied to a first electronic device, wherein the network configuration method comprises:

accessing a non-authentication network of a wireless access device;

sending, to a server via the wireless access device, first authentication information locally stored by the first electronic device, wherein the first authentication information comprises a public key that is generated by the first electronic device;

obtaining a first authorization code in response to sending the first authentication information, wherein the first authorization code is generated by the server, and the first authorization code is different from an authorization code received by another electronic device that accesses the non-authentication network of the wireless access device, negotiating with the wireless access device based on the first authorization code that is obtained from the server to determine a first key by using a diffie hellman (DH) algorithm, wherein the negotiating comprises:

sending a prime number from the first electronic device to the wireless access device;

receiving a parameter that is associated with the prime number from the wireless access device; and generating the first key by the first electronic device based on the first authorization code and the parameter received from the wireless access device;

receiving encrypted network configuration information sent by the wireless access device, and decrypting the encrypted network configuration information based on the first key to obtain network configuration information; and connecting, based on the network configuration information, to a wireless local area network in which the wireless access device is located.

2. The network configuration method according to claim 1, wherein before sending, to the server via the wireless access device, the first authentication information locally stored by the first electronic device, the network configuration method further comprises:

negotiating, based on a locally stored preset parameter, with the wireless access device based on a locally stored preset parameter to obtain a second key;

wherein sending, to the server via the wireless access device, the first authentication information locally stored by the first electronic device comprises:

encrypting, based on the second key, the first authentication information that is locally stored, to obtain encrypted first authentication information; and sending the encrypted first authentication information to the wireless access device, wherein the encrypted first authentication information is decrypted by the wireless access device based on the second key, to obtain the first authentication information, and send the first authentication information to the server.

3. The network configuration method according to claim 1, wherein the first authorization code comprises m authorization codes, and m is a positive integer greater than or equal to 1; and negotiating with the wireless access device based on the first authorization code to determine a first key comprises:

negotiating, based on x authorization codes in the first authorization code, with the wireless access device based on y authorization codes in the first authorization code to obtain the first key, wherein x is greater than or equal to 1 and less than or equal to m, and y is greater than or equal to 1 and less than or equal to m.

4. The network configuration method according to claim 1, wherein before accessing the non-authentication network of the wireless access device, the network configuration method further comprises:

receiving access information sent by the wireless access device; and wherein accessing the non-authentication network of the wireless access device comprises:

accessing the non-authentication network of the wireless access device based on the access information.

5. The network configuration method according to claim 1, wherein before accessing the non-authentication network of the wireless access device, the network configuration method further comprises:

broadcasting a network configuration information element of the first electronic device, wherein the network configuration information element is used to enable another electronic device to discover the first electronic device that is in a to-be-network-configured state.

6. The network configuration method according to claim 1, wherein the network configuration information comprises a name and a password of the wireless local area network in which the wireless access device is located.

7. The network configuration method according to claim 1, wherein before obtaining the first authorization code, the network configuration method further comprises:

obtaining a random number that is generated by the server;

encrypting the random number by using a private key that corresponds to the public key; and sending the encrypted random number to the server.

8. A first electronic device comprising:

one or more processors; and one or more memories storing computer program code comprising instructions that, when executed by the one or more processors, cause the first electronic device to perform operations comprising:

accessing a non-authentication network of a wireless access device;

sending, to a server via the wireless access device, first authentication information locally stored by the first electronic device, wherein the first authentication information comprises a public key that is generated by the first electronic device;

obtaining a first authorization code in response to sending the first authentication information, wherein the first authorization code is generated by the server, and the first authorization code is different from an authorization code received by another electronic device that accesses the non-authentication network of the wireless access device;

negotiating with the wireless access device based on the first authorization code that is obtained from the server to determine a first key by using a diffie hellman (DH) algorithm, wherein the negotiating comprises:

sending a prime number from the first electronic device to the wireless access device;

receiving a parameter that is associated with the prime number from the wireless access device; and generating the first key by the first electronic device based on the first authorization code and the parameter received from the wireless access device;

receiving encrypted network configuration information sent by the wireless access device, and decrypting the encrypted network configuration information based on the first key to obtain network configuration information; and connecting, based on the network configuration information, to a wireless local area network in which the wireless access device is located.

9. The first electronic device according to claim 8, the operations further comprising:

negotiating, based on a locally stored preset parameter, with the wireless access device based on a locally stored preset parameter to obtain a second key;

wherein sending, to the server via the wireless access device, the first authentication information locally stored by the first electronic device specifically comprises:

encrypting, based on the second key, the first authentication information that is locally stored, to obtain encrypted first authentication information; and sending the encrypted first authentication information to the wireless access device, wherein the encrypted first authentication information is decrypted by the wireless access device based on the second key, to obtain the first authentication information, and send the first authentication information to the server.

10. The first electronic device according to claim 8, wherein the first authorization code comprises m authorization codes, and m is a positive integer greater than or equal to 1; and wherein negotiating with the wireless access device based on the first authorization code to determine the first key comprises:

negotiating, based on x authorization codes in the first authorization code, with the wireless access device based on y authorization codes in the first authorization code to obtain the first key, wherein x is greater than or equal to 1 and less than or equal to m, and y is greater than or equal to 1 and less than or equal to m.

11. The first electronic device according to claim 8, the operations further comprising:

receiving access information sent by the wireless access device; and wherein accessing the non-authentication network of the wireless access device comprises:

accessing the non-authentication network of the wireless access device based on the access information.

12. The first electronic device according to claim 8, the operations further comprising:

broadcasting a network configuration information element of the first electronic device, wherein the network configuration information element is used to enable another electronic device to discover the first electronic device that is in a to-be-network-configured state.

13. The first electronic device according to claim 8, wherein the network configuration information comprises a name and a password of the wireless local area network in which the wireless access device is located.

14. The first electronic device according to claim 8, wherein before obtaining the first authorization code, the operations further comprise:

obtaining a random number that is generated by the server;

encrypting the random number by using a private key that corresponds to the public key; and sending the encrypted random number to the server.

15. A computer-readable storage medium storing a computer program comprising machine-readable instructions that, that when executed by a first electronic device, cause the first electronic device to perform operations comprising:

accessing a non-authentication network of a wireless access device;

sending to a server via the wireless access device, first authentication information locally stored by the first electronic device, wherein the first authentication information comprises a public key that is generated by the first electronic device;

obtaining a first authorization code in response to sending the first authentication information, wherein the first authorization code is generated by the server, and the first authorization code is different from an authorization code received by another electronic device that accesses the non-authentication network of the wireless access device;

negotiating with the wireless access device based on the first authorization code that is obtained from the server to determine a first key by using a diffie hellman (DH) algorithm, wherein the negotiating comprises:

sending a prime number from the first electronic device to the wireless access device;

receiving a parameter that is associated with the prime number from the wireless access device; and generating the first key by the first electronic device based on the first authorization code and the parameter received from the wireless access device;

receiving encrypted network configuration information sent by the wireless access device, and decrypting the encrypted network configuration information based on the first key to obtain network configuration information; and connecting, based on the network configuration information, to a wireless local area network in which the wireless access device is located.

16. The computer-readable storage medium according to claim 15, the operations further comprising:

negotiating, based on a locally stored preset parameter, with the wireless access device based on a locally stored preset parameter to obtain a second key; and wherein sending, to the server via the wireless access device, the first authentication information locally stored by the first electronic device comprises:

encrypting, based on the second key, the first authentication information that is locally stored, to obtain encrypted first authentication information; and sending the encrypted first authentication information to the wireless access device, wherein the encrypted first authentication information is decrypted by the wireless access device based on the second key, to obtain the first authentication information, and send the first authentication information to the server.

17. The computer-readable storage medium according to claim 15, wherein the first authorization code comprises m authorization codes, and m is a positive integer greater than or equal to 1; and wherein negotiating with the wireless access device based on the first authorization code to determine a first key comprises:

negotiating, based on x authorization codes in the first authorization code, with the wireless access device based on y authorization codes in the first authorization code to obtain the first key, wherein x is greater than or equal to 1 and less than or equal to m, and y is greater than or equal to 1 and less than or equal to m.

18. The computer-readable storage medium according to claim 15, the operations further comprising:

receiving access information sent by the wireless access device; and wherein accessing a non-authentication network of the wireless access device comprises:

accessing the non-authentication network of the wireless access device based on the access information.

19. The computer-readable storage medium according to claim 15, the operations further comprising:

broadcasting a network configuration information element of the first electronic device, wherein the network configuration information element is used to enable another electronic device to discover the first electronic device that is in a to-be-network-configured state.

20. The computer-readable storage medium according to claim 15, wherein before obtaining the first authorization code, the operations further comprise:

obtaining a random number that is generated by the server;

encrypting the random number by using a private key that corresponds to the public key; and sending the encrypted random number to the server.

* * * * *